United States Patent
Usami et al.

(10) Patent No.: US 7,731,896 B2
(45) Date of Patent: Jun. 8, 2010

(54) LOW ALLOY STEEL AND WELD JOINT THEREOF EXCELLENT IN CORROSION RESISTANCE TO HYDROCHLORIC ACID AND SULFURIC ACID

(75) Inventors: Akira Usami, Futtsu (JP); Shunji Sakamoto, Kitakyushu (JP); Satoshi Nishimura, Kitakyushu (JP); Motohiro Okushima, Tokai (JP); Takashi Kusunoki, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 401 days.

(21) Appl. No.: 10/496,191

(22) PCT Filed: Nov. 15, 2002

(86) PCT No.: PCT/JP02/11974

§ 371 (c)(1),
(2), (4) Date: May 19, 2004

(87) PCT Pub. No.: WO03/044236

PCT Pub. Date: May 30, 2003

(65) Prior Publication Data

US 2005/0013722 A1    Jan. 20, 2005

(30) Foreign Application Priority Data

Nov. 19, 2001  (JP)  ............................. 2001-353632
Aug. 29, 2002  (JP)  ............................. 2002-251787

(51) Int. Cl.
C22C 38/12 (2006.01)
C22C 38/02 (2006.01)
C22C 38/04 (2006.01)
C22C 38/08 (2006.01)
C22C 38/16 (2006.01)

(52) U.S. Cl. .................... 420/123; 420/89; 420/92; 420/119; 420/124; 420/128

(58) Field of Classification Search ............... 420/105, 420/108, 109–111, 119, 123–128, 83, 84, 420/89; 148/320.332–336, 320
See application file for complete search history.

(56) References Cited

U.S. PATENT DOCUMENTS 3,443,934 A    5/1969    Kubota et al.

(Continued)

FOREIGN PATENT DOCUMENTS

JP    B-43-014585    6/1968

(Continued)

OTHER PUBLICATIONS

Introduction to Steels and Cast iron, p. 3, Table 1.1 Essential and incidental elements in steel and cast iron, ASM.second edition, 1982.*

(Continued)

Primary Examiner—Deborah Yee
(74) Attorney, Agent, or Firm—Kenyon & Kenyon LLP

(57) ABSTRACT

The present invention provides a low alloy steel and a weld joint thereof excellent in hydrochloric acid corrosion resistance and sulfuric acid corrosion resistance, said low alloy steel containing, in mass,
C: 0.001 to 0.2%,
Si: 0.01 to 2.5%,
Mn: 0.1 to 2%,
Cu: 0.1 to 1%,
Mo: 0.001 to 1%,
Sb: 0.01 to 0.2%,
P: 0.05% or less, and
S: 0.05% or less,
with the balance consisting of Fe and unavoidable impurities; and the acid corrosion resistance index AI of said low alloy steel being zero or positive.

Here, said AI is given by the following expression, $$AI/10{,}000 = 0.0005 + 0.045 \times Sb\% - C\% \times Mo\%,$$

where % means mass %.

5 Claims, 12 Drawing Sheets

U.S. PATENT DOCUMENTS 3,459,538 A * 8/1969 Shoichi et al. .............. 420/89
6,608,284 B1 8/2003 Nikodym

FOREIGN PATENT DOCUMENTS

| JP | B-46-034772 | | 10/1971 |
|---|---|---|---|
| JP | 59-83748 | | 5/1984 |
| JP | 59-83748 A | | 5/1984 |
| JP | 5-104282 A | | 4/1993 |
| JP | A-7-316745 | | 12/1995 |
| JP | A-9-025536 | | 1/1997 |
| JP | 9-279293 A | | 10/1997 |
| JP | 10-110237 | | 4/1998 |
| JP | A-10-110237 | | 4/1998 |
| JP | 410251797 | * | 9/1998 |
| JP | 11-1745 | | 1/1999 |
| JP | 2000-17382 | * | 1/2000 |
| JP | 2000-17382 A | | 1/2000 |
| JP | 2000-73138 | | 3/2000 |
| JP | 2000-73138 A | | 3/2000 |
| JP | 2000-73139 | | 3/2000 |
| JP | 2000-256781 A | | 9/2000 |
| WO | WO 02/063056 | | 8/2002 |

OTHER PUBLICATIONS

Hand Book "Welding Materials and Instruments" Nippon steel Welding Products and Engineering. Cover, Contents, pp. 64, 65, 164, 165, 210 and 211, Jul. 20, 1997.

Journal of the Japan Institute of Metals, Abstract of 58$^{th}$ Tokyo conference. Cover, Contents, p. 84, Mar. 15, 1966.

Technical Report of Fuji Steel, vol. 17, No. 2. Cover, Content, Colophon (p. 96), pp. 1 to 51, Jun. 1, 1968.

"Corrosion Resistant Steel Materials" The Japan Iron and Steel Federation. Cover, Contents, Colophon (p. 156), pp. 102-103, Mar. 1988.

Kowaka et.al., 1970, J. Japan Inst. of Metals 34:1017-1022.

Nippon Steel Catalog, "*Sulfuric Acid Dew-Point Corrosion Resistant Steel S-TEN*," Cat. No. AC107 (Mar. 1997).

* cited by examiner

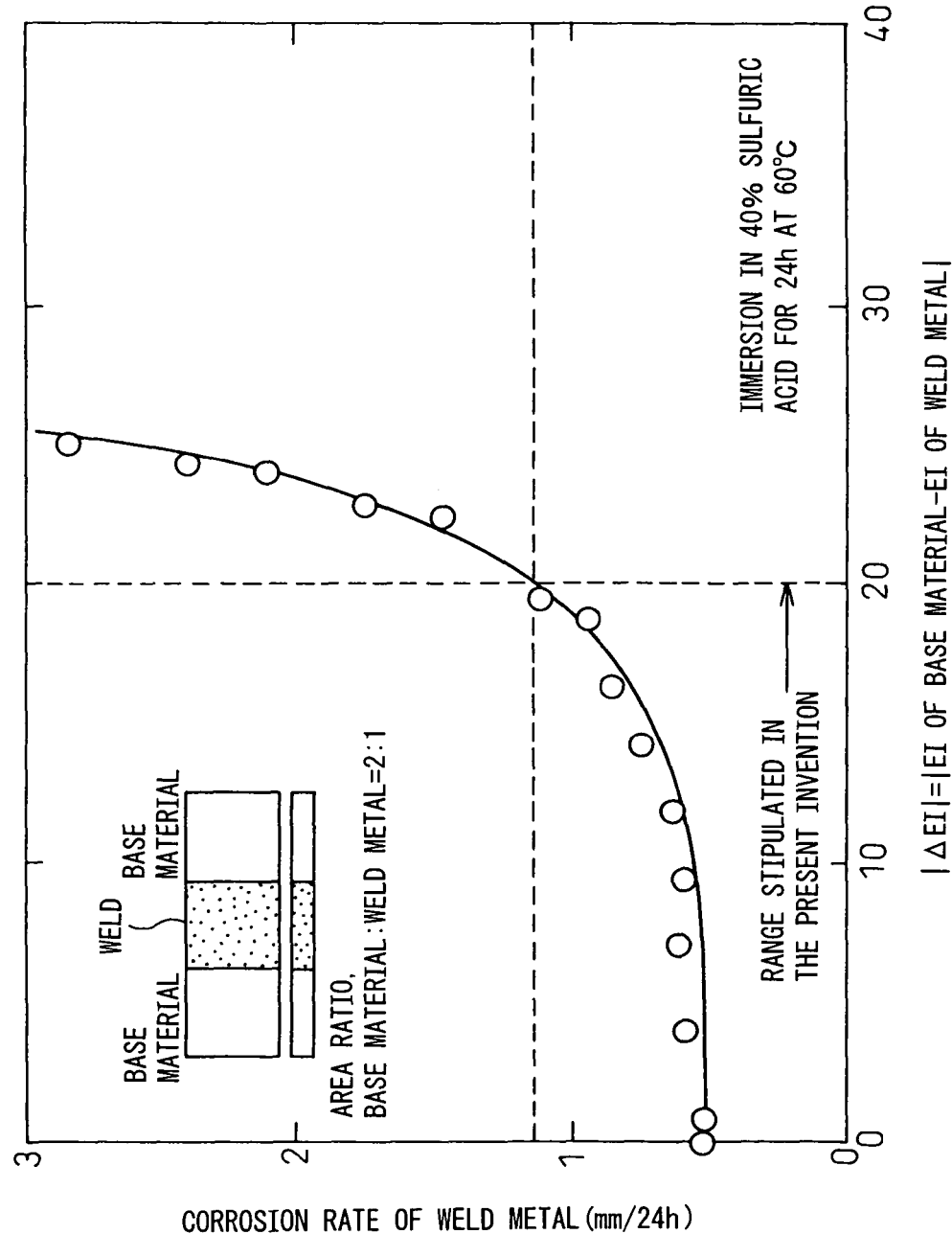

LOW ALLOY STEEL AND WELD JOINT THEREOF EXCELLENT IN CORROSION RESISTANCE TO HYDROCHLORIC ACID AND SULFURIC ACID

TECHNICAL FIELD

The present invention relates: to a low alloy steel and a weld joint thereof excellent in acid corrosion resistance; specifically, to a low alloy steel and a weld joint thereof excellent in resistance to hydrochloric acid and sulfuric acid; and, more specifically, to a low alloy steel and a weld joint thereof which secure an excellent corrosion resistance even in an environment of sulfuric acid or hydrochloric acid dew-point corrosion, the environment being produced in an atmosphere of combustion exhaust gas coming mainly from a boiler or a gasifying fusion furnace, or in an environment of a sulfuric acid or hydrochloric acid aqueous solution.

To be more precise, the present invention relates to a low alloy steel and a weld joint thereof which are used for smoke exhausting equipment of a boiler wherein fossil fuel such as heavy oil and coal, fuel gas such as liquefied natural gas, non-industrial waste such as municipal refuse, industrial waste such as wood chips, fiber chips, waste oil, plastics, waste tires and medical waste, and sewage sludge are incinerated, the smoke exhaustion equipment including a gas duct, a casing, a heat exchanger, a gas-to-gas heater, a wet or dry desulfurizer, an electrostatic precipitator, an induced draft fan, a basket material and a heat conduction element plate of a rotary regenerative air preheater, a cooling tower, a bag filter and a stack. To be still more precise, the present invention relates: to an acid dew-point corrosion resistant low alloy steel and a weld joint thereof excellent in economical efficiency, which show an excellent resistance to sulfuric acid or hydrochloric acid dew-point corrosion caused in smoke exhausting equipment and are applicable to a welded structure and also to a fin of a heat exchanger tube, a heat conduction element plate of an air preheater and an expansion joint of a flue, those requiring severe cold-workability; and to a low alloy steel and a weld joint thereof excellent in corrosion resistance to hydrochloric acid and sulfuric acid, which are applicable to a steel pickling tank for receiving pickling liquor composed of either hydrochloric acid or sulfuric acid or a mixture thereof.

BACKGROUND ART

A combustion exhaust gas coming from a thermoelectric power station, a municipal refuse incinerator or an industrial waste incinerator is mainly composed of moisture, sulfur oxide (sulfur dioxide, sulfur trioxide), hydrogen chloride, nitrogen oxide, carbon dioxide, nitrogen and oxygen. When sulfur trioxide is included in a combustion exhaust gas even at 1 ppm, in particular, the dew point of the exhaust gas reaches a temperature of 100° C. or higher and thus sulfuric acid dew-point corrosion is caused. To cope with the corrosion problem, a sulfuric acid dew-point corrosion resistant steel (for example, Japanese Examined Patent Publication No. S43-14585) and a highly corrosion resistant stainless steel (for example, Japanese Unexamined Patent Publication No. H7-316745) are used.

In the case of the flue gas system of a coal burning thermal power boiler or a non-industrial or industrial waste incinerator, as a considerable amount of hydrogen chloride is contained, besides the aforementioned sulfur trioxide, in combustion gas, both sulfuric acid condensation and hydrochloric acid condensation are caused. Further, a sulfuric acid dew-point temperature and a hydrochloric acid dew-point temperature vary in accordance with the composition of the combustion exhaust gas. In general, a sulfuric acid dew-point temperature is roughly in the range from 100° C. to 150° C. and a hydrochloric acid dew-point temperature is in the range from 50° C. to 80° C. Therefore, in a flue gas system, even though the configuration of the system is not changed and the temperature of a passing combustion gas is nearly constant, some portions are dominated by sulfuric acid dew-point corrosion and some other portions by hydrochloric acid dew-point corrosion because the temperatures of the walls of the portions vary in accordance with the structures and the portions. For that reason, the development of a material for a structural member excellent in both sulfuric acid dew-point corrosion resistance and hydrochloric acid dew-point corrosion resistance has been a challenge.

As an example to cope with the challenge, Japanese Examined Patent Publication No. S46-34772 discloses a technology related to an acid resistant ultra-low carbon low alloy steel, wherein sulfuric acid resistance and hydrochloric acid resistance are enhanced by ultra-low carbon (not more than 0.03 mass % C) and the addition of Cu and Mo.

Further, Japanese Unexamined Patent Publication No. H9-25536 discloses a technology related to a sulfuric acid dew-point corrosion resistant steel, wherein hydrochloric acid dew-point corrosion resistance is improved, while sulfuric acid dew-point corrosion resistance is secured, by reducing an S amount and adding Sn and/or Sb. Furthermore, Japanese Unexamined Patent Publication No. H10-110237 discloses a steel excellent in sulfuric acid resistance, hydrochloric acid resistance and hot-workability, wherein Sn and/or Sb are added to a copper contained steel of ultra-low sulfur (not more than 0.005 mass % S) and further Mo and/or B are added thereto for recovering hot-workability that has been deteriorated by the addition of Sn and/or Sb.

In the case of the technology disclosed in Japanese Examined Patent Publication No. S46-34772, however, the steel is limited to an ultra-low carbon steel and therefore there have been the problems of requiring other expensive alloying elements for enhancing strength, limiting the application of the steel to a heat conduction element plate for an air heater or the like to which even a steel having the tensile strength of less than 400 N/mm² is applicable, and therefore being hardly used as a steel for a welded structure. Further, though the details are explained later, there have been the problems of: not only extremely hindering sulfuric acid resistance in the sulfuric acid concentration range of 10 to 40 mass % when Mo is added excessively within the component range specified in the publication; but also, under some conditions, deteriorating hydrochloric acid resistance to worse than that of a steel according to Japanese Examined Patent Publication No. S43-14585 or an S-TEN 1 steel (a Cu—Sb steel) (Nippon Steel Corporation Product Catalog, sulfuric acid dew-point corrosion resistant steel S-TEN, Cat. No. AC107, 1981, Sixth Edition).

In the case of a sulfuric acid dew-point corrosion resistant stainless steel disclosed in Japanese Unexamined Patent Publication No. H7-316745 and others, there have been the problems of: requiring securing resistance to stress corrosion cracking and crevice corrosion besides general corrosion resistance because stress corrosion cracking and crevice corrosion, together with dew-point corrosion, are caused by the concentration of chloride in a hydrochloric acid dew-point corrosion environment; therefore inevitably requiring an increase in alloying elements; causing the cost to increase further than that of a low alloy steel and strength to increase;

and therefore making it difficult to secure both acid-resistance and cold-workability simultaneously.

Further, in the case of a steel disclosed in Japanese Unexamined Patent Publication No. H9-25536, there has been the problem of only showing sulfuric acid dew-point corrosion resistance and hydrochloric acid dew-point corrosion resistance equal to or inferior to the hydrochloric acid dew-point corrosion resistance of aforementioned S-TEN 1.

Furthermore, in the case of a steel disclosed in Japanese Unexamined Patent Publication No. H10-110237, firstly, there has been the problem of incurring excessive increase of a steelmaking cost because the steel requires ultra-low sulfur. A second problem of the steel, which has newly been found by the present inventors, is that an excessive reduction of sulfur deteriorates sulfuric acid resistance, as mentioned later. A third problem thereof has been that, when the steel is used for a welded structure, though a weld metal also requires ultra-low sulfur at the same level as the steel, it is extremely difficult to attain such ultra-low sulfur when some other requirements such as weld operability are taken into consideration and, therefore, when the steel is used for a welded structure, namely a join, the corrosion resistance of the join is hardly secured. A fourth problem thereof has been that, though the addition of Sn and/or Sb is inevitably required, an excessive addition of Sn and/or Sb conspicuously deteriorates the toughness of a steel sheet as mentioned later and, therefore, the application of the steel to a hot-rolled steel sheet for a welded structure such as a duct or a stack is not practical.

As a result of the study by the present inventors, it has been clarified that the aforementioned S-TEN 1 steel designed by employing the composition of a Cu—Sb steel as the basic composition has the most excellent hydrochloric acid resistance among various sulfuric acid dew-point corrosion resistant steels that have ever been developed.

However, in some waste incinerators for burning vinyl chlorides and kitchen garbage, the concentration of hydrogen chloride in an exhaust gas may sometimes reach 4,000 ppm. For that reason, a novel sulfuric acid dew-point corrosion resistant steel, that: has outstandingly improved hydrochloric acid resistance while the sulfuric acid resistance of an S-TEN steel is maintained; can be produced as a steel for a welded structure and a cold-rolled steel sheet excellent in cold-workability; and is far more economical than a highly corrosion resistant stainless steel excellent in hydrochloric acid resistance, has strongly been desired.

Further, such a low alloy steel is often used for an ordinary welded structure.

In general, in the case where a welded structure is used in a corrosive environment, when the corrosion resistance of a weld differs from that of a base material, the one having inferior corrosion resistance is selectively corroded and the service life of the welded structure is extremely shortened. What is worse, when a weld is selectively corroded, stress concentration occurs at corroded pores and, in the extreme case, the destruction of a structure may be caused. Therefore, when such a low alloy steel is used for a welded structure that cannot ignore corrosion degradation, the corrosion resistance of not only a base material but also a weld must be secured sufficiently.

In smoke exhausting equipment such as a flue and a stack of a coal burning thermal power boiler or a refuse incinerator, sulfuric acid dew-point corrosion and hydrochloric acid dew-point corrosion are caused by sulfur trioxide and hydrogen chloride in an exhaust gas. In such an environment, a sulfuric acid dew-point corrosion resistant steel (refer to, for example, Nippon Steel Corporation, S-TEN Product Catalog, Cat. No. AC107, 1981, Sixth Edition) is used. As a welding material, a welding material for a soft steel and a welding material exclusively used for a sulfuric acid dew-point corrosion resistant steel (refer to, for example, Nippon Steel Welding Products & Engineering Co., LTD., Nittetsu welding Material & Apparatus Handbook, p. 61, p. 164, p. 208 and p. 291) are used.

A welding material exclusively used for a sulfuric acid dew-point corrosion resistant steel has been a material containing Cu itself as a corrosion resistant element or a material containing components of a Cu and Cr. A weld joint formed by using such an existing welding material shows a sufficiently excellent corrosion resistance in a sulfuric acid dew-point corrosion environment caused by the smoke exhaustion equipment of a single-fuel fired boiler for heavy oil. However, the problem of such a weld joint has been that, in an environment of a coal burning boiler, a refuse incinerator, a gasifying fusion furnace or the like, both sulfuric acid dew-point corrosion and hydrochloric acid dew-point corrosion are caused simultaneously, therefore the corrosion resistance of the weld metal at the weld is insufficient, and the weld metal that has corrosion resistance inferior to that of the base material is selectively corroded.

The present invention is intended to solve the above problems and the object thereof is to provide: a low alloy steel and a weld joint thereof excellent in acid dew-point corrosion resistance; specifically, a low alloy steel and a weld joint thereof excellent in resistance to hydrochloric acid and sulfuric acid; and more specifically, a low alloy steel and a weld joint thereof which secure an excellent resistance to sulfuric acid dew-point corrosion and hydrochloric acid dew-point corrosion caused in an atmosphere of a combustion exhaust gas coming mainly from a boiler or a gasifying fusion furnace.

To be more precise, the object of the present invention is to provide a low alloy steel and a weld joint thereof which are used for smoke exhaustion equipment of a boiler wherein fossil fuel such as heavy oil and coal, fuel gas such as liquefied natural gas, non-industrial waste such as municipal refuse, industrial waste such as wood chips, fiber chips, waste oil, plastics, waste tires and medical waste, and sewage sludge are incinerated, the smoke exhausting equipment including a gas duct, a casing, a heat exchanger, a gas-to-gas heater, a wet or dry desulfurizer, an electrostatic precipitator, an induced draft fan, a basket material and a heat conduction element plate of a rotary regenerative air preheater, a cooling tower, a bag filter and a stack. To be still more precise, the object of the present invention is to economically provide: an acid dew-point corrosion resistant low alloy steel and a weld joint thereof excellent in economical efficiency, which show an excellent resistance to sulfuric acid or hydrochloric acid dew-point corrosion caused in smoke exhaustion equipment and are applicable to a welded structure and also to a fin of a heat exchanger tube, a heat conduction element plate of an air preheater and an expansion joint of a flue requiring severe cold-workability; and a sulfuric acid dew-point corrosion resistant low alloy steel and a weld joint thereof excellent in corrosion resistance to hydrochloric acid, which are applicable to a steel pickling tank for receiving pickling liquor composed of either hydrochloric acid or sulfuric acid or a mixture thereof.

DISCLOSURE OF THE INVENTION

The present inventors, as a result of studying metallurgical factors influencing sulfuric acid dew-point corrosion resistance and hydrochloric acid dew-point corrosion resistance, have found that hydrochloric acid dew-point corrosion resistance can be improved remarkably, while an S amount is not regulated to an ultra-low amount that has been required before and sulfuric acid dew-point corrosion resistance superior to that of a sulfuric acid corrosion resistant S-TEN 1 steel (a Cu—Sb steel) is maintained, by adding a very small amount of Mo in such a range that the value of an aftermentioned acid corrosion resistance index AI is positive (zero or larger) to the aforementioned S-TEN 1 steel. The findings by the present inventors related to the present invention are hereunder described in detail. Note that an addition amount of a component element is expressed in terms of mass %.

It has so far been understood that Mo is an element that extremely deteriorates the sulfuric acid resistance of a steel or a copper contained low alloy steel (refer to, for example, Kowaka, Moroishi and Muroya: The Japan Institute of Metals, 1966 Spring Convention Lecture Outline, p. 84 (1966) and Teramae, Kado, Otoguro and Todoroki: Fuji Steel Corporation Technical Report No. 17, p. 103 (1968)). The present inventors focused their attention on the fact that the Mo addition amount was more than 0.1% in the past research of investigating the influence of Mo, and investigated precisely the influence of a minute addition amount of Mo on the behavior of the hydrochloric acid resistance, chloride containing acid corrosion resistance and sulfuric acid resistance of a Cu—Sb steel when the Mo addition amount was not more than 0.1%.

As the results, the following new findings have been obtained:

1) as shown in FIG. 1, there exists a singular point where hydrochloric acid resistance dramatically improves when a very minute amount of Mo (less than 0.01%) is added to a Cu—Sb steel;
2) further, as it is understood from FIG. 2, sulfuric acid resistance also improves by adding a very minute amount of Mo, that has so far been recognized as an element that deteriorates sulfuric acid resistance, to a Cu—Sb steel, in contrast to the past knowledge; and
3) furthermore, from FIG. 2, sulfuric acid resistance deteriorates when Mo is added in excess of a certain amount.

On the basis of the above findings, the present inventors defined the threshold Mo addition amount that did not hinder sulfuric acid resistance (hereunder referred to as "sulfuric acid resistant Mo amount limit") as follows. That was, steels containing Mo and those not containing Mo, both having identical components except for Mo, were compared with each other in terms of sulfuric acid resistance and the upper limit of the Mo amount in which sulfuric acid resistance started to deteriorate was defined as "sulfuric acid resistant Mo amount limit."

A sulfuric acid resistant Mo amount limit has a very clear relationship with the amounts of C and Sb in a steel and is an Mo amount that satisfies AI=0 when an AI value (a sulfuric acid or hydrochloric acid corrosion resistance index) is defined by the following expression <1>, $$AI/10{,}000 = 0.0005 + 0.045 \times Sb\ \% - C\ \% \times Mo\ \% \quad <1>.$$

Here, % means mass %.

In a steel according to the present invention, as shown in FIGS. 1 and 2, though hydrochloric acid corrosion resistance improves with the addition of Mo, an excessive addition amount of Mo exceeding a certain amount significantly deteriorates sulfuric acid corrosion resistance and an Mo amount limit that allows sulfuric acid corrosion resistance to be maintained corresponds to the Mo amount calculated from the expression <1> when the value of AI is set at zero.

When an AI value is less than zero, and though excellent hydrochloric acid resistance is maintained, sulfuric acid resistance deteriorates as it has been reported in prior art. On the other hand, when an AI value is not less than zero, both sulfuric acid resistance and hydrochloric acid resistance improve.

FIG. 3 is a graph explaining the relationship between the sulfuric acid resistant Mo amount limit curve that satisfy AI=0 and sulfuric acid resistance in a Mo—C chart of a C—Cu—Mo steel. In the figure, the left region of the sulfuric acid resistant Mo amount limit curve represents a region wherein AI≧0 is satisfied and both sulfuric acid resistance and hydrochloric acid resistance improve. On the other hand, the right region of the sulfuric acid resistant Mo amount limit curve represents a region wherein an AI value is less than zero and sulfuric acid resistance deteriorates though a good hydrochloric acid resistance is maintained.

As can be understood from the definition of the AI value, when a C amount is fixed, the addition of Sb has the function of increasing the sulfuric acid resistant Mo amount limit. This knowledge has a great significance industrially. The significance is explained hereunder.

The same study as above was carried out on Cu—Mo steels not containing Sb and Cu—Sb—Mo steels. As a result, the hydrochloric acid resistance of the Cu—Mo steels was not so excellent as that of the Cu—Sb—Mo steels and the sulfuric acid resistant Mo amount limit beyond which Mo functions as an element to hinder sulfuric acid resistance was given by the expression C %×Mo %=0.0005%.

FIG. 4 shows the effect of Sb addition and the sulfuric acid resistant Mo amount limit curves of the Cu—Mo steels (not containing Sb) and the Cu—Sb—Mo steels (containing 0.1% Sb and 0.15% Sb). In the case of the Cu—Mo steels (not containing Sb), when a C amount is 0.1%, the sulfuric acid resistant Mo amount limit is 0.005% (reference numeral 1 in FIG. 4). Therefore, when a steel is required to contain around 0.1% C for securing a strength necessary for a steel for a welded structure, in a Cu—Mo steel not containing Sb, it is necessary to control an Mo amount to not more than 0.005% for securing excellent sulfuric acid resistance and hydrochloric acid resistance. However, as the industrially controllable range of an Mo amount in a steel is around ±0.02% as shown by the reference numeral 4 in FIG. 4, it is extremely difficult to control an Mo amount in a steel in the above range industrially.

On the other hand, in the case of the Cu—Mo-0.1% Sb containing steels, when a C amount is 0.1%, the sulfuric acid resistant Mo amount limit is 0.05% (reference numeral 2 in FIG. 4). Therefore, it is enough if Mo of not more than 0.05% is added intentionally. Also, in the case of the Cu—Mo-0.15% Sb containing steels, when a C amount is 0.1%, the sulfuric acid resistant Mo amount limit is 0.075% (reference numeral 3 in FIG. 4). Therefore, it is enough if Mo of not more than 0.075% is added. Accordingly, in these cases, an Mo amount in a steel can be controlled easily in the industrially controllable range of ±0.02% (reference numeral 4 in FIG. 4).

The findings obtained by the precise investigations on the sulfuric acid resistance and hydrochloric acid resistance of the Cu—Mo steels and the Cu—Mo—Sb steels are summarized as follows:

1) A Cu—Mo—Sb steel is outstandingly excellent in hydrochloric acid resistance in comparison with a Cu—Mo steel or a Cu—Sb steel.
2) In a Cu—Mo—Sb steel or a Cu—Mo steel, when Mo is added to the steel in a range not exceeding a certain upper limit, namely in a range not exceeding a sulfuric acid resistant Mo amount limit, Mo which has so far been regarded as harmful functions as an element that improves sulfuric acid resistance.

3) The upper limit of a sulfuric acid resistant Mo amount limit can be expressed by the clear relation with the amounts of C and Sb in a steel, and is given by the expression C %×Mo %≦0.0005+0.045×Sb % in the case of a Cu—Mo—Sb steel and by the expression C %×Mo %≦0.0005 in the case of a Cu—Mo steel. The index that expresses the relation is the aforementioned AI, namely, AI/10,000=0.0005+0.045×Sb %−C %×Mo %, and, when an AI value is zero or more, both hydrochloric acid resistance and sulfuric acid resistance are excellent.

The present inventors, as a result of further studying metallurgical factors influencing the hydrochloric acid corrosion resistance and sulfuric acid corrosion resistance of a weld joint when such a low alloy steel excellent in hydrochloric acid corrosion resistance and sulfuric acid corrosion resistance as described above is used for a welded structure, have found: that a weld joint excellent in hydrochloric acid corrosion resistance and sulfuric acid corrosion resistance can be obtained by employing a low alloy steel composed of an aforementioned composition as a base material and making a weld metal composed of a specific composition on the basis of the knowledge on the improvement of the hydrochloric acid corrosion resistance and sulfuric acid corrosion resistance of a base material, in other words, by 1) making a weld metal composed of a Cu—Mo—Sb containing composition and 2) controlling an AI value in a specific range; and that, preferably, a further excellent weld joint can be obtained by restricting the difference between the AI value of a base material and the AI value of a weld metal in a specific range.

The present invention has been established based on the above findings and the gist thereof is as follows:

(1) A low alloy steel excellent in hydrochloric acid corrosion resistance and sulfuric acid corrosion resistance, characterized in that: said steel contains, in mass,
C: 0.001 to 0.2%,
Si: 0.01 to 2.5%,
Mn: 0.1 to 2%,
Cu: 0.1 to 1%,
Mo: 0.001 to 1%,
Sb: 0.01 to 0.2%,
P: 0.05% or less, and
S: 0.05% or less, with the balance consisting of Fe and unavoidable impurities; and the acid corrosion resistance index AI, which is calculated from the following expression <1>, of said steel is zero or positive, $$AI/10,000 = 0.0005 + 0.045 \times Sb\,\% - C\,\% \times Mo\,\% \quad <1>,$$

where % means mass %.

(2) A low alloy steel excellent in hydrochloric acid corrosion resistance and sulfuric acid corrosion resistance, characterized in that: said steel contains, in mass,
C: 0.001 to 0.2%,
Si: 0.01 to 2.5%,
Mn: 0.1 to 2%,
Cu: 0.1 to 1%,
Mo: 0.001 to 1%,
Sb: 0.01 to 0.2%,
P: 0.05% or less, and
S: 0.05% or less, and further one or more of
Nb: 0.005 to 0.1%,
Ta: 0.005 to 0.1%,
V: 0.005 to 0.1%,
Ti: 0.005 to 0.1%, and
W: 0.05 to 1%, with the balance consisting of Fe and unavoidable impurities; and the acid corrosion resistance index EI, which is calculated from the following expression <2>, of said steel is zero or positive, $$EI/10,000 = 0.0005 + 0.045 \times Sb\,\% - C\,\% \times Mo_{eq} \quad <2>,$$

where % means mass % and $Mo_{eq}$ (mass %) is defined by the following expression, $$Mo_{eq} = Mo\,\% + 5.1 \times (Nb\,\% + Ta\,\%) + 4.2 \times V\,\% + 9.3 \times Ti\,\% + 0.5 \times W\,\%.$$

(3) A low alloy steel excellent in hydrochloric acid corrosion resistance and sulfuric acid corrosion resistance according to the item (1), characterized in that said steel contains S: more than 0.005 to 0.025 mass %.

(4) A low alloy steel excellent in hydrochloric acid corrosion resistance and sulfuric acid corrosion resistance according to the item (2), characterized in that said steel contains S: more than 0.005 to 0.025 mass %.

(5) A low alloy steel excellent in hydrochloric acid corrosion resistance and sulfuric acid corrosion resistance according to any one of the items (1) to (4), characterized in that said steel further contains, in mass, one or more of
Cr: 0.1 to 0.5%,
Ni: 0.1 to 1%,
N: 0.001 to 0.007%,
Al: 0.005 to 0.1%,
Ca: 0.0002 to 0.01%,
Mg: 0.0002 to 0.01%,
REM: 0.0002 to 0.01%,
B: 0.0002 to 0.005%,
La: 0.0002 to 0.01%,
Ce: 0.0002 to 0.01%,
Sn: 0.01 to 0.3%,
Pb: 0.01 to 0.3%,
Se: 0.001 to 0.1%,
Te: 0.001 to 0.1%,
Bi: 0.001 to 0.1%,
Ag: 0.001 to 0.5%, and
Pd: 0.001 to 0.1%.

(6) A weld joint of a low alloy steel excellent in hydrochloric acid corrosion resistance and sulfuric acid corrosion resistance, characterized in that: said weld joint is composed of a base material containing, in mass,
C: 0.001 to 0.2%,
Si: 0.01 to 2.5%,
Mn: 0.1 to 2%,
Cu: 0.1 to 1%,
Mo: 0.001 to 1%,
Sb: 0.01 to 0.2%,
P: 0.05% or less, and
S: 0.05% or less, with the balance consisting of Fe and unavoidable impurities and a weld metal containing, in mass,
C: 0.005 to 0.2%,
Si: 0.01 to 2.5%,
Mn: 0.1 to 2%,
Cu: 0.1 to 1%,
Mo: 0.001 to 0.5%,
Sb: 0.01 to 0.2%,
P: 0.03% or less, and
S: 0.03% or less, with the balance consisting of Fe and unavoidable impurities; and the acid corrosion resistance indexes AI, which are calculated from the following expression <1>, of said base material and weld metal are zero or positive, $$AI/10,000=0.0005+0.045 \times Sb\ \%-C\ \% \times Mo\ \% \qquad <1>,$$

where % means mass %.

(7) A weld joint of a low alloy steel excellent in hydrochloric acid corrosion resistance and sulfuric acid corrosion resistance according to the item (6), characterized in that the absolute value of the difference |ΔAI| between the acid corrosion resistance indexes AI of said base material and weld metal is 20 or less, where |ΔAI|=|AI of a base material−AI of a weld metal|.

(8) A weld joint of a low alloy steel excellent in hydrochloric acid corrosion resistance and sulfuric acid corrosion resistance according to the item (6), characterized in that: said base material contains S: more than 0.005 to 0.025 mass %; and said weld metal contains S: more than 0.005 to 0.02 mass %.

(9) A weld joint of a low alloy steel excellent in hydrochloric acid corrosion resistance and sulfuric acid corrosion resistance according to the item (7), characterized in that: said base material contains S: more than 0.005 to 0.025 mass %; and said weld metal contains S: more than 0.005 to 0.02 mass %.

(10) A weld joint of a low alloy steel excellent in hydrochloric acid corrosion resistance and sulfuric acid corrosion resistance according to the item (6), characterized in that: said base material further contains N: 0.001 to 0.007 mass %; and said weld metal further contains N: 0.001 to 0.02 mass %.

(11) A weld joint of a low alloy steel excellent in hydrochloric acid corrosion resistance and sulfuric acid corrosion resistance according to the item (7), characterized in that: said base material further contains N: 0.001 to 0.007 mass %; and said weld metal further contains N: 0.001 to 0.02 mass %.

(12) A weld joint of a low alloy steel excellent in hydrochloric acid corrosion resistance and sulfuric acid corrosion resistance according to the item (8), characterized in that: said base material further contains N: 0.001 to 0.007 mass %; and said weld metal further contains N: 0.001 to 0.02 mass %.

(13) A weld joint of a low alloy steel excellent in hydrochloric acid corrosion resistance and sulfuric acid corrosion resistance according to the item (9), characterized in that: said base material further contains N: 0.001 to 0.007 mass %; and said weld metal further contains N: 0.001 to 0.02 mass %.

(14) A weld joint of a low alloy steel excellent in hydrochloric acid corrosion resistance and sulfuric acid corrosion resistance, characterized in that: said weld joint is composed of a base material containing, in mass,
C: 0.001 to 0.2%,
Si: 0.01 to 2.5%,
Mn: 0.1 to 2%,
Cu: 0.1 to 1%,
Mo: 0.001 to 1%,
Sb: 0.01 to 0.2%,
P: 0.05% or less, and
S: 0.05% or less, and further one or more of
Nb: 0.005 to 0.1%,
Ta: 0.005 to 0.1%,
V: 0.005 to 0.1%,
Ti: 0.005 to 0.1%, and
W: 0.05 to 1%, with the balance consisting of Fe and unavoidable impurities and a weld metal containing, in mass,
C: 0.005 to 0.2%,
Si: 0.01 to 2.5%,
Mn: 0.1 to 2%,
Cu: 0.1 to 1%,
Mo: 0.001 to 0.5%,
Sb: 0.01 to 0.2%,
P: 0.03% or less, and
S: 0.03% or less, and further one or more of
Nb: 0.005 to 0.1%,
Ta: 0.005 to 0.1%,
V: 0.005 to 0.1%,
Ti: 0.005 to 0.1%, and
W: 0.05 to 1%, with the balance consisting of Fe and unavoidable impurities; and the acid corrosion resistance indexes EI, which are calculated from the following expression <2>, of said base metal and weld metal are zero or positive, $$EI/10,000=0.0005+0.045 \times Sb\ \%-C\ \% \times Mo_{eq} \qquad <2>,$$

where % means mass % and $Mo_{eq}$ (mass %) is defined by the following expression, $$Mo_{eq}=Mo\ \%+5.1 \times (Nb\ \%+Ta\ \%)+4.2 \times V\ \%+9.3 \times Ti\ \%+0.5 \times W\ \%.$$

(15) A weld joint of a low alloy steel excellent in hydrochloric acid corrosion resistance and sulfuric acid corrosion resistance according to the item (14), characterized in that the absolute value of the difference |ΔEI| between the acid corrosion resistance indexes EI of said base material and weld metal is 20 or less, where |ΔEI|=|EI of a base material−EI of a weld metal|.

(16) A weld joint of a low alloy steel excellent in hydrochloric acid corrosion resistance and sulfuric acid corrosion resistance according to the item (14), characterized in that: said base material contains S: more than 0.005 to 0.025 mass %; and said weld metal contains S: more than 0.005 to 0.02 mass %.

(17) A weld joint of a low alloy steel excellent in hydrochloric acid corrosion resistance and sulfuric acid corrosion resistance according to the item (15), characterized in that: said base material contains S: more than 0.005 to 0.025 mass %; and said weld metal contains S: more than 0.005 to 0.02 mass %.

(18) A weld joint of a low alloy steel excellent in hydrochloric acid corrosion resistance and sulfuric acid corrosion resistance according to the item (14), characterized in that: said base material further contains N: 0.001 to 0.007 mass %; and said weld metal further contains N: 0.001 to 0.02 mass %.

(19) A weld joint of a low alloy steel excellent in hydrochloric acid corrosion resistance and sulfuric acid corrosion resistance according to the item (15), characterized in that: said base material further contains N: 0.001 to 0.007 mass %; and said weld metal further contains N: 0.001 to 0.02 mass %.

(20) A weld joint of a low alloy steel excellent in hydrochloric acid corrosion resistance and sulfuric acid corrosion resistance according to the item (16), characterized in that: said base material further contains N: 0.001 to 0.007 mass %; and said weld metal further contains N: 0.001 to 0.02 mass %.

(21) A weld joint of a low alloy steel excellent in hydrochloric acid corrosion resistance and sulfuric acid corrosion resistance according to the item (17), characterized in that:

said base material further contains N: 0.001 to 0.007 mass %; and said weld metal further contains N: 0.001 to 0.02 mass %.

(22) A weld joint of a low alloy steel excellent in hydrochloric acid corrosion resistance and sulfuric acid corrosion resistance according to any one of the items (6) to (21), characterized in that said base material and weld metal further contain, in mass, one or more of Cr: 0.1 to 0.5%,
Ni: 0.1 to 1%,
Al: 0.005 to 0.1%,
Ca: 0.0002 to 0.01%,
Mg: 0.0002 to 0.01%,
REM: 0.0002 to 0.01%,
B: 0.0002 to 0.005%,
La: 0.0002 to 0.01%,
Ce: 0.0002 to 0.01%,
Sn: 0.01 to 0.3%,
Pb: 0.01 to 0.3%,
Se: 0.001 to 0.1%,
Te: 0.001 to 0.1%,
Bi: 0.001 to 0.1%,
Ag: 0.001 to 0.5%, and
Pd: 0.001 to 0.1%.

BRIEF DESCRIPTION OF THE DRAWINGS

FIG. 11 is a graph showing the relationship between the |ΔEI| values and the corrosion rates of the base steels and weld metals of weld joints according to the present invention in sulfuric acid.

BEST MODE FOR CARRYING OUT THE INVENTION

Figure 1:
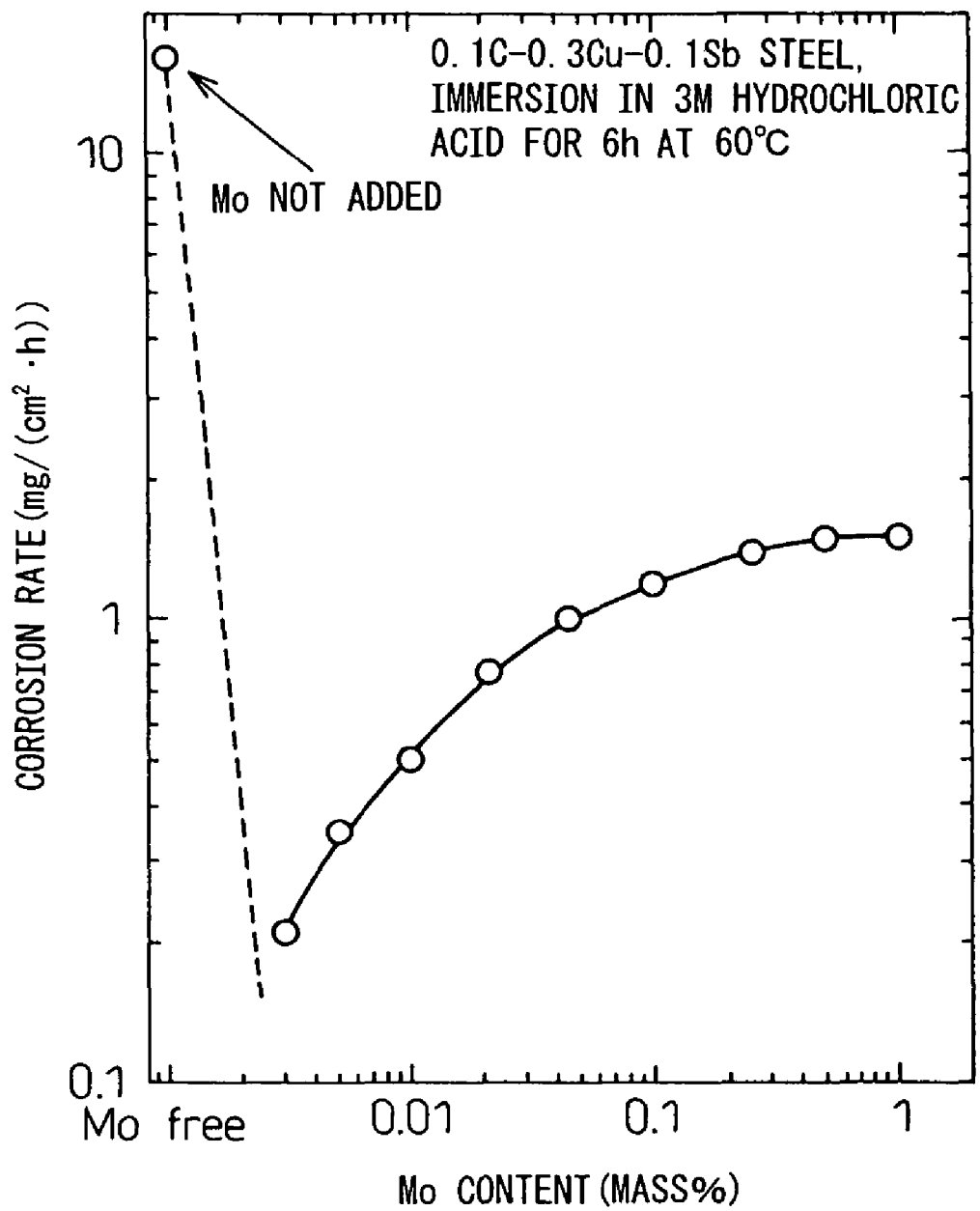
FIG. 1 is a graph showing the influence of Mo addition amounts on the hydrochloric acid resistance of Cu—Sb steels.
Figure 2:
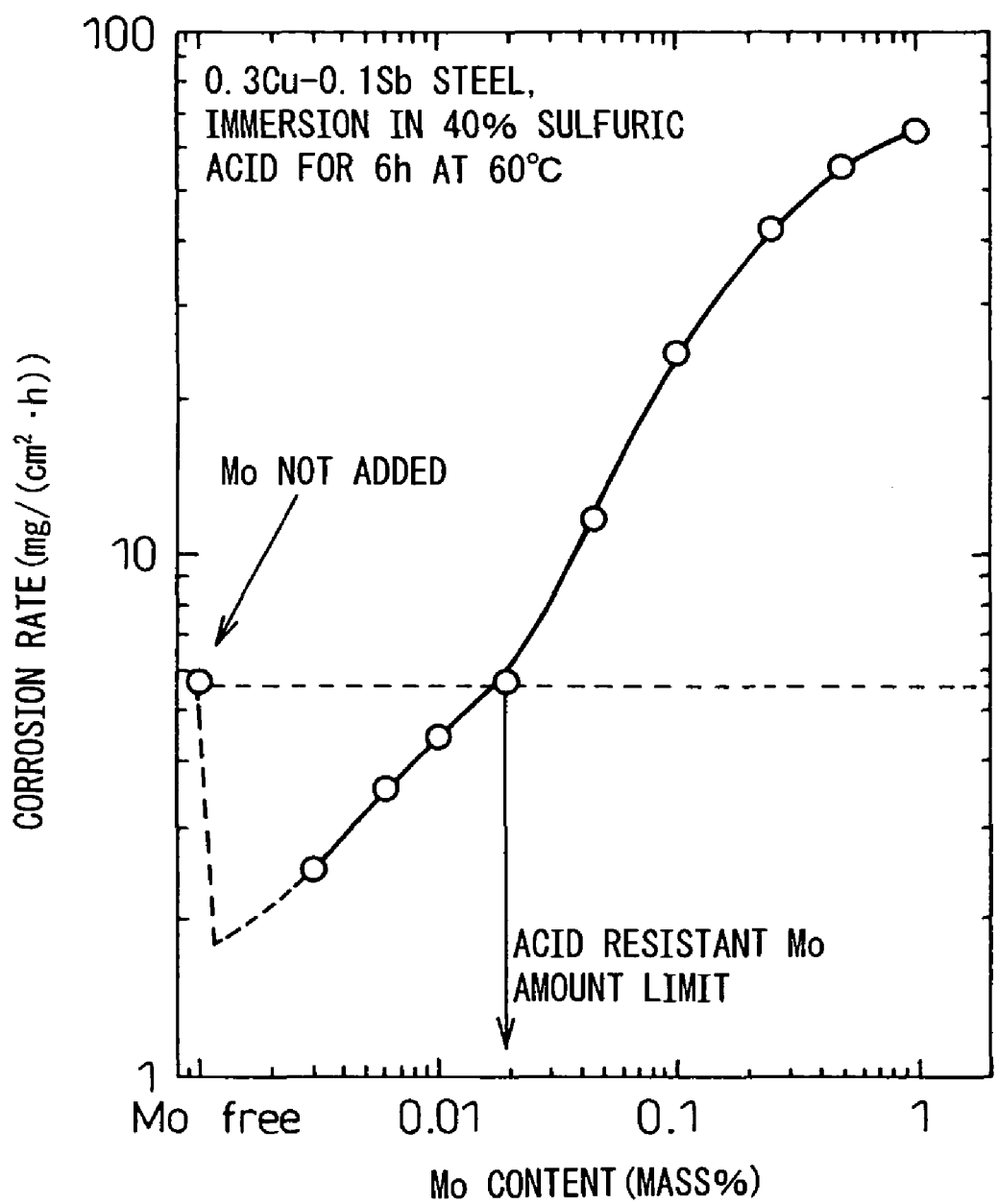
FIG. 2 is a graph showing the influence of Mo addition amounts on the sulfuric acid resistance of Cu—Sb steels.
Figure 3:
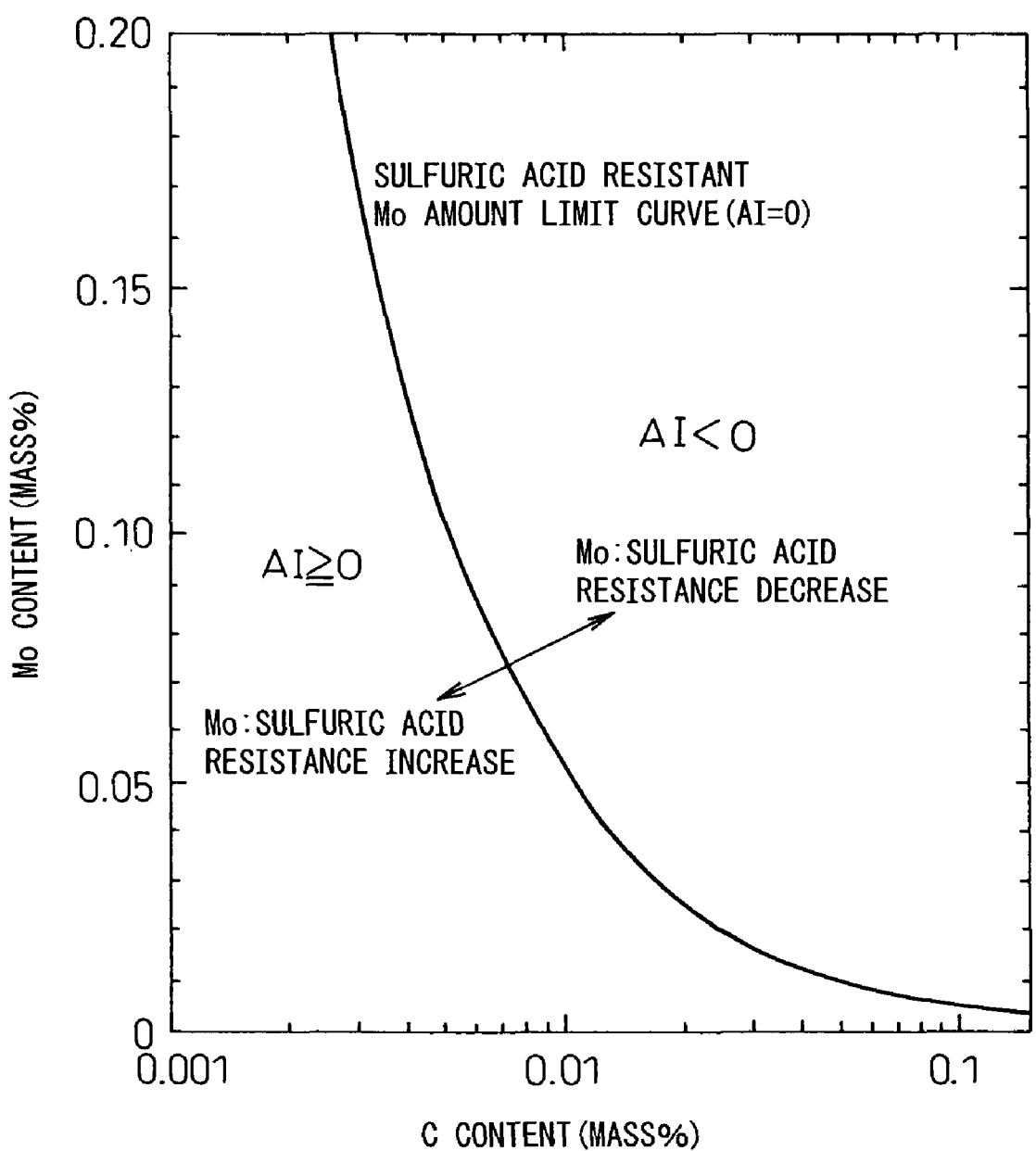
FIG. 3 is a graph schematically showing the influence of the addition amounts of C and Mo on the sulfuric acid resistance of C—Cu—Mo steels.
Figure 4:
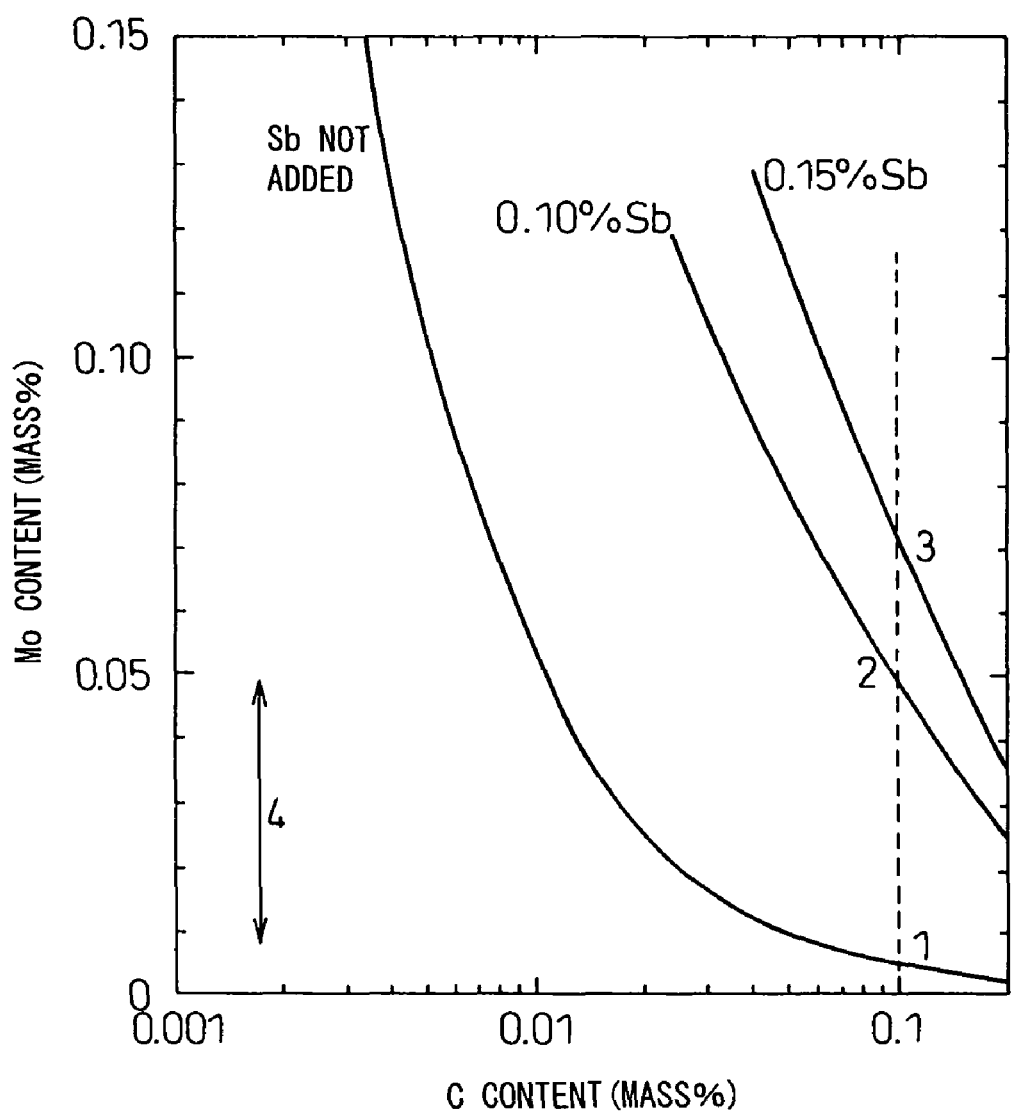
FIG. 4 is a graph showing the influence of Sb amounts on the sulfuric acid resistant Mo amount limit curves of Cu—Mo steels.

The present invention will be explained in detail. Firstly, the component elements and the addition amounts thereof related to a low alloy steel and a base material for a weld joint thereof according to the present invention (hereunder referred to as "invention steels") and the weld metal of a weld joint are explained. Here, % means mass %.

(1) Invention Steels (Low Alloy Steels and Base Materials for Weld Joints Thereof)

C is added by not less than 0.001% since the reduction of a C amount to less than 0.001% significantly deteriorates economical efficiency industrially. A C addition amount of not less than 0.002% is desirable for securing strength. Though C has so far been regarded as an element that deteriorates sulfuric acid dew-point corrosion resistance and hydrochloric acid dew-point corrosion resistance to some extent, according to the present invention, in the case of a Cu—Mo—Sb steel, the deterioration of hydrochloric acid resistance is small if a C amount is not more than 0.06%. Further, with regard to sulfuric acid resistance, though sulfuric acid resistance is not hindered when the expression C %×Mo %≦0.0005+0.045× Sb % is satisfied, sulfuric acid resistance drastically deteriorates when C is added in excess of the amount regulated by the expression. When a steel is used for an application wherein hydrochloric acid resistance is more important, the above-mentioned regulation is not required and a preferable C addition amount is 0.005% or more. On the other hand, when a C amount exceeds 0.2%, weldability, sulfuric acid resistance and hydrochloric acid resistance deteriorate. Therefore, a C amount is limited in the range from 0.001 to 0.2%, in particular, preferably, from 0.02 to 0.15% for the application of a welded structure such as a stack or a duct and from 0.002 to 0.03% for the application of cold-working.

Si is added by not less than 0.01% for deoxidization. An excessive Si addition causes hot-rolling scales to stick to a hot-rolled steel sheet (deterioration of descaling capability) and scale defects called arabesques and pockmarks to increase drastically. Therefore, the upper limit of an Si amount is set at 2.5%. Si has an effect of improving sulfuric acid resistance nearly in proportion to the addition amount thereof, but the effect of Si on hydrochloric acid resistance is hardly observed. Therefore, when hydrochloric acid resistance is regarded to be important, the preferable range of an Si amount is from 0.55 to 1.2%. When weldability, the toughness of a weld and productivity are concerned as a steel for a welded structure, the preferable range thereof is from 0.1 to 0.55%. Further, when scale defects formed during the production of a hot-rolled steel sheet are concerned, the most preferable range thereof is from 0.2 to 0.35%.

Mn is added by not less than 0.1% for adjusting the strength of a steel and the addition amount of 2% is sufficient for the adjustment. Therefore, an Mn amount is limited in the range from 0.1 to 2%. Though the increase of an Mn addition amount tends to deteriorate sulfuric acid resistance to some extent, that does not significantly deteriorate the excellent sulfuric acid resistance of a Cu—Mo—Sb steel according to the present invention and therefore Mn may be added in consideration of the balance between a C amount and an Mn amount conforming to the mechanical properties required of a steel for a welded structure. When corrosion resistance is desired to the maximum, the preferable range of an Mn amount is from 0.1 to 0.7%.

Cu must be added by not less than 0.1% for securing sulfuric acid resistance and hydrochloric acid resistance. However, even when Cu is added in excess of 1%, the effect is almost saturated, and rather strength increases excessively and productivity deteriorates. Therefore, a Cu amount is limited in the range from 0.1 to 1%. Preferably, a Cu addition amount in the range from 0.2 to 0.4% is very excellent in the balance between corrosion resistance and productivity.

Mo is an essential element that significantly improves hydrochloric acid resistance when it is added to a Cu—Sb steel by not less than 0.001%. In the case of producing a steel with a 300 ton converter, for example, when Mo oxide or Mo base metal of 30 kg or more is charged in the converter, the improvement effect appears even when the amount of Mo in the steel is lower than the analyzable lower limit (0.003%) of emission spectral analysis (Quantovac). Therefore, in commercial production, it is enough if the charge of Mo alloy in molten steel is secured regardless of the yield of Mo in the molten steel. Further, when an Mo amount is in the range wherein the expression C %×Mo %≦0.0005+0.045×Sb % is satisfied, Mo functions as an element that improves sulfuric acid resistance and thus not only hydrochloric acid resistance but also sulfuric acid resistance improves. A sulfuric acid resistant Mo amount limit under which sulfuric acid resistance is not hindered is mitigated (increased) as a C amount decreases or an Sb amount increases as it has been stated above. The upper limit of an Mo amount is set at 1% in consideration of the influence on mechanical properties.

Sb must be added by not less than 0.01% for securing sulfuric acid resistance, hydrochloric acid resistance and chloride containing acid corrosion resistance. Sulfuric acid resistance improves as an Sb amount increases. However, the effect is almost saturated with an Sb addition of 0.1%. On the other hand, when Sb is added in excess of 0.2%, hot-workability and the toughness of a steel sheet and a weld joint deteriorate. Therefore, an Sb amount is limited in the range from 0.01 to 0.2%. A preferable range of an Sb amount is from 0.05 to 0.15% in consideration of the balance among corrosion resistance, hot-workability and mechanical properties.

P is an inevitably included impurity element and significantly deteriorates sulfuric acid dew-point corrosion resistance and hydrochloric acid dew-point corrosion resistance. Therefore, a P amount is limited to not more than 0.05%. Preferably, sulfuric acid dew-point corrosion resistance and hydrochloric acid dew-point corrosion resistance are remarkably improved by limiting a P amount to not more than 0.01%. The most preferable range of a P amount is 0.005 to 0.01% in consideration of the burden of a dephosphorising process and economical efficiency.

Figure 5:
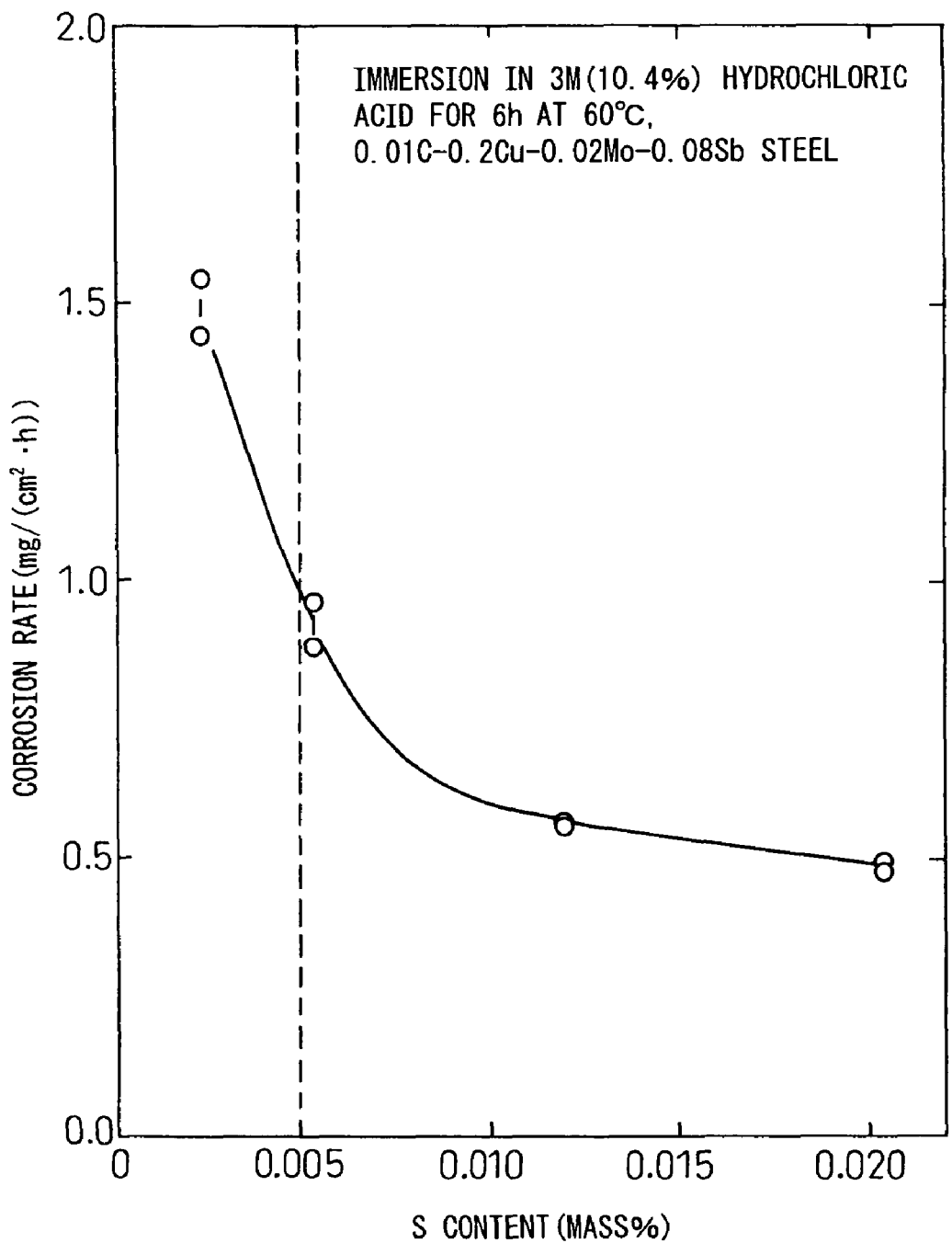
FIG. 5 is a graph showing the influence of S addition amounts on the hydrochloric acid resistance of Cu—Mo—Sb steels.

S is, like P, an inevitably included impurity element and, when it is added in excess of 0.05%, hot-workability and mechanical properties deteriorate. Therefore, the upper limit of an S amount is set at 0.05%. However, as shown in FIG. 5, in the case of a Cu—Mo—Sb steel according to the present invention, sulfuric acid resistance and hydrochloric acid resistance improves remarkably when S is contained in an appropriate amount in the range exceeding 0.005% and therefore it is preferable to contain S by more than 0.005%. However, the effect is saturated even if S is added in excess of 0.025%. Therefore, it is preferable to contain S in the range from more than 0.005 to 0.025%. In particular, the most preferable range of an S amount is from 0.01 to 0.025% in consideration of hydrochloric acid resistance, sulfuric acid resistance, mechanical properties (lamellar tear resistance, etc.) and hot-workability.

In a steel according to the present invention, when an acid corrosion resistance index AI defined by the following expression <1> satisfies AI≧0, extremely excellent hydrochloric acid resistance and sulfuric acid resistance are obtained, $$AI/10,000=0.0005+0.045\times Sb\ \%-C\ \%\times Mo\ \% \qquad <1>.$$

Figure 6:
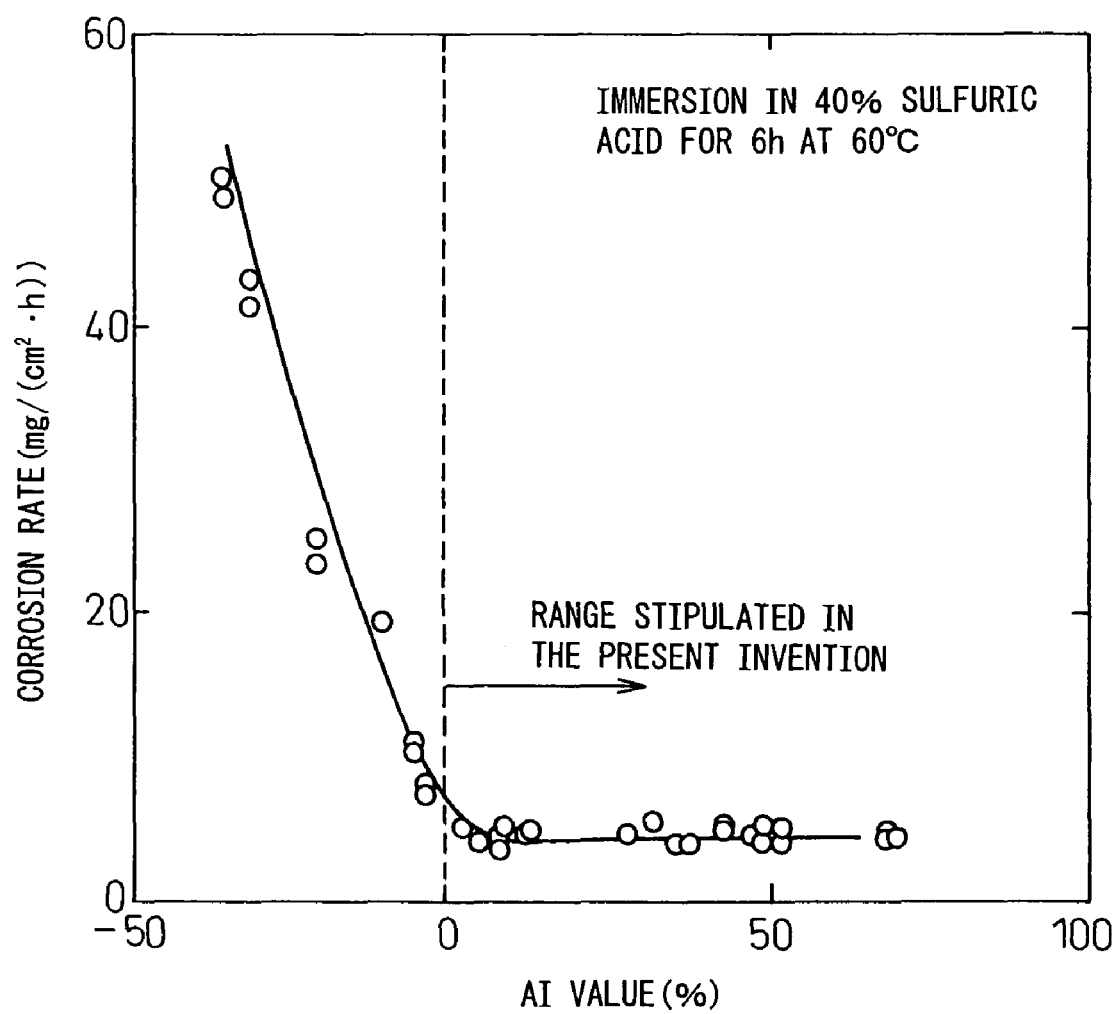
FIG. 6 is a graph showing the relationship between the AI values of Cu—Mo—Sb steels and the corrosion rates thereof in sulfuric acid.

That is, FIG. 6 shows the relationship between AI values and sulfuric acid corrosion rates and, as shown in the figure, it is understood that sulfuric acid resistance improves remarkably when an acid corrosion resistance index AI is zero or positive. Therefore, in the present invention, Sb, C and Mo are added so that an acid corrosion resistance index AI given by the above expression <1> may be zero or positive.

When AI≧0 is satisfied, in other words, C %×Mo %≦0.0005+0.045×Sb % is satisfied, in the case of a cold-rolled steel sheet requiring excellent workability for example, it is preferable that a C amount is as low as not more than 0.01%, and, in this case, when an Sb addition amount is 0.1%, excellent sulfuric acid resistance and hydrochloric acid resistance are obtained simultaneously with the Mo addition amount of not more than 0.5%.

On the other hand, when an aforementioned AI value exceeds 75, namely, when an Sb amount is excessive, not only the effect of improving sulfuric acid resistance and hydrochloric acid resistance is almost saturated but also hot-workability deteriorates. Therefore, it is preferable that the upper limit of an AI value is set at 75.

Further, in a steel according to the present invention, Nb, Ta, V, Ti and/or W are added as occasion demands for the purpose of improving the strength, toughness, weldability and high temperature properties of the steel.

Nb, Ta, V and Ti are elements effective for the improvement of strength and toughness caused by the fractionization of crystal grains and the improvement of high temperature strength when they are added by not less than 0.005%, respectively. Also, they have the effect of improving cold-workability. However, the effects are saturated when an amount of each exceeds 0.1%. Therefore, the addition amount of each of Nb, Ta, V and Ti is limited in the range from 0.005 to 0.1%.

W is effective for the improvement of high temperature strength and hydrochloric acid resistance when it is added by not less than 0.05% and the effects are saturated with a W addition amount of 1%. Therefore, a W addition amount is limited in the range from 0.05 to 1%.

Further, when carbonitride forming elements such as Nb, Ta, V, Ti and W are added excessively, the sulfuric acid corrosion resistance of a steel according to the present invention deteriorates. That is, those elements have the function of lowering a sulfuric acid resistant Mo amount limit and the degree of the lowering is expressed by the following Mo equivalent ($Mo_{eq}$), $$Mo_{eq}(\text{mass \%})=Mo\ \%+5.1\times(Nb\ \%+Ta\ \%)+\\4.2\times V\ \%+9.3\times Ti\ \%+0.5\times W\ \%.$$

When Nb, Ta, V, Ti and W are added, the combination of the components that determines the limit of not hindering sulfuric acid resistance is given by an expanded acid corrosion resistance index EI instead of the aforementioned index AI. An index EI is a function composed of Sb, C and $Mo_{eq}$ (mass %) and given by the following expression <2>, $$EI/10,000=0.0005+0.045\times Sb\ \%-C\ \%\times Mo_{eq}\ \% \qquad <2>.$$

When Nb, Ta, V, Ti and W are added in combination for a certain purpose, by satisfying the relation EI≧0, extremely excellent hydrochloric acid resistance and sulfuric acid resistance are obtained simultaneously.

Figure 7:
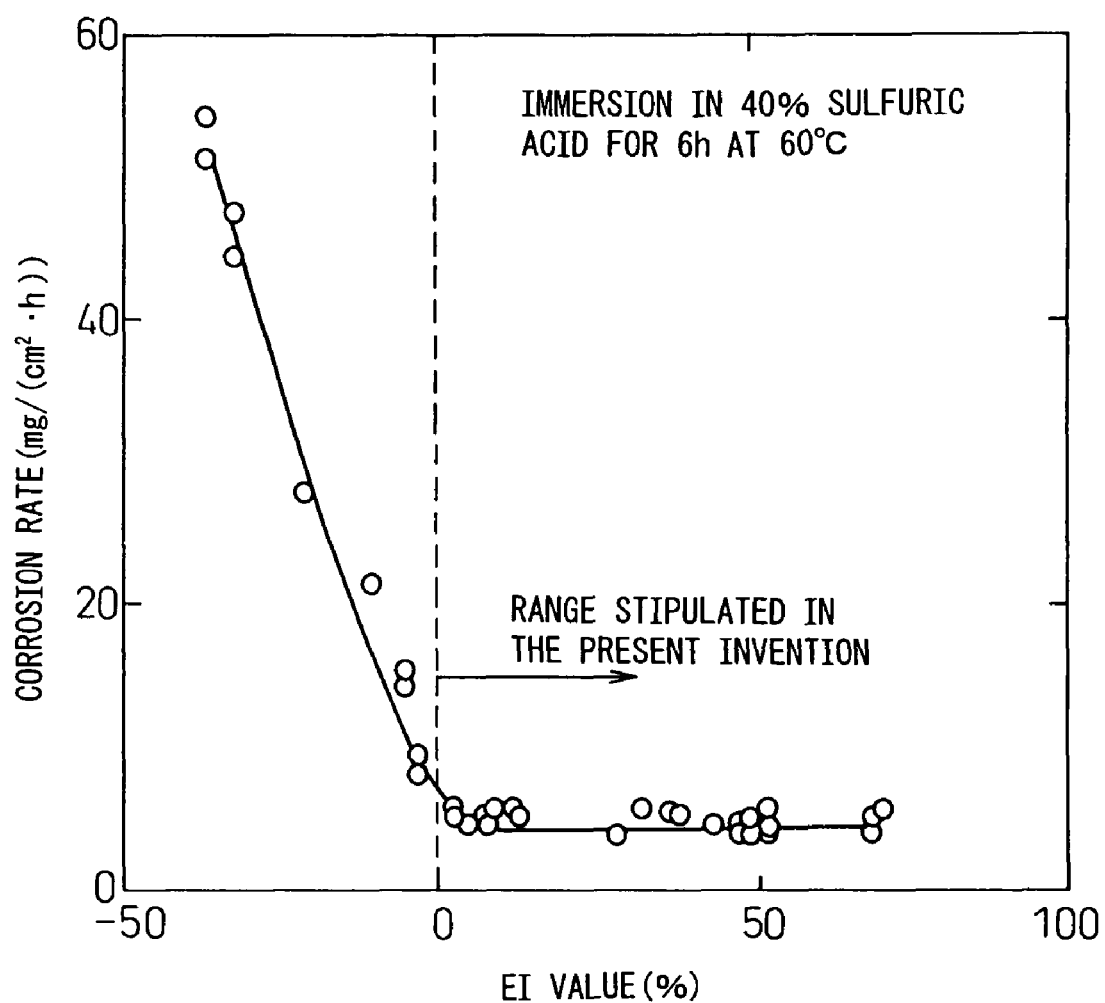
FIG. 7 is a graph showing the relationship between the EI values of Cu—Mo—Sb steels and the corrosion rates thereof in sulfuric acid.

That is, FIG. 7 shows the relationship between EI values and sulfuric acid corrosion rates and, as shown in the figure, it is understood that sulfuric acid resistance improves remarkably when an expanded acid corrosion resistance index EI is zero or positive. Therefore, in a steel according to the present invention, Sb, C and Mo are added so that an expanded acid corrosion resistance index EI given by the above expression <2> may be zero or positive.

On the other hand, when an aforementioned EI value exceeds 75, namely, when an Sb amount is excessive, not only the effect of improving sulfuric acid resistance and hydrochloric acid resistance is almost saturated but also hot-workability deteriorates. Therefore, it is preferable that the upper limit of an EI value is set at 75.

Cr is added by not less than 0.1% as occasion demands for improving weather resistance. However, when Cr is added in excess of 0.5%, particularly the sulfuric acid resistance of a steel according to the present invention deteriorates conspicuously. Therefore, when Cr is added as occasion demands, the upper limit is set at 0.5%. From the viewpoint of further improving sulfuric acid resistance and hydrochloric acid resistance, it is preferable to limit a Cr content to 0.1% or less, or most desirably not to add Cr at all.

Ni is an element that has the function of improving hydrochloric acid resistance and is added by not less than 0.1% as occasion demands for the purpose of preventing surface cracks from occurring during hot-working when Cu and Sb are added to a steel according to the present invention. However, the effect is saturated when Ni is added in excess of 1%. Therefore, an Ni amount is limited in the range from 0.1 to 1%. It is particularly preferable to limit an Ni amount to the range from 0.1% to Cu %×0.5.

N is an inevitably included impurity element that has the function of improving hydrochloric acid resistance and is added by not less than 0.001% as occasion demands. However, an N addition exceeding 0.007% causes surface cracks to occur during slab casting. Therefore, an N amount is limited in the range from 0.001 to 0.007%.

Al is added usually as a deoxidizing element. In a steel according to the present invention, Al is added by not less than 0.005% as occasion demands. However, when Al is added in excess of 0.1%, hydrochloric acid dew-point corrosion resistance and hot-workability deteriorate. Therefore, an Al amount is limited in the range from 0.005 to 0.1%.

Further, Ca, Mg, Ce, La, REM and B are added to a steel according to the present invention as occasion demands.

Ca, Mg, REM and B contribute to the enhancement of the toughness of a steel by the improvement of cleanliness and the fractionization of crystal grains, and are added by 0.0002% or more, respectively, as occasion demands since their addition up to certain upper limits does not influence corrosion resistance. However, when an amount of Ca, Mg, Ce, La or REM exceeds 0.01% or a B amount exceeds 0.005%, corrosion resistance begins to be badly influenced. Therefore, an amount of each of Ca, Mg, Ce, La and REM is limited in the range from 0.0002 to 0.01% and a B amount in the range from 0.0002 to 0.005%.

Further, Sn, Pb, Se, Te and Bi are added to a steel according to the present invention as occasion demands.

Sn and Pb have the function of improving a free-cutting property and must be added by not less than 0.01% respectively for securing the effect. However, when each of the contents of Sn and Pb exceeds 0.3%, hot-workability deteriorates. Therefore, the upper limit of each of their contents is set at 0.3%.

Se, Te and Bi have the function of further improving acid resistance and must be added by not less than 0.001% respectively for securing the effect. However, when each of the contents of Se, Te and Bi exceeds 0.1%, the deterioration of productivity and the increase of a production cost are caused. Therefore, the upper limit of each of their contents is set at 0.1%.

Furthermore, Ag and Pd are added to a steel according to the present invention as occasion demands.

Ag and Pd have the function of improving corrosion resistance in an environment of a high temperature and a high sulfuric acid concentration and must be added by not less than 0.001% respectively for securing the effect. However, when the contents of Ag and Pd exceed 0.5% and 0.1%, respectively, not only the increase of a production cost but also the deterioration of hot-workability is caused. Therefore, the upper limits of the contents of Ag and Pd are set at 0.5% and 0.1%, respectively.

(2) Weld Metal

C is added for securing the strength of a weld joint of a steel for a welded structure. However, when C is added in excess of 0.2%, weldability and sulfuric acid resistance deteriorate. Therefore, a C amount is limited to 0.2% or less. Though a lower C content is desirable from the viewpoint of sulfuric acid resistance and hydrochloric acid resistance, in consideration of strength and economical efficiency, a C amount is limited in the range from 0.005 to 0.2%. In particular, when C coexists with Mo, a C addition amount exceeding 0.2% causes sulfuric acid resistance to deteriorate conspicuously. When the balance between sulfuric acid resistance and hydrochloric acid resistance must be considered, a preferable C amount is 0.05% or less.

Si improves sulfuric acid resistance and hydrochloric acid resistance by the coexistence with Cu when Si is contained by 0.01% or more in a weld metal. Therefore, the lower limit of an Si amount is set at 0.01%. On the other hand, when an Si amount exceeds 2.5%, corrosion resistance does not improve any longer and the toughness of a weld metal deteriorates considerably. Therefore, the upper limit of an Si amount is set at 2.5%. When weld operability and the toughness of a weld must be seriously considered, a preferable range of an Si amount is from 0.1 to 1%.

Mn is added by 0.1% or more for deoxidization and the adjustment of strength and the effects are sufficiently secured with an addition of 2%. Therefore, an Mn amount is limited in the range from 0.1 to 2%.

Cu must be added by 0.1% or more for securing sulfuric acid resistance and hydrochloric acid resistance. However, corrosion resistance is almost saturated even with a Cu addition amount exceeding 1% and an excessive strength increase and solidification cracks are caused instead. Therefore, a Cu amount is limited in the range from 0.1 to 1%. Preferably, a Cu addition amount in the range from 0.25 to 0.75% makes the balance between corrosion resistance and production operability better.

Mo is an indispensable element that improves hydrochloric acid resistance considerably by adding an Mo amount of 0.001% or more to a Cu—Sb containing weld metal. Further, when an Mo amount satisfies the expression C %×Mo %≦0.0005+0.045×Sb %, Mo functions as an element that further improves sulfuric acid resistance and improves sulfuric acid resistance together with the aforementioned improvement of hydrochloric acid resistance. The upper limit of an Mo amount is set at 0.5% in consideration of the influence on the mechanical properties of a weld metal.

Sb is an element that further improves sulfuric acid resistance and hydrochloric acid resistance by the coexistence with Cu when it is added by 0.01% or more. Therefore, the lower limit of an Sb amount is set at 0.01%. A preferable addition amount of Sb is 0.05% or more for securing a sufficient corrosion resistance. On the other hand, the effect is almost saturated when Sb is added by 0.2%. Therefore, an Sb amount is limited in the range from 0.01 to 0.2%. A preferable range of an Sb amount is 0.05 to 0.15% because weld operability deteriorates when an Sb amount in a weld metal exceeds 0.15%.

P is an inevitably included impurity element and deteriorates sulfuric acid resistance and hydrochloric acid resistance conspicuously. Therefore, a P amount is limited to 0.03% or less. Preferably, sulfuric acid resistance and hydrochloric acid resistance are remarkably improved by limiting a P amount to 0.01% or less. A still more preferable upper limit of a P amount is in the range from 0.005 to 0.01% and even 0.005% or less.

S is, like P, an inevitably included impurity element and deteriorates sulfuric acid resistance when the amount exceeds 0.03%. Therefore, the upper limit of an S amount must be set at 0.03% for securing sulfuric acid resistance and hydrochloric acid resistance sufficiently. However, as shown FIG. 5, in a Cu—Mo—Sb steel according to the present invention, sulfuric acid corrosion resistance and hydrochloric acid corrosion resistance improve conspicuously when S is added in excess of 0.005%. For that reason, it is preferable to make also a weld metal contain S by more than 0.005%. However, the effect is saturated when S is added in excess of 0.02%. Moreover, an S amount of 0.02% or less is desirable in consideration of securing the toughness of a weld metal. In particular, when sulfuric acid resistance, hydrochloric acid resistance and mechanical properties are taken into consideration, the most desirable range of an S amount is from more than 0.005 to 0.02%.

In a weld joint according to the present invention, very excellent hydrochloric acid resistance and sulfuric acid resistance are obtained when the acid corrosion resistance index AI, defined by the following expression <1>, of each of a base material and a weld metal satisfies the relation $AI \geq 0$, $$AI/10{,}000 = 0.0005 + 0.045 \times Sb\,\% - C\,\% \times Mo\,\% \qquad <1>.$$

FIG. 6 shows the relationship between AI values and sulfuric acid corrosion rates. Since, as seen in the figure, sulfuric acid resistance improves conspicuously when an acid corrosion resistance index AI is zero or positive, in the present invention, Sb, C and Mo are added also to a weld metal so that an acid corrosion resistance index AI given by the expression <1> may be zero or positive.

When the relation $AI \geq 0$ is satisfied, namely when the expression C %×Mo % $\leq$ 0.0005+0.045×Sb % is satisfied, or for example, when a weld metal contains an Mo amount of 0.5% or less while containing a C amount of 0.01% or less and a Sb amount of 0.1%, excellent sulfuric acid resistance, hydrochloric acid resistance and chloride containing acid corrosion resistance are obtained.

Further, when an aforementioned AI value exceeds 75, namely, when an Sb amount is excessive, not only the effect of improving sulfuric acid resistance, hydrochloric acid resistance and chloride containing acid corrosion resistance is almost saturated but also hot-workability deteriorates. Therefore, it is preferable that the upper limit of an AI value is set at 75.

Further, in a weld joint according to the present invention, it is preferable to set a selective corrosion resistance index |ΔAI| of the weld joint at an appropriate value.

A selective corrosion resistance index |ΔAI| of a weld joint is defined by the following expression <3> composed of an acid corrosion resistance index AI of a base material and an acid corrosion resistance index AI of a weld metal, $$|\Delta AI| = |AI \text{ of a base material} - AI \text{ of a weld metal}| \qquad <3>.$$

Figure 10:
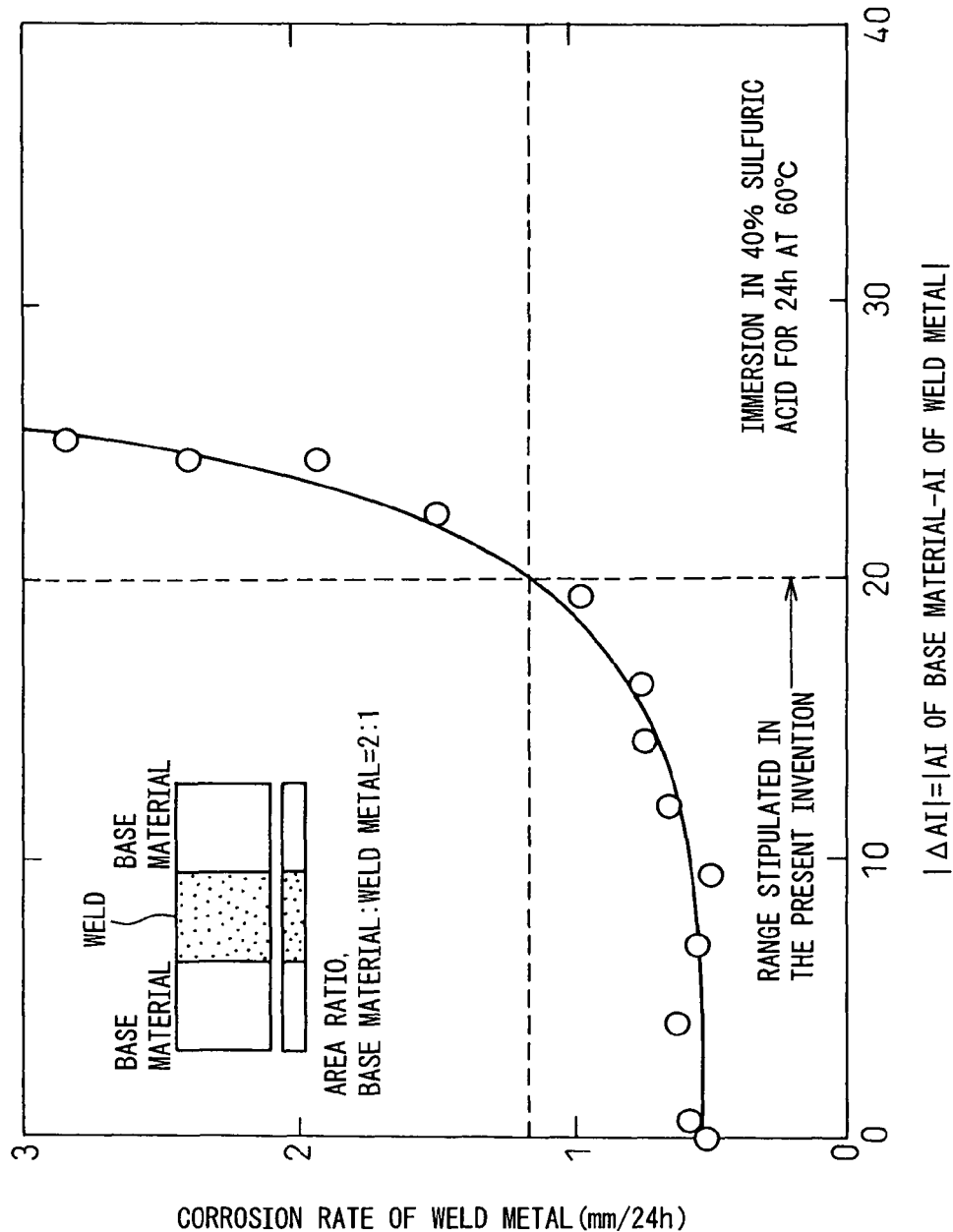
FIG. 10 is a graph showing the relationship between the |ΔAI| values and the corrosion rates of the base steels and weld metals of weld joints according to the present invention in sulfuric acid.

FIG. 10 is a graph showing the relationship between |ΔAI| values and the sulfuric acid corrosion rates of base materials and weld metals. As shown in FIG. 10, when |ΔAI| exceeds 20, the corrosion rate of either of a base material or a weld metal having the lower AI value than the other increases and accelerated corrosion occurs selectively in a sulfuric acid environment. Therefore, a |ΔAI| value is set at 20 or less for preventing a weld joint from corroded selectively at an accelerating rate.

Further, in a weld joint according to the present invention, one or more of Nb, Ta, V, Ti and W are added to the weld metal of the weld joint as occasion demands for the purpose of improving the strength, toughness, high temperature property and the like of the weld joint.

Nb, Ta, V and Ti are elements effective for the improvement of strength and toughness caused by the fractionization of crystal grains and the improvement of high temperature strength when they are added by not less than 0.005%, respectively. However, the effects are saturated when an amount of each exceeds 0.1%. Therefore, the addition amount of each of Nb, Ta, V and Ti is limited in the range from 0.005 to 0.1%.

W is effective for the improvement of high temperature strength and hydrochloric acid resistance when it is added by not less than 0.05% and the effects are saturated with a W addition amount of 1%. Therefore, a W addition amount is limited in the range from 0.05 to 1%.

Further, when carbonitride forming elements such as Nb, Ta, V, Ti and W are added excessively in a weld metal, the sulfuric acid corrosion resistance of a weld joint according to the present invention deteriorates. That is, those elements have the function of lowering sulfuric acid resistant Mo amount limit and the degree of the lowering is expressed by the following Mo equivalent ($Mo_{eq}$)

$$Mo_{eq}(\text{mass }\%) = Mo\,\% + 5.1 \times (Nb\,\% + Ta\,\%) + 4.2 \times V\,\% + 9.3 \times Ti\,\% + 0.5 \times W\,\%.$$

When Nb, Ta, V, Ti and W are added, the combination of the components that determines the limit of not hindering sulfuric acid resistance is given by an expanded acid corrosion resistance index EI instead of the aforementioned index AI. An index EI is a function composed of Sb, C and $Mo_{eq}$ (mass %) and is given by the following expression <2>, $$EI/10{,}000 = 0.0005 + 0.045 \times Sb\,\% - C\,\% \times Mo_{eq}\,\% \qquad <2>.$$

When Nb, Ta, V, Ti and W are added in combination for a certain purpose, by satisfying the relation $EI \geq 0$, extremely excellent hydrochloric acid resistance and sulfuric acid resistance are obtained simultaneously.

That is, FIG. 7 shows the relationship between EI values and sulfuric acid corrosion rates and, as shown in the figure, it is understood that sulfuric acid resistance improves remarkably when an expanded acid corrosion resistance index EI is zero or positive. Therefore, in the weld metal of a weld joint according to the present invention, Sb, C and Mo are added so that an expanded acid corrosion resistance index EI given by the above expression <2> may be zero or positive.

Further, when one or more of Nb, Ta, V, Ti and W are added, an expanded selective corrosion resistance index of a weld joint is defined by employing an expanded acid corrosion resistance index EI, instead of the aforementioned index AI, and a more excellent weld joint is obtained by evaluating the weld joint with the expanded selective corrosion resistance index.

An expanded selective corrosion resistance index |ΔEI| of a weld joint is defined by the following expression <4> composed of an expanded acid corrosion resistance index EI of a base material and an expanded acid corrosion resistance index EI of a weld metal,

|ΔEI|=|EI of a base material−EI of a weld metal|  <4>.

FIG. 11 is a graph showing the relationship between |ΔEI| values and the sulfuric acid corrosion rates of base materials and weld metals. As shown in FIG. 11, when |ΔEI| exceeds 20, the corrosion rate of either of a base material or a weld metal having the lower EI value than the other increases and accelerated corrosion occurs selectively in a sulfuric acid environment. Therefore, it is preferable that a |ΔEI| value is set at 20 or less for preventing a weld joint from corroded selectively at an accelerating rate.

Further, Cr, N, Ni and Al are added to the weld metal of a weld joint according to the present invention as occasion demands.

Cr is added by not less than 0.1% as occasion demands for improving weather resistance and the like. However, when Cr is added in excess of 0.5%, particularly the sulfuric acid resistance of a steel according to the present invention deteriorates conspicuously. Therefore, when Cr is added as occasion demands, the upper limit is set at 0.5%. From the viewpoint of further improving sulfuric acid resistance and hydrochloric acid resistance, it is preferable to limit a Cr content to 0.1% or less or, most desirably, not to add Cr at all.

Ni is an element that has the function of improving hydrochloric acid resistance and is added by not less than 0.1% as occasion demands for the purpose of preventing high temperature cracks of a weld metal from occurring when Cu and Sb are added to a steel according to the present invention. However, the effect is saturated when Ni is added in excess of 1%. Therefore, an Ni amount is limited in the range from 0.1 to 1%. It is particularly preferable to limit an Ni amount to the range from 0.1% to Cu %×0.5.

N is an inevitably included impurity element that has the function of improving hydrochloric acid resistance and is added by not less than 0.001% as occasion demands. However, an N addition amount exceeding 0.02% causes the generation of blowholes in a weld metal and the deterioration of the toughness of a weld metal. Therefore, an N amount is limited in the range from 0.001 to 0.02%.

Al is added by not less than 0.005% as occasion demands. However, when Al is added in excess of 0.1%, hydrochloric acid resistance and the toughness of a weld joint deteriorate. Therefore, an Al amount is limited in the range from 0.005 to 0.1%.

Further, Ca, Mg, Ce, La, REM and B are added to the weld metal of a weld joint according to the present invention as occasion demands.

Ca, Mg, REM and B contribute to the enhancement of the toughness of the weld metal of a weld joint by the improvement of cleanliness and the fractionization of crystal grains, and are added by 0.0002% or more, respectively, as occasion demands since their addition up to certain upper limits does not influence corrosion resistance. However, when an amount of Ca, Mg, Ce, La or REM exceeds 0.01% or a B amount exceeds 0.005%, corrosion resistance begins to be badly influenced. Therefore, an amount of each of Ca, Mg, Ce, La and REM is limited in the range from 0.0002 to 0.01% and a B amount in the range from 0.0002 to 0.005%.

Further, Sn, Pb, Se, Te and Bi are added to the weld metal of a weld joint according to the present invention as occasion demands.

Sn and Pb have the function of improving the operability of the grinder conditioning of a weld bead and must be added by not less than 0.01% respectively for securing the effect. However, when each of the contents of Sn and Pb exceeds 0.3%, the toughness of a weld metal deteriorates. Therefore, the upper limit of each of their contents is set at 0.3%.

Se, Te and Bi have the function of further improving acid resistance and must be added by not less than 0.001% respectively for securing the effect. However, when each of the contents of Se, Te and Bi exceeds 0.1%, the deterioration of the toughness of a weld metal is caused. Therefore, the upper limit of each of their contents is set at 0.1%.

Furthermore, Ag and Pd are added to the weld metal of a weld joint according to the present invention as occasion demands.

Ag and Pd have the function of improving corrosion resistance of the weld metal of a weld joint in an environment of a high temperature and a high sulfuric acid concentration and must be added by not less than 0.001% respectively for securing the effect. However, when the contents of Ag and Pd exceed 0.5% and 0.1%, respectively, not only the increase of a cost but also the deterioration of weld operability is caused. Therefore, the upper limits of the contents of Ag and Pd are set at 0.5% and 0.1%, respectively.

Next, preferable methods for producing steels according to the present invention are explained hereunder. A preferable reheating temperature after continuous casting or breakdown rolling is 1,000° C. or higher from the viewpoint of a rolling load and the like. However, when a steel is reheated to a temperature exceeding 1,300° C., the coarsening of crystal grains and the increase of decarburization and oxide scales are caused excessively. Therefore, a preferable reheating temperature is limited in the range from 1,000° C. to 1,300° C.

When a finishing temperature at hot rolling is lower than 800° C., the formation of unevenly mixed grains is unavoidable. On the other hand, when it exceeds 1,000° C., coarse grains are formed. Therefore, it is preferable that a hot-rolling finishing temperature is in the range from 800° C. to 1,000° C. Thereafter, the steel sheet is cooled in the air for making the microstructure thereof mainly composed of ferrite. Note that, in the hot rolling of the so-called thin steel sheet, since there is a concern that the cooling rate may be too high, the steel sheet is coiled in the temperature range from 600° C. to 750° C. and then cooled in the air or in a furnace. Further, in the case of the production of a cold-rolled steel sheet, it is preferable that a hot-rolled steel sheet is, after cooled in the air at hot rolling, subjected to cold rolling at a reduction ratio in the range from 30 to 90% and subsequently continuous annealing or box annealing in the temperature range from 700° C. to 900° C.

A steel according to the present invention, after being produced into a steel ingot, may be used by being formed into steel sheets, bars and wires, section steels, sheet piles or the like through hot rolling, forging, cold rolling, wire drawing or the like, for example. Further, they may be formed into prescribed shapes through pressing, etc. or subsequently formed into final products through processing and/or welding. Furthermore, a steel sheet may be firstly formed into a steel pipe, for example an electric resistance welded steel pipe or the like, and thereafter used for a final product through secondary processing and/or welding, etc. Still further, any optimum production processes including other processes may be selected in consideration of costs and the restrictions of existing equipment, and any processes may be selected as long as a steel according to the present invention may be produced.

Further, a weld joint according to the present invention shows excellent sulfuric acid corrosion resistance and hydrochloric acid corrosion resistance and is quite appropriate when the aforementioned steel according to the present invention is used in the weld joint by employing one of various welding methods. A weld joint according to the present invention is formed by welding steel materials formed into various shapes or steel materials formed into prescribed shapes through further processing the steel materials by employing one of various welding methods. In general, the aforementioned steel materials, after appropriate edge preparation if necessary, may be welded by employing any of various methods such as; arc welding in the atmosphere or an atmosphere containing shielding gas, arc welding such as submerged arc welding, plasma arc welding, electron beam welding, and the like. In that case, a weld joint according to the present invention may be formed by adjusting the composition of a weld metal by means of selecting; the composition of the core wire of a welding rod or a welding wire, the compositions of the coating material of a welding rod and flux, a welding atmosphere, and/or the like.

A steel or a weld joint according to the present invention may be processed into a steel material having the surfaces containing chemical components stipulated in the claims of the present invention by: applying an alloy containing necessary elements on the surface of an alloy having an appropriate composition by a plating method, cladding method or the like; and diffusing the elements by an appropriate treatment such as heat treatment. Further, when a steel or a weld joint according to the present invention is used, any anticorrosive measure may be employed, including surface treatment, coating, electric protection, or the combination thereof, and the application of an anticorrosive agent, and the employment of any of the above anticorrosive measures does not deviate from the scope of the present invention.

EXAMPLE

Example 1

Steels containing chemical components shown in Tables 1, 2 (sequel 1 of Table 1), 3 (sequel 2 of Table 1) and 4 (sequel 3 of Table 1) were melted and refined in a 50 kg vacuum melting furnace, the steel ingots were processed into slabs, and the slabs were reheated and thereafter hot rolled into hot-rolled steel sheets 6 mm in thickness in the finishing temperature range from 800° C. to 900° C. and then cooled in the air. Test pieces for corrosion tests and tensile tests were sampled from the hot-rolled steel sheets. Further, some hot-rolled steel sheets were pickled, cold rolled into cold-rolled steel sheets 1.2 mm in thickness, and thereafter annealed in a salt bath for 60 sec. at a temperature of 700° C. Then, test pieces for tensile tests were sampled from the cold-rolled steel sheets.

TABLE 1

Chemical components of specimen

| | | C | Si | Mn | P | S | Cu | Cr | Ni | Mo | Sb | Al | N | Nb | V | Ti | Others | Al | (Mass %) El |
|---|---|---|---|---|---|---|---|---|---|---|---|---|---|---|---|---|---|---|---|
| Com- parative spec- imen | A1 | 0.160 | 0.03 | 0.23 | 0.021 | 0.015 | 0.02 | — | 0.00 | — | 0.001 | 0.025 | 0.0045 | — | — | — | — | 5.5 | |
| | A2 | 0.090 | 0.35 | 0.42 | 0.019 | 0.014 | 0.34 | — | 0.15 | — | 0.100 | 0.025 | 0.0040 | — | — | — | — | 50.0 | |
| | A3 | 0.100 | 0.21 | 0.75 | 0.014 | 0.012 | 0.30 | 0.88 | 0.15 | — | — | 0.030 | 0.0045 | — | — | 0.040 | — | | −371.0 |
| | A4 | 0.080 | 0.33 | 0.63 | 0.008 | 0.006 | 0.31 | 0.95 | 0.15 | — | 0.060 | 0.035 | 0.0040 | — | — | — | — | 32.0 | |
| | A5 | 0.110 | 0.35 | 0.45 | 0.005 | 0.010 | 0.34 | 0.75 | 0.21 | 0.070 | 0.120 | 0.025 | 0.0045 | — | — | — | Sn: 0.04 | −18.0 | |
| | A6 | 0.100 | 0.45 | 0.55 | 0.015 | 0.015 | 0.39 | 0.81 | 0.21 | 0.080 | — | 0.030 | 0.0045 | — | — | — | — | −75.0 | |
| | A7 | 0.090 | 0.35 | 0.40 | 0.021 | 0.006 | 0.29 | — | 0.19 | — | 0.120 | 0.035 | 0.0045 | — | — | — | Sn: 0.06 | 59.0 | |
| | A8 | 0.055 | 0.41 | 0.45 | 0.016 | 0.020 | 0.29 | 1.13 | 0.00 | — | 0.000 | 0.025 | 0.0045 | — | — | — | — | 5.0 | |
| | A9 | 0.090 | 0.25 | 0.35 | 0.055 | 0.010 | 0.31 | — | 0.15 | 0.030 | 0.090 | 0.027 | 0.0045 | — | — | — | — | 18.5 | |
| | A11 | 0.090 | 0.25 | 0.35 | 0.015 | 0.055 | 0.34 | — | 0.18 | 0.030 | 0.095 | 0.027 | 0.0040 | — | — | — | — | 20.8 | |
| | A12 | 0.090 | 0.40 | 0.55 | 0.012 | 0.009 | 0.08 | — | 0.20 | 0.100 | 0.011 | 0.030 | 0.0050 | — | — | — | — | −80.1 | |
| | A13 | 0.003 | 0.25 | 0.50 | 0.006 | 0.008 | 0.35 | — | 0.38 | 0.550 | 0.010 | 0.028 | 0.0045 | — | — | — | — | −7.0 | |
| | A14 | 0.003 | 0.25 | 0.50 | 0.006 | 0.008 | 0.35 | — | 0.38 | — | 0.010 | 0.028 | 0.0045 | — | — | — | — | 9.5 | |
| | A15 | 0.030 | 0.25 | 0.35 | 0.010 | 0.012 | 0.35 | — | 0.15 | 0.050 | — | 0.030 | 0.0040 | — | — | — | — | −10.0 | |
| | A16 | 0.003 | 0.25 | 0.35 | 0.010 | 0.012 | 0.35 | — | 0.15 | 0.050 | — | 0.030 | 0.0040 | — | — | — | — | 3.5 | |
| | A17 | 0.090 | 0.25 | 0.35 | 0.015 | 0.003 | 0.34 | — | 0.18 | 0.150 | 0.095 | 0.027 | 0.0040 | — | — | — | — | −87.3 | |
| | A18 | 0.090 | 0.25 | 0.35 | 0.015 | 0.003 | 0.34 | — | 0.18 | 0.150 | 0.095 | 0.027 | 0.0040 | — | — | — | B: 0.0010 | −87.3 | |
| | A21 | 0.006 | 0.43 | 0.42 | 0.009 | 0.009 | 0.30 | — | 0.00 | 0.100 | — | 0.027 | 0.0040 | — | — | — | — | −1.0 | |

Underlined numeral: Outside the range specified in the present invention
— Horizontal bar in a box: Not added

TABLE 2

Chemical components of specimen (sequel 1 of Table 1)

| | | C | Si | Mn | P | S | Cu | Cr | Ni | Mo | Sb | Al | N | Nb | V | Ti | Others | Al | (Mass %) El |
|---|---|---|---|---|---|---|---|---|---|---|---|---|---|---|---|---|---|---|---|
| Com- para- tive spec- imen | B1 | 0.100 | 0.25 | 0.35 | 0.010 | 0.011 | 0.31 | — | 0.18 | 0.090 | 0.110 | 0.028 | 0.0035 | — | — | — | — | −35.5 | |
| | B2 | 0.090 | 0.25 | 0.35 | 0.010 | 0.011 | 0.31 | — | 0.18 | 0.090 | 0.140 | 0.028 | 0.0035 | — | — | — | — | −13.0 | |
| | B3 | 0.050 | 0.25 | 0.50 | 0.010 | 0.011 | 0.31 | — | 0.18 | 0.120 | 0.110 | 0.028 | 0.0035 | — | — | — | — | −5.5 | |
| | B4 | 0.050 | 0.25 | 0.50 | 0.010 | 0.015 | 0.31 | — | 0.18 | 0.490 | 0.110 | 0.028 | 0.0035 | — | — | — | — | −190.5 | |
| | B5 | 0.030 | 0.25 | 0.60 | 0.010 | 0.011 | 0.31 | — | 0.18 | 0.250 | 0.110 | 0.028 | 0.0035 | — | — | — | — | −20.5 | |
| | B6 | 0.030 | 0.25 | 0.60 | 0.010 | 0.020 | 0.31 | — | 0.18 | 0.250 | 0.110 | 0.028 | 0.0035 | — | — | — | — | −20.5 | |
| | B7 | 0.003 | 0.25 | 0.50 | 0.006 | 0.011 | 0.35 | — | 0.38 | 0.350 | 0.010 | 0.028 | 0.0045 | 0.005 | — | — | — | | −1.8 |

TABLE 2-continued

Chemical components of specimen (sequel 1 of Table 1)

| | C | Si | Mn | P | S | Cu | Cr | Ni | Mo | Sb | Al | N | Nb | V | Ti | Others | Al | (Mass %) El |
|---|---|---|---|---|---|---|---|---|---|---|---|---|---|---|---|---|---|---|
| B8 | 0.100 | 0.25 | 0.35 | 0.010 | 0.011 | 0.31 | — | 0.18 | 0.050 | 0.110 | 0.028 | 0.0035 | — | 0.005 | — | — | | −16.5 |
| B9 | 0.100 | 0.25 | 0.35 | 0.010 | 0.011 | 0.31 | — | 0.18 | 0.030 | 0.150 | 0.028 | 0.0035 | — | — | 0.005 | — | | −4.5 |
| B10 | 0.050 | 0.25 | 0.50 | 0.010 | 0.006 | 0.31 | — | 0.18 | 0.070 | 0.150 | 0.028 | 0.0035 | 0.010 | 0.010 | — | — | | −9.0 |
| B11 | 0.050 | 0.25 | 0.50 | 0.010 | 0.011 | 0.31 | — | 0.18 | 0.210 | 0.150 | 0.028 | 0.0035 | — | 0.010 | 0.010 | — | | −100.5 |
| B12 | 0.030 | 0.25 | 0.60 | 0.010 | 0.011 | 0.31 | — | 0.18 | 0.210 | 0.150 | 0.028 | 0.0035 | 0.010 | — | 0.015 | — | | −48.1 |
| B13 | 0.030 | 0.25 | 0.60 | 0.010 | 0.011 | 0.31 | — | 0.18 | 0.100 | 0.110 | 0.028 | 0.0035 | 0.012 | — | 0.005 | — | | −8.0 |
| B14 | 0.009 | 0.25 | 0.50 | 0.006 | 0.011 | 0.35 | — | 0.38 | 0.500 | 0.110 | 0.028 | 0.0045 | — | 0.020 | 0.010 | — | | −6.5 |

Underlined numeral: Outside the range specified in the present invention

TABLE 3

Chemical components of specimen (sequel 2 of Table 1)

| | | C | Si | Mn | P | S | Cu | Cr | Ni | Mo | Sb | Al | N | Nb | V | Ti | Others | Al | (Mass %) El |
|---|---|---|---|---|---|---|---|---|---|---|---|---|---|---|---|---|---|---|---|
| In- | C1 | 0.200 | 0.02 | 0.35 | 0.049 | 0.015 | 0.10 | <0.02 | 0.10 | 0.001 | 0.010 | 0.004 | 0.0035 | — | — | — | — | 7.5 | |
| ventive | C2 | 0.001 | 0.25 | 0.35 | 0.012 | 0.009 | 0.30 | <0.02 | 0.15 | 0.120 | 0.095 | 0.028 | 0.0045 | — | — | — | — | 46.6 | |
| spec- | C3 | 0.100 | 0.25 | 0.40 | 0.009 | 0.015 | 0.31 | <0.02 | 0.18 | 0.050 | 0.110 | 0.028 | 0.0035 | — | — | — | — | 4.5 | |
| imen | C4 | 0.050 | 0.26 | 0.75 | 0.017 | 0.006 | 0.29 | <0.02 | 0.20 | 0.120 | 0.150 | 0.028 | 0.0050 | — | — | — | — | 12.5 | |
| | C5 | 0.003 | 0.21 | 0.45 | 0.005 | 0.009 | 0.31 | <0.02 | 0.29 | 0.005 | 0.150 | 0.035 | 0.0045 | — | — | — | — | 72.4 | |
| | C6 | 0.003 | 0.21 | 0.35 | 0.005 | 0.008 | 0.29 | <0.02 | 0.31 | 0.010 | 0.110 | 0.035 | 0.0045 | — | — | — | — | 54.2 | |
| | C7 | 0.003 | 0.21 | 0.35 | 0.006 | 0.008 | 0.30 | <0.02 | 0.31 | 0.050 | 0.110 | 0.035 | 0.0045 | — | — | — | — | 53.0 | |
| | C8 | 0.003 | 0.21 | 0.45 | 0.004 | 0.009 | 0.40 | <0.02 | 0.29 | 0.100 | 0.150 | 0.035 | 0.0045 | — | — | — | — | 69.5 | |
| | C9 | 0.003 | 0.21 | 0.35 | 0.007 | 0.008 | 0.51 | <0.02 | 0.31 | 0.250 | 0.110 | 0.035 | 0.0045 | — | — | — | — | 47.0 | |
| | C10 | 0.003 | 0.21 | 0.35 | 0.005 | 0.008 | 0.55 | <0.02 | 0.31 | 0.500 | 0.099 | 0.035 | 0.0045 | — | — | — | — | 34.6 | |
| | C11 | 0.030 | 0.25 | 0.85 | 0.010 | 0.010 | 0.51 | 0.49 | 0.31 | 0.090 | 0.110 | 0.035 | 0.0045 | — | — | — | — | 27.5 | |
| | C12 | 0.030 | 0.27 | 0.35 | 0.005 | 0.010 | 0.51 | 0.25 | 0.31 | 0.090 | 0.150 | 0.035 | 0.0045 | — | — | — | — | 45.5 | |
| | C13 | 0.030 | 0.25 | 0.89 | 0.010 | 0.003 | 0.39 | 0.01 | 0.18 | 0.120 | 0.095 | 0.025 | 0.0045 | — | — | — | — | 11.8 | |
| | C14 | 0.030 | 0.25 | 0.89 | 0.010 | 0.015 | 0.39 | 0.01 | 0.18 | 0.120 | 0.095 | 0.025 | 0.0045 | — | — | — | — | 11.8 | |
| | C15 | 0.100 | 0.25 | 0.35 | 0.010 | 0.010 | 0.31 | 0.01 | 0.18 | 0.020 | 0.095 | 0.025 | 0.0045 | — | — | — | — | 27.8 | |
| | C16 | 0.100 | 0.25 | 0.35 | 0.010 | 0.010 | 0.31 | 0.01 | 0.18 | 0.040 | 0.095 | 0.025 | 0.0045 | — | — | — | Sn: 0.04 | 7.8 | |
| | C17 | 0.100 | 0.25 | 0.35 | 0.010 | 0.010 | 0.31 | 0.01 | 0.18 | 0.003 | 0.149 | 0.025 | 0.0045 | 0.010 | — | — | — | | 18.1 |
| | C18 | 0.100 | 0.25 | 0.35 | 0.010 | 0.010 | 0.31 | 0.01 | 0.18 | 0.050 | 0.149 | 0.025 | 0.0045 | — | 0.005 | — | — | | 1.0 |
| | C19 | 0.100 | 0.25 | 0.35 | 0.010 | 0.010 | 0.31 | 0.01 | 0.18 | 0.070 | 0.149 | 0.025 | 0.0045 | — | — | — | B: 0.0010 | 2.0 | |
| | C20 | 0.160 | 0.25 | 0.51 | 0.010 | 0.010 | 0.98 | 0.01 | 0.49 | 0.010 | 0.095 | 0.025 | 0.0045 | — | — | — | — | 31.8 | |
| | C21 | 0.030 | 0.25 | 0.51 | 0.010 | 0.010 | 0.98 | 0.01 | 0.49 | 0.010 | 0.095 | 0.025 | 0.0045 | — | — | — | — | 44.8 | |
| | C22 | 0.100 | 0.25 | 0.35 | 0.010 | 0.010 | 0.31 | 0.01 | 0.18 | 0.050 | 0.195 | 0.025 | 0.0045 | — | — | — | — | 42.8 | |
| | C23 | 0.100 | 0.25 | 0.35 | 0.010 | 0.010 | 0.31 | 0.01 | 0.18 | 0.050 | 0.195 | 0.025 | 0.0045 | — | — | — | — | 42.8 | |
| | C24 | 0.003 | 0.25 | 0.35 | 0.006 | 0.010 | 0.32 | 0.01 | 0.20 | 0.040 | 0.100 | 0.025 | 0.0045 | — | — | — | B: 0.0010 | 48.8 | |

Underlined numeral: Outside the range specified in the present invention

TABLE 4

Chemical components of specimen (sequel 3 of Table 1)

| | | C | Si | Mn | P | S | Cu | Cr | Ni | Mo | Sb | Al | N | Nb | V | Ti | Others | Al | (Mass %) El |
|---|---|---|---|---|---|---|---|---|---|---|---|---|---|---|---|---|---|---|---|
| In- | C25 | 0.003 | 0.25 | 0.35 | 0.006 | 0.010 | 0.32 | 0.01 | 0.20 | 0.040 | 0.100 | 0.025 | 0.0045 | — | — | — | Ca: 0.0005 | 48.8 | |
| ven- | C26 | 0.003 | 0.25 | 0.35 | 0.006 | 0.010 | 0.32 | 0.01 | 0.20 | 0.040 | 0.100 | 0.025 | 0.0045 | — | — | 0.050 | — | | 34.7 |
| tive | C27 | 0.003 | 0.25 | 0.35 | 0.006 | 0.010 | 0.32 | 0.49 | 0.20 | 0.040 | 0.100 | 0.025 | 0.0045 | 0.010 | — | 0.020 | — | | 41.6 |
| spec | C28 | 0.003 | 0.25 | 0.35 | 0.006 | 0.010 | 0.32 | 0.01 | 0.20 | 0.040 | 0.100 | 0.025 | 0.0045 | — | — | — | Sn: 0.04 | 48.8 | |
| imen | C29 | 0.003 | 0.25 | 0.35 | 0.006 | 0.010 | 0.32 | 0.01 | 0.20 | 0.040 | 0.100 | 0.025 | 0.0045 | — | — | — | Mg: 0.0010 | 48.8 | |
| | C30 | 0.003 | 0.25 | 0.35 | 0.006 | 0.010 | 0.32 | 0.01 | 0.20 | 0.040 | 0.100 | 0.025 | 0.0045 | — | — | — | W: 0.05 | 48.8 | |
| | C31 | 0.003 | 0.25 | 0.35 | 0.006 | 0.010 | 0.32 | 0.01 | 0.20 | 0.040 | 0.100 | 0.025 | 0.0045 | — | — | — | — | 48.8 | |
| | C32 | 0.120 | 0.25 | 0.35 | 0.010 | 0.010 | 0.31 | 0.01 | 0.18 | 0.040 | 0.100 | 0.025 | 0.0040 | — | — | — | — | 2.0 | |
| | C33 | 0.110 | 0.40 | 0.25 | 0.018 | 0.015 | 0.33 | 0.01 | 0.05 | 0.050 | 0.130 | 0.010 | 0.0040 | — | — | — | Sn: 0.02 | 8.5 | |
| | C34 | 0.030 | 0.30 | 0.90 | 0.010 | 0.006 | 0.32 | 0.01 | 0.20 | 0.040 | 0.100 | 0.025 | 0.0045 | — | — | — | — | 38.0 | |
| | C35 | 0.030 | 0.29 | 0.95 | 0.010 | 0.010 | 0.31 | 0.01 | 0.18 | 0.053 | 0.120 | 0.025 | 0.0040 | — | — | 0.015 | — | | 0.8 |
| | C36 | 0.030 | 0.31 | 0.95 | 0.006 | 0.012 | 0.33 | 0.01 | 0.17 | 0.049 | 0.100 | 0.025 | 0.0040 | — | — | — | — | 35.3 | |
| | C37 | 0.030 | 0.31 | 0.95 | 0.006 | 0.012 | 0.33 | 0.01 | 0.17 | 0.049 | 0.100 | 0.025 | 0.0040 | — | — | — | Ta: 0.05 | 35.3 | |
| | C38 | 0.050 | 0.31 | 0.95 | 0.006 | 0.012 | 0.33 | 0.01 | 0.17 | 0.049 | 0.100 | 0.025 | 0.0040 | — | — | — | La: 0.02 | 25.5 | |
| | C39 | 0.030 | 0.31 | 0.95 | 0.006 | 0.012 | 0.33 | 0.01 | 0.17 | 0.049 | 0.100 | 0.025 | 0.0040 | — | — | — | Ce: 0.02 | 35.3 | |
| | C40 | 0.040 | 0.31 | 0.95 | 0.006 | 0.012 | 0.33 | 0.01 | 0.17 | 0.049 | 0.100 | 0.025 | 0.0040 | — | — | — | Pb: 0.05 | 30.4 | |
| | C41 | 0.030 | 0.31 | 0.95 | 0.006 | 0.012 | 0.33 | 0.01 | 0.17 | 0.049 | 0.100 | 0.025 | 0.0040 | — | — | — | Te: 0.02 | 35.3 | |
| | C42 | 0.030 | 0.31 | 0.95 | 0.006 | 0.012 | 0.33 | 0.01 | 0.17 | 0.049 | 0.100 | 0.025 | 0.0040 | — | — | — | Bi: 0.01 | 35.3 | |
| | C43 | 0.050 | 0.31 | 0.95 | 0.006 | 0.012 | 0.33 | 0.01 | 0.17 | 0.049 | 0.100 | 0.025 | 0.0040 | — | — | — | Ag: 0.1 | 25.5 | |
| | C44 | 0.030 | 0.31 | 0.95 | 0.006 | 0.012 | 0.33 | 0.01 | 0.17 | 0.049 | 0.100 | 0.025 | 0.0040 | — | — | — | Pd: 0.09 | 35.3 | |

TABLE 4-continued

Chemical components of specimen (sequel 3 of Table 1)

| | C | Si | Mn | P | S | Cu | Cr | Ni | Mo | Sb | Al | N | Nb | V | Ti | Others | Al (Mass %) | El |
|---|---|---|---|---|---|---|---|---|---|---|---|---|---|---|---|---|---|---|
| C45 | 0.060 | 0.31 | 0.95 | 0.006 | 0.012 | 0.33 | 0.01 | 0.17 | 0.049 | 0.100 | 0.025 | 0.0040 | — | — | 0.010 | — | | −35.8 |
| C46 | 0.030 | 0.31 | 0.95 | 0.006 | 0.012 | 0.33 | 0.05 | 0.17 | 0.049 | 0.100 | 0.025 | 0.0040 | — | — | — | — | 35.3 | |
| C47 | 0.030 | 0.31 | 0.95 | 0.006 | 0.012 | 0.33 | 0.10 | 0.17 | 0.049 | 0.100 | 0.025 | 0.0040 | — | — | — | — | 35.3 | |
| C48 | 0.030 | 0.31 | 0.95 | 0.006 | 0.012 | 0.33 | 0.50 | 0.17 | 0.049 | 0.100 | 0.025 | 0.0040 | — | — | — | — | 35.3 | |

Underlined numeral: Outside the range specified in the present invention

Mechanical properties (tensile strength and elongation) were investigated by using the above test pieces for tensile tests.

Various corrosion resistance such as hydrochloric acid resistance and sulfuric acid resistance was evaluated by using the above test pieces for corrosion tests. The hydrochloric acid resistance was evaluated by immersing the test pieces in a 3 M (mol/litter) hydrochloric acid aqueous solution for 6 hr. at 60° C. and weighing the corrosion losses.

The sulfuric acid resistance was evaluated by immersing the test pieces in a 40% sulfuric acid aqueous solution for 6 hr. at 60° C. and weighing the corrosion losses. Note that the present invention is not limited to the conditions employed in the examples.

The results of the material quality evaluated through the above tests are shown in Tables 5, 6 (sequel 1 of Table 5), 7 (sequel 2 of Table 5) and 8 (sequel 3 of Table 5).

TABLE 5

Results of material quality evaluation test

| | Specimen code | Dipping corrosion rate in 3M hydrochloric acid at 60° C. (mg/cm²/h) | Hydrochloric acid resistance | Dipping corrosion rate in 40% sulfuric acid at 60° C. (mg/cm²/h) | Sulfuric acid resistance | Carbon equivalent (%) | Tensile strength (MPa) | Application to welded structure | Elongation (%) | Application to cold-working | Remarks |
|---|---|---|---|---|---|---|---|---|---|---|---|
| Comparative specimen | A1 | 82.0 | X | 81.1 | X | 0.20 | 421 | Y | 33 | | SS400 steel |
| | A2 | 16.0 | — | 6.3 | — | 0.18 | 376 | Y | 32 | | S-TEN 1 steel |
| | A3 | 25.0 | θ | 22.5 | θ | 0.24 | 501 | Y | 33 | | Sulfuric acid dew point corrosion resistant steel |
| | A4 | 24.5 | θ | 21.5 | θ | 0.20 | 428 | Y | 34 | | Sulfuric acid dew point corrosion resistant steel |
| | A5 | 27.0 | θ | 23.5 | θ | 0.22 | 459 | Y | 36 | | Sulfuric acid dew point corrosion resistant steel |
| | A6 | 25.0 | θ | 22.5 | θ | 0.24 | 498 | Y | 30 | | Sulfuric acid dew point corrosion resistant steel |
| | A7 | 21.5 | θ | 7.9 | — | 0.18 | 411 | Y | 31 | | Sulfuric acid dew point corrosion resistant steel |
| | A8 | 71.0 | X | 18.5 | θ | 0.15 | 405 | Y | 33 | | Sulfuric acid dew point corrosion resistant steel |
| | A9 | 35.0 | X | 31.5 | X | 0.17 | 421 | Y | 32 | | Excessive P |
| | A11 | 0.90 | ⊚ | 8.4 | — | 0.17 | 411 | Y | 33 | | Excessive S and hot rolling crack |
| | A12 | 67.0 | X | 72.2 | X | 0.23 | 457 | Y | 36 | | Insufficient Cu |
| | A13 | 3.0 | ⊚ | 42.5 | X | 0.24 | 433 | Y | 34 | | Excessive Mo |
| | A14 | 17.5 | — | 6.3 | — | 0.11 | 354 | | 41 | Y | Mo not added |
| | A15 | 29.5 | θ | 28.5 | X | 0.12 | 364 | | 39 | Y | Japanese Examined Patent Publication No. S46-34772 |
| | A16 | 19.5 | θ | 7.9 | — | 0.09 | 353 | | 39 | Y | Japanese Examined Patent Publication No. S46-34772 |
| | A17 | 14.5 | — | 24.5 | θ | 0.20 | 424 | Y | 30 | | Japanese Unexamined Patent Publication No. H10-110327 |
| | A18 | 14.7 | — | 25.4 | θ | 0.20 | 424 | Y | 36 | | Japanese Unexamined Patent Publication No. H10-110327 |
| | A21 | 29.5 | θ | 28.5 | θ | 0.12 | 364 | | 39 | Y | Japanese Examined Patent Publication No. S46-34772 |

Underlined numeral: Outside the range specified in the present invention
Columns of hydrochloric acid resistance and sulfuric acid resistance (grading based on comparative specimen A2): ω inferior; θ slightly inferior; — the same level; Y superior; ⊚ far superior
Carbon equivalent = C + Si/24 + Mn/6 + Ni/40 + Cr/5 + Mo/4 + V/14

TABLE 6

Results of material quality evaluation test (sequel 1 of Table 5)

| | Specimen code | Dipping corrosion rate in 3M hydrochloric acid at 60° C. (mg/cm²/h) | Hydrochloric acid resistance | Dipping corrosion rate in 40% sulfuric acid at 60° C. (mg/cm²/h) | Sulfuric acid resistance | Carbon equivalent (%) | Tensile strength (MPa) | Application to welded structure | Elongation (%) | Application to cold-working | Remarks |
|---|---|---|---|---|---|---|---|---|---|---|---|
| Comparative specimen | B1 | 0.81 | ☺ | 24.3 | θ | 0.18 | 421 | Y | 35 | | Tensile strength > 400 MPa |
| | B2 | 0.63 | ☺ | 22.0 | θ | 0.18 | 411 | Y | 33 | | Tensile strength > 400 MPa |
| | B3 | 0.89 | ☺ | 24.1 | θ | 0.17 | 413 | Y | 32 | | Tensile strength > 400 MPa |
| | B4 | 0.71 | ☺ | 24.7 | θ | 0.17 | 411 | Y | 32 | | Tensile strength > 400 MPa |
| | B5 | 0.72 | ☺ | 23.8 | θ | 0.15 | 401 | Y | 35 | | Tensile strength > 400 MPa |
| | B6 | 0.85 | ☺ | 21.6 | θ | 0.18 | 443 | Y | 32 | | Tensile strength > 400 MPa |
| | B7 | 0.71 | ☺ | 22.2 | θ | 0.14 | 371 | | 43 | Y | Elongation > 35% |
| | B8 | 0.72 | ☺ | 24.3 | θ | 0.18 | 415 | Y | 33 | | Tensile strength > 400 MPa |
| | B9 | 0.85 | ☺ | 22.0 | θ | 0.18 | 422 | Y | 32 | | Tensile strength > 400 MPa |
| | B10 | 0.71 | ☺ | 24.1 | θ | 0.16 | 381 | | 44 | Y | Elongation > 35% |
| | B11 | 0.81 | ☺ | 24.1 | θ | 0.15 | 369 | | 43 | Y | Elongation > 35% |
| | B12 | 0.63 | ☺ | 24.7 | θ | 0.15 | 371 | | 44 | Y | Elongation > 35% |
| | B13 | 0.89 | ☺ | 23.8 | θ | 0.16 | 371 | | 39 | Y | Elongation > 35% |
| | B14 | 0.71 | ☺ | 21.6 | θ | 0.22 | 455 | Y | 36 | | Tensile strength > 400 MPa |

Underlined numeral: Outside the range specified in the present invention
Columns of hydrochloric acid resistance and sulfuric acid resistance (grading based on comparative specimen A2): ω inferior; θ slightly inferior; — the same level; Y superior; ☺ far superior
Carbon equivalent = C + Si/24 + Mn/6 + Ni/40 + Cr/5 + Mo/4 + V/14

TABLE 7

Results of material quality evaluation test (sequel 2 of Table 5)

| | Specimen code | Dipping corrosion rate in 3M hydrochloric acid at 60° C. (mg/cm²/h) | Hydrochloric acid resistance | Dipping corrosion rate in 40% sulfuric acid at 60° C. (mg/cm²/h) | Sulfuric acid resistance | Carbon equivalent (%) | Tensile strength (MPa) | Application to welded structure | Elongation (%) | Application to cold-working | Remarks |
|---|---|---|---|---|---|---|---|---|---|---|---|
| Inventive specimen | C1 | 1.45 | ☺ | 4.6 | Y | 0.19 | 410 | Y | 31 | | Tensile strength > 400 MPa |
| | C2 | 0.86 | ☺ | 4.4 | Y | 0.19 | 381 | | 41 | Y | Elongation > 35% |
| | C3 | 0.89 | ☺ | 4.2 | Y | 0.12 | 260 | Y | 32 | | Tensile strength > 400 MPa |
| | C4 | 0.79 | ☺ | 5.0 | Y | 0.16 | 355 | Y | 34 | | Tensile strength > 400 MPa |
| | C5 | 0.93 | ☺ | 5.0 | Y | 0.19 | 372 | | 41 | Y | Elongation > 35% |
| | C6 | 0.64 | ☺ | 3.7 | Y | 0.12 | 371 | | 41 | Y | Elongation > 35% |
| | C7 | 0.73 | ☺ | 2.1 | ☺ | 0.16 | 355 | Y | 34 | | Elongation > 35% |
| | C8 | 0.61 | ☺ | 4.3 | Y | 0.16 | 359 | | 37 | Y | Elongation > 35% |
| | C9 | 1.10 | ☺ | 4.9 | Y | 0.28 | 391 | | 40 | Y | Elongation > 35% |
| | C10 | 0.81 | ☺ | 4.6 | Y | 0.34 | 389 | | 42 | Y | Elongation > 35% |
| | C11 | 7.85 | Y | 5.5 | Y | 0.31 | 411 | | 40 | Y | Cr added steel, elongation > 35% |
| | C12 | 3.98 | Y | 5.4 | Y | 0.18 | 390 | | 42 | Y | Cr added steel, elongation > 35% |
| | C13 | 1.57 | ☺ | 6.1 | Y | 0.23 | 496 | Y | 36 | | Ultra-low S steel, tensile strength > 400 MPa |
| | C14 | 0.55 | ☺ | 4.0 | Y | 0.23 | 506 | Y | 32 | | Tensile strength > 400 MPa |
| | C15 | 0.64 | ☺ | 4.7 | Y | 0.18 | 411 | Y | 34 | | Tensile strength > 400 MPa |
| | C16 | 0.72 | ☺ | 3.7 | Y | 0.19 | 411 | Y | 32 | | Tensile strength > 400 MPa |
| | C17 | 0.85 | ☺ | 5.3 | Y | 0.18 | 401 | Y | 38 | Y | Tensile strength > 400 MPa |
| | C18 | 0.55 | ☺ | 3.8 | Y | 0.19 | 417 | Y | 36 | | Tensile strength > 400 MPa |
| | C19 | 0.67 | ☺ | 5.2 | Y | 0.19 | 427 | Y | 32 | | Tensile strength > 400 MPa |
| | C20 | 0.64 | ☺ | 5.5 | Y | 0.27 | 544 | Y | 35 | | Tensile strength > 400 MPa |
| | C21 | 0.54 | ☺ | 8.6 | — | 0.14 | 320 | Y | 33 | | Tensile strength > 400 MPa |
| | C22 | 0.55 | ☺ | 5.3 | Y | 0.19 | 416 | Y | 36 | | Tensile strength > 400 MPa |
| | C23 | 0.59 | ☺ | 4.8 | Y | 0.19 | 416 | Y | 34 | | Tensile strength > 400 MPa |
| | C24 | 0.57 | ☺ | 4.0 | Y | 0.09 | 345 | | 38 | Y | Elongation > 35% |

Underlined numeral: Outside the range specified in the present invention
Columns of hydrochloric acid resistance and sulfuric acid resistance (grading based on comparative specimen A2): ω inferior; θ slightly inferior; — the same level; Y superior; ☺ far superior
Carbon equivalent = C + Si/24 + Mn/6 + Ni/40 + Cr/5 + Mo/4 + V/14

TABLE 8

Results of material quality evaluation test (sequel 3 of Table 5)

| | Specimen code | Dipping corrosion rate in 3M hydrochloric acid at 60° C. (mg/cm²/h) | Hydrochloric acid resistance | Dipping corrosion rate in 40% sulfuric acid at 60° C. (mg/cm²/h) | Sulfuric acid resistance | Carbon equivalent (%) | Tensile strength (MPa) | Application to welded structure | Elongation (%) | Application to cold-working | Remarks |
|---|---|---|---|---|---|---|---|---|---|---|---|
| Inventive specimen | C25 | 0.55 | ⊚ | 4.4 | Y | 0.09 | 345 | | 39 | Y | Elongation > 35% |
| | C26 | 0.45 | ⊚ | 4.4 | Y | 0.09 | 345 | | 43 | Y | Elongation > 35% |
| | C27 | 7.77 | Y | 5.7 | Y | 0.18 | 393 | | 41 | Y | Cr added steel, elongation > 35% |
| | C28 | 0.78 | | 4.9 | Y | 0.09 | 345 | | 43 | Y | Elongation > 35% |
| | C29 | 0.79 | ⊚ | 4.0 | Y | 0.09 | 345 | | 38 | Y | Elongation > 35% |
| | C30 | 0.59 | ⊚ | 3.7 | Y | 0.09 | 345 | | 41 | Y | Elongation > 35% |
| | C31 | 0.57 | ⊚ | 5.3 | Y | 0.09 | 347 | | 44 | Y | Elongation > 35% |
| | C32 | 0.55 | ⊚ | 5.4 | Y | 0.21 | 453 | Y | 32 | | Tensile strength > 400 MPa |
| | C33 | 0.57 | ⊚ | 5.3 | Y | 0.18 | 436 | Y | 33 | | Tensile strength > 400 MPa |
| | C34 | 0.60 | ⊚ | 5.3 | Y | 0.21 | 443 | Y | 33 | | Tensile strength > 400 MPa |
| | C35 | 0.59 | ⊚ | 5.4 | Y | 0.22 | 435 | Y | 32 | | Tensile strength > 400 MPa |
| | C36 | 0.58 | ⊚ | 5.3 | Y | 0.22 | 457 | Y | 35 | | Tensile strength > 400 MPa |
| | C37 | 0.57 | ⊚ | 5.2 | Y | 0.22 | 455 | Y | 34 | | Tensile strength > 400 MPa |
| | C38 | 0.59 | ⊚ | 5.3 | Y | 0.24 | 455 | Y | 33 | | Tensile strength > 400 MPa |
| | C39 | 0.54 | ⊚ | 5.3 | Y | 0.22 | 474 | Y | 34 | | Tensile strength > 400 MPa |
| | C40 | 0.55 | ⊚ | 5.1 | Y | 0.23 | 465 | Y | 34 | | Tensile strength > 400 MPa |
| | C41 | 0.51 | ⊚ | 4.9 | Y | 0.22 | 455 | Y | 34 | | Tensile strength > 400 MPa |
| | C42 | 0.49 | ⊚ | 4.5 | Y | 0.22 | 443 | Y | 34 | | Tensile strength > 400 MPa |
| | C43 | 0.55 | ⊚ | 4.9 | Y | 0.24 | 437 | Y | 33 | | Tensile strength > 400 MPa |
| | C44 | 0.55 | ⊚ | 4.7 | Y | 0.22 | 453 | Y | 35 | | Tensile strength > 400 MPa |
| | C45 | 0.54 | ⊚ | 4.8 | Y | 0.25 | 457 | Y | 33 | | Tensile strength > 400 MPa |
| | C46 | 0.56 | ⊚ | 4.7 | Y | 0.23 | 460 | Y | 35 | | Tensile strength > 400 MPa |
| | C47 | 0.68 | ⊚ | 4.9 | Y | 0.24 | 461 | Y | 34 | | Cr added steel, tensile strength > 400 MPa |
| | C48 | 7.55 | Y | 6.1 | Y | 0.32 | 491 | Y | 34 | | Cr added steel, tensile strength > 400 MPa |

Underlined numeral: Outside the range specified in the present invention
Columns of hydrochloric acid resistance and sulfuric acid resistance (grading based on comparative specimen A2): ω inferior; θ slightly inferior; — the same level; Y superior; ⊚ far superior
Carbon equivalent = C + Si/24 + Mn/6 + Ni/40 + Cr/5 + Mo/4 + V/14

C1 to C48 are the steels according to the present invention (hereunder referred to as "invention steels"). On the other hand, A1 to A21 and B1 to B14 are the steels for comparison (hereunder referred to as "comparative steels"). In the comparative steels, A1 is an ordinary steel, A2 to A8 are conventional sulfuric acid dew-point corrosion resistant steels, A15 and A16 sulfuric acid dew-point corrosion resistant steels having the steel components shown in Japanese Examined Patent Publication No. S46-34772, A17 and A18 sulfuric acid dew-point corrosion resistant steels having the steel components shown in Japanese Unexamined Patent Publication No. H10-110237, and A21 a comparative steel having the steel components shown in Japanese Examined Patent Publication No. S46-34772 (steel number 6 in Table 1 of the examples disclosed in the publication). The steel number 6 has the largest AI value among the examples disclosed in the publication. The comparative steels B1 to B14 are low alloy steels excellent in hydrochloric acid corrosion resistance, the low alloy steels being produced by the present inventors in the process of the studies for reaching the invention steels, and the values of the acid corrosion resistance index AI or expanded acid corrosion resistance index EI thereof are outside the scope of the present invention.

Various kinds of corrosion resistance shown in Tables 5 to 8 represent the results of relatively evaluating the test pieces in comparison with the corrosion resistance of the comparative steel A2, namely a Cu—Sb sulfuric acid dew-point corrosion resistant steel (S-TEN 1 steel). The mark ⊚ represents the test pieces far superior to the comparative steel A2, the mark O those superior, the mark – the same level, the mark Δ slightly inferior, and the mark X inferior. Here, among the comparative steels A2 to A8 that are the conventional sulfuric acid dew-point corrosion resistant steels, the comparative steel A2 is a Cu—Sb steel not containing Mo and excellent particularly in both hydrochloric acid resistance and sulfuric acid resistance as shown in Table 5. For that reason, the corrosion resistance of the invention steels was evaluated on the basis of the corrosion resistance of the comparative steel A2.

Firstly, the hydrochloric acid resistance and sulfuric acid resistance of the comparative steels A1 to A21 and B1 to B14 and the invention steels C1 to C48 are explained hereunder.

The comparative steel A1 is an ordinary steel as mentioned above and the addition amounts of Cu, Ni, Mo, Sb, etc. are outside the ranges specified in the present invention and thus the hydrochloric acid resistance and sulfuric acid resistance thereof are far inferior to those of the invention steels.

The comparative steel A2 is a Cu—Sb sulfuric acid dew-point corrosion resistant steel as mentioned above. Though the hydrochloric acid resistance thereof is the best among the comparative steels A2 to A8, the hydrochloric acid resistance thereof is far inferior to that of the invention steels C1 to C48 because Mo is not added thereto.

The comparative steels A3 to A6 are Cu—Cr sulfuric acid dew-point corrosion resistant steels.

The comparative steel A3 deviates from the scope of the present invention in the fact that the Cr amount exceeds the upper limit specified in the present invention and Mo and Sb are not added, and therefore the hydrochloric acid resistance and sulfuric acid resistance thereof are inferior to those of the invention steels.

The comparative steel A4 deviates from the scope of the present invention in the fact that the Cr amount exceeds the upper limit specified in the present invention and Mo is not added, and therefore the hydrochloric acid resistance and sulfuric acid resistance thereof are inferior to those of the invention steels.

The comparative steel A5 deviates from the scope of the present invention in the fact that the Cr amount exceeds the upper limit specified in the present invention and the AI value is negative and, therefore, the hydrochloric acid resistance and sulfuric acid resistance thereof are inferior to those of the invention steels.

The comparative steel A6 deviates from the scope of the present invention in the fact that the Cr amount exceeds the upper limit specified in the present invention, Sb is not added and the AI value is negative, and therefore the hydrochloric acid resistance and sulfuric acid resistance thereof are inferior to those of the invention steels.

The comparative steel A7 deviates from the scope of the present invention in the fact that Mo is not added, and therefore the hydrochloric acid resistance and sulfuric acid resistance thereof are inferior to those of the invention steels.

The comparative steel A8 deviates from the scope of the present invention in the fact that Mo is not added and the amounts of Cr, Ni and Sb are outside the ranges specified in the present invention, and therefore the hydrochloric acid resistance and sulfuric acid resistance thereof are inferior to those of the invention steels.

In the comparative steel A9, the P amount exceeds the upper limit specified in the present invention, and therefore the hydrochloric acid resistance and sulfuric acid resistance thereof are inferior to those of the invention steels.

In the comparative steel A11, though the hydrochloric acid resistance and sulfuric acid resistance thereof are almost the same level as those of the invention steels, the S amount exceeds the upper limit specified in the present invention and therefore minute cracks are observed on the surfaces of the steel sheet after hot-working.

In the comparative steel A12, the Cu addition amount is less than the lower limit specified in the present invention and the AI value is negative and, therefore, the hydrochloric acid resistance and sulfuric acid resistance thereof are inferior to those of the invention steels.

In the comparative steel A13, the Mo addition amount exceeds the upper limit specified in the present invention and the AI value is negative and, therefore, the sulfuric acid resistance thereof is inferior to that of the invention steels.

The comparative steel A14 is a sulfuric acid dew-point corrosion resistant steel that is an ultra-low C type (0.003% C) of the comparative steel A2. The hydrochloric acid resistance and sulfuric acid resistance thereof is similar to those of the comparative steel A2 but inferior to those of the invention steels because Mo is not added thereto.

In the comparative steel A15, Sb is not added and the AI value is negative. Though the hydrochloric acid resistance thereof is nearly equal to that of the comparative steel A2, the sulfuric acid resistance thereof is inferior to that of the comparative steel A2. In other words, both the hydrochloric acid resistance and sulfuric acid resistance thereof are inferior to those of the invention steels.

In the comparative steel A16, the requirement an AI value$\geq 0$ is satisfied but Sb, which is an indispensable element in the present invention, is not added and, therefore, the hydrochloric acid resistance and sulfuric acid resistance thereof are equal to those of the comparative steel A2. In other words, both the hydrochloric acid resistance and sulfuric acid resistance thereof are inferior to those of the invention steels.

In the comparative steels A17 and A18, the AI values are negative and outside the requirement specified in the present invention. Though the hydrochloric acid resistance thereof is superior to that of the comparative steel A2, the sulfuric acid resistance thereof is inferior to that of the comparative steel A2. In other words, the hydrochloric acid resistance thereof is equal to that of the invention steels but the sulfuric acid resistance thereof is inferior to that of the invention steels.

In the comparative steel A21, Sb is not added, the Ni addition amount is outside the range specified in the present invention and also the AI value is negative. Though the hydrochloric acid resistance thereof is equal to that of the comparative steel A2, the sulfuric acid resistance thereof is inferior to that of the comparative steel A2. In other words, both the hydrochloric acid resistance and sulfuric acid resistance thereof are inferior to those of the invention steels.

Next, the hydrochloric acid resistance and sulfuric acid resistance of the comparative steels B1 to B14 are explained hereunder.

The comparative steels B1 to B14 are the steels excellent in hydrochloric acid resistance, the steels being found by the present inventors during the course of arriving at the present invention. Though any of the steel components in the comparative steels is in the range specified in the present invention, either the AI values or the EI values are negative and thus the AI values or the EI values deviate from the scope of the present invention. Therefore, though the hydrochloric acid resistance thereof is excellent and equal to that of the invention steels C1 to C48, the sulfuric acid resistance thereof is inferior.

Next, the sulfuric acid resistance and hydrochloric acid resistance of the invention steels C1 to C48 are explained hereunder.

The invention steels C1 to C48 are the steels that are designed so that the steel components may satisfy the ranges specified in the present invention and the requirement AI$\geq 0$ or EI$\geq 0$, and thus show extremely excellent hydrochloric acid resistance and sulfuric acid resistance.

C1 to C10, C13 to C26 and C28 to C45 are the invention steels wherein the amounts of Cr as an impurity are limited to 0.1% or less. C11, C12, C27, C47 and C48 are the invention steels whereto Cr is added in the range specified in the present invention as a selective element.

In the invention steels wherein the amounts of Cr as an impurity are limited to 0.1% or less, the hydrochloric acid resistance thereof is not less than five times (evaluation mark ⊚ in the tables) that of the sulfuric acid dew-point corrosion resistant comparative steel A2 that is most excellent in corrosion resistance among the comparative steels A2 to A8 and the sulfuric acid resistance thereof is not less than two times (evaluation mark ○ in the tables) that of the comparative steel A2 that is most excellent in corrosion resistance among the comparative steels A2 to A8.

In the invention steels whereto Cr is added in the range specified in the present invention, the hydrochloric acid resistance and sulfuric acid resistance thereof are somewhat inferior to those of the invention steels whereto Cr is not added, but are sufficiently superior to those of the comparative steel A2.

The invention steel C13 is an example wherein the S amount is 0.003%. In the invention steel C14, the S amount is 0.015% and the other components and the AI value are the same as the invention steel C13. In the invention steel C13, the hydrochloric acid resistance and sulfuric acid resistance thereof are superior to those of the comparative steel A2 but inferior to those of the invention steel C14. From the result, it is understood that both excellent hydrochloric acid resistance and sulfuric acid resistance are obtainable simultaneously by adding S by more than 0.005%.

As explained above, it is obvious that the invention steels are excellent in both sulfuric acid resistance and hydrochloric acid resistance.

Next, the mechanical properties of the invention steels are explained hereunder.

As shown in Tables 5 to 8, in the invention steels C1, C3, C4, C7, C13 to C23 and C32 to C48, the tensile strengths thereof are more than 400 MPa and steels for welded structures of 400 MPa class in tensile strength (JIS G3101 equivalent) are secured. Further, as shown in Tables 5 to 8, in the invention steels, the carbon equivalents thereof are 0.32% at the most and no cracks are observed even in the weld crack tests at 0° C. From the results, it is obvious that the invention steels have sufficient weldability.

From the above results, it is understood that the above invention steels are steels for welded structures excellent in hydrochloric acid resistance and sulfuric acid resistance.

Further, in the invention steels C2, C5 to C12 and C24 to C31, each of the cold-rolled steel sheets produced from the invention steels shows the elongation of more than 35%, and therefore it is understood that the steel sheets are sufficiently excellent also in workability.

Figure 8:
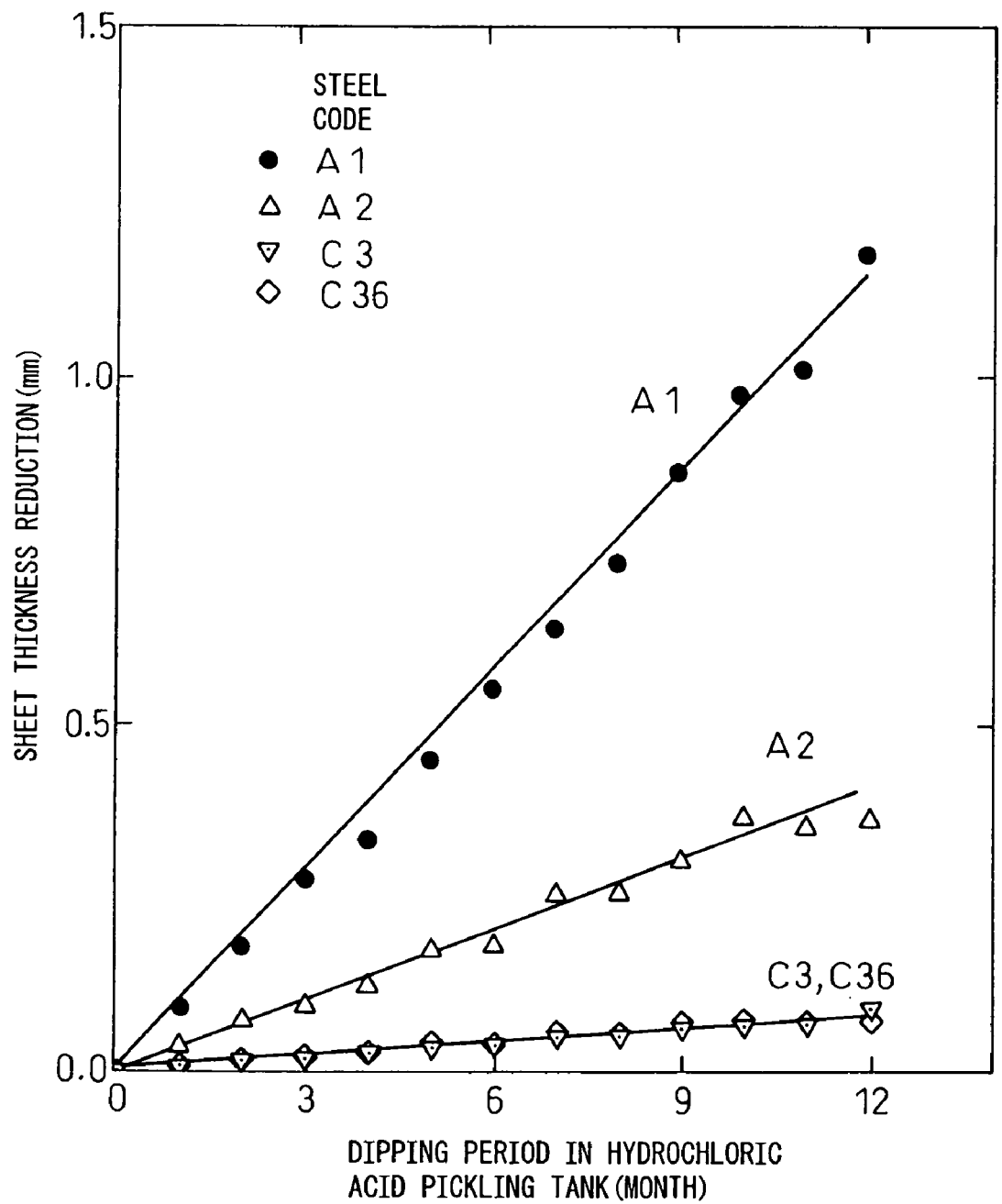
FIG. 8 is a graph showing the thickness reduction amounts of invention steel sheets and comparative steel sheets with the passage of time in a hydrochloric acid pickling tank.

Further, the comparative steels A1 and A2 and the invention steels C3 and C36 were immersed into a hydrochloric acid pickling tank (15 mass % hydrochloric acid, 30° C., an inhibitor added) used by a hot dip galvanizing agent and the hydrochloric acid resistance of the steels was evaluated by measuring the amounts of thickness reduction with a point micrometer. The results are shown in FIG. 8. The thickness reduction rates (corrosion rates) of the invention steels C3 and C36 are 0.1 mm/year. The thickness reduction rates of the comparative steel A1 and the comparative steel A2 are 1.2 and 0.4 mm/year, respectively. That is, the corrosion rates of the invention steels are one twelfth of that of the comparative steel A1 and one fourth of that of the comparative steel A2. Therefore, it is obvious that the invention steels have excellent hydrochloric acid resistance in the application to a hydrochloric acid pickling tank.

Further, the comparative steels A1 and A2 and the invention steels C3, C13 to C15, C17 to C23 and C36 were immersed into a sulfuric acid pickling tank (20 mass % sulfuric acid, 40° C., an inhibitor added) used by a hot dip galvanizing agent and the sulfuric acid resistance of the steels was evaluated by thickness reduction rates in the same manner as in the hydrochloric acid pickling tank. As a result, the corrosion rates of the specimens of the invention steels are one sixteenths of that of the comparative steel A1 at the most and a half of that of the comparative steel A2 at most. Therefore, it is obvious that the invention steels have sulfuric acid resistance excellent in the application to a sulfuric acid pickling tank.

Figure 9:
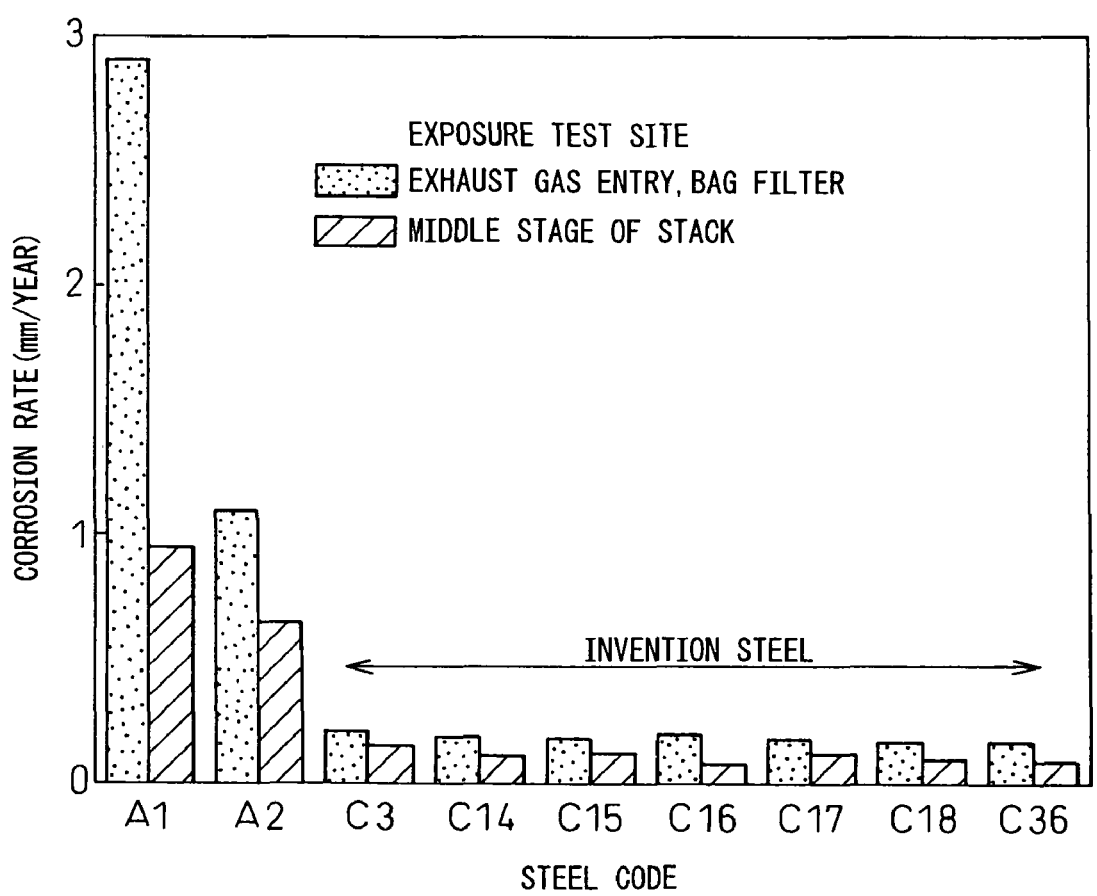
FIG. 9 is a graph showing the corrosion rates of invention steels and comparative steels in smoke exhausting equipment of a refuse incinerator.

Further, the test pieces of the comparative steels A1 and A2 and the invention steels C3, C14 to C18 and C36 were stuck to the entry of a bag filter and a manhole at the middle stage of a stack in a waste incinerator where sulfuric acid dew-point corrosion and hydrochloric acid dew-point corrosion are caused simultaneously, and subjected to the exposure tests for one year. The environment at the entry of the bag filter is the environment of an exhaust gas containing fly ash and hydrogen chloride relatively abundantly and the environment in the manhole at the middle stage of the stack is the environment containing small amounts of ash and hydrogen chloride because the position is located after smoke elimination treatment. The results obtained by evaluating sulfuric acid dew-point corrosion and hydrochloric acid dew-point corrosion in terms of corrosion loss are shown in FIG. 9. The corrosion losses of the invention steels are not more than one tenth of that of the comparative steel A1 and a quarter of that of the comparative steel A2. From the results, it is obvious that the invention steels have an excellent corrosion resistance in a flue gas environment of a waste incinerator where sulfuric acid dew-point corrosion and hydrochloric acid dew-point corrosion are caused simultaneously.

Example 2

Table 9 shows the chemical components of the core wires for tests and Tables 10 and 11 (sequel of Table 10) show the chemical compositions of the coated arc welding rod (rod diameter: 4.0 mm) produced according to the present invention and used for the tests.

TABLE 9

Components of core wire specimen (Mass %)

| Code | C | Si | Mn | P | S | Cu | Ni | Sb | Mo | Cr |
|---|---|---|---|---|---|---|---|---|---|---|
| A | 0.010 | 0.01 | 0.48 | 0.007 | 0.005 | 0.01 | 0.005 | <0.002 | 0.003 | 0.001 |
| B | 0.070 | 0.01 | 0.52 | 0.013 | 0.011 | 0.01 | 0.007 | <0.002 | 0.001 | 0.002 |
| C | 0.080 | 0.02 | 0.27 | 0.035 | 0.010 | 0.02 | 0.004 | <0.002 | 0.003 | 0.001 |
| D | 0.050 | 0.01 | 0.25 | 0.030 | 0.017 | 0.02 | 0.003 | <0.002 | 0.004 | 0.003 |
| E | 0.050 | 0.01 | 0.30 | 0.018 | 0.040 | 0.02 | 0.008 | <0.002 | 0.001 | 0.002 |
| F | 0.04 | 0.02 | 0.32 | 0.015 | 0.035 | 0.01 | 0.006 | <0.002 | 0.002 | 0.003 |

TABLE 10

Configuration of welding rod specimen

| Classification | Welding rod code | Core wire code | Coating composition (mass %) | | | | | | | | | | | |
|---|---|---|---|---|---|---|---|---|---|---|---|---|---|---|
| | | | CaCO₃ | CaF₂ | Fe—Si | Mn | Cu | Ni | Sb | Fe—Mo | Cr | TiO₂ | BaCO₃ | SiC | *Others |
| Comparative specimen | W1 | B | 46.1 | 24.2 | 12.5 | 4.2 | 0 | 0 | 0 | 0.02 | 0 | 4.5 | 5.5 | 0 | 3.0 |
| | W2 | A | 53.2 | 18.8 | 13.5 | 0.6 | 0.9 | 0 | 0 | 0 | 0 | 4.4 | 3.9 | 0 | 4.7 |
| | W3 | B | 49.6 | 26.3 | 12.0 | 0.7 | 1.1 | 0 | 0 | 0 | 1.8 | 3.5 | 0 | 0 | 5.0 |
| | W4 | C | 47.6 | 23.5 | 12.9 | 4.1 | 1.2 | 0.5 | 0.3 | 0 | 0 | 1.5 | 4.3 | 0 | 4.1 |

TABLE 10-continued

Configuration of welding rod specimen

| Classification | Welding rod code | Core wire code | Coating composition (mass %) | | | | | | | | | | | | |
|---|---|---|---|---|---|---|---|---|---|---|---|---|---|---|---|
| | | | CaCO₃ | CaF₂ | Fe—Si | Mn | Cu | Ni | Sb | Fe—Mo | Cr | TiO₂ | BaCO₃ | SiC | *Others |
| | W5 | E | 50.3 | 22.5 | 11.9 | 3.7 | 1.4 | 0.6 | 0.3 | 0 | 0 | 2.9 | 3.3 | 0 | 3.1 |
| | W6 | B | 51.4 | 20.6 | 14.1 | 1.8 | 0.1 | 1.4 | 0.3 | 0 | 0 | 3.6 | 2.4 | 0 | 4.3 |
| | W7 | B | 53.4 | 19.7 | 10.6 | 2.9 | 0.9 | 0.1 | 0 | 0 | 0 | 5.5 | 0 | 0.1 | 6.8 |
| | W8 | B | 58.3 | 20.1 | 10.2 | 2.8 | 0.8 | 0.4 | 0.007 | 0 | 0 | 0 | 1.7 | 0.2 | 5.5 |
| | W9 | A | 48.5 | 19.9 | 14.9 | 3.1 | 0.9 | 0.3 | 1.0 | 0 | 0 | 4.7 | 1.4 | 0 | 5.3 |
| | W10 | A | 46.6 | 22.3 | 13.1 | 2.6 | 0.8 | 0.5 | 0.03 | 0 | 2.9 | 2.4 | 4.0 | 0 | 4.8 |
| | W11 | B | 50.7 | 23.4 | 12.9 | 2.7 | 1.3 | 0.6 | 1.3 | 0 | 2.9 | 0 | 0 | 0 | 4.2 |
| | W12 | A | 51.5 | 24.3 | 13.3 | 0.5 | 1.1 | 0.7 | 0.3 | 0.8 | 0 | 1.5 | 1.4 | 0 | 4.6 |
| | W13 | B | 49.7 | 26.4 | 13.4 | 0.5 | 1.1 | 0.7 | 0.3 | 0.2 | 0 | 3.2 | 0 | 0 | 4.5 |
| | W14 | A | 57.7 | 25.4 | 0.3 | 0.7 | 1.2 | 0.7 | 0.4 | 0.20 | 0 | 5.8 | 2.1 | 0 | 5.5 |
| | W15 | A | 57.7 | 25.4 | 0.3 | 0.7 | 1.2 | 0.7 | 0.4 | 0.20 | 0 | 5.8 | 2.1 | 0 | 5.5 |
| | W16 | A | 57.7 | 25.4 | 0.3 | 0.7 | 1.2 | 0.7 | 0.4 | 0.20 | 0 | 5.8 | 2.1 | 0 | 5.5 |
| | W17 | A | 57.7 | 25.4 | 0.3 | 0.7 | 1.2 | 0.7 | 0.4 | 0.20 | 0 | 5.8 | 2.1 | 0 | 5.5 |
| | W18 | A | 57.7 | 25.4 | 0.3 | 0.7 | 1.2 | 0.7 | 0.4 | 0.20 | 0 | 5.8 | 2.1 | 0 | 5.5 |

*Others: SiO₂, Na₂O, K₂O, Al₂O₃, etc. in sticking agent
Underlined numeral: Outside the range specified in the present invention

TABLE 11

Configuration of welding rod specimen (sequel of Table 10)

| Classification | Welding rod code | Core wire code | Coating composition (mass %) | | | | | | | | | | | | |
|---|---|---|---|---|---|---|---|---|---|---|---|---|---|---|---|
| | | | CaCO₃ | CaF₂ | Fe—Si | Mn | Cu | Ni | Sb | Fe—Mo | Cr | TiO₂ | BaCO₃ | SiC | *Others |
| Inventive specimen | W21 | B | 56.6 | 18.6 | 11.6 | 0.3 | 1.0 | 0.7 | 0.4 | 0.20 | 0 | 4.1 | 1.7 | 1.0 | 4.8 |
| | W22 | A | 57.7 | 25.4 | 0.3 | 0.7 | 1.2 | 0.7 | 0.4 | 0.20 | 0 | 5.8 | 2.1 | 0 | 5.5 |
| | W23 | D | 48.9 | 22.2 | 13.2 | 1.2 | 1.2 | 0.7 | 0.4 | 0.20 | 0 | 3.7 | 1.7 | 0 | 6.6 |
| | W24 | F | 42.1 | 24.7 | 13.4 | 1.1 | 1.0 | 0.8 | 0.3 | 0.24 | 0 | 6.3 | 4.3 | 0 | 5.8 |
| | W25 | A | 44.4 | 24.3 | 11.8 | 0.8 | 0.3 | 0.8 | 0.3 | 0.22 | 0 | 5.3 | 6.5 | 0 | 5.3 |
| | W26 | A | 46.8 | 21.6 | 12.1 | 0.8 | 1.0 | 0 | 0.3 | 0.14 | 0 | 4.1 | 7.0 | 0 | 6.2 |
| | W27 | B | 51.1 | 26.8 | 13.4 | 0.8 | 1.1 | 0.8 | 0.05 | 0.06 | 0 | 1.0 | 0 | 0 | 4.9 |
| | W28 | B | 49.5 | 18.9 | 13.1 | 0.8 | 1.1 | 0.8 | 0.6 | 0.60 | 0 | 5.1 | 4.4 | 0 | 4.9 |
| | W29 | A | 48.7 | 22.5 | 13.2 | 0.8 | 1.0 | 0.8 | 0.6 | 0.04 | 0 | 3.2 | 3.4 | 0 | 5.8 |
| | W30 | A | 50.2 | 21.6 | 13.0 | 0.9 | 1.1 | 0.9 | 0.4 | 1.20 | 0 | 1.5 | 4.6 | 0 | 4.6 |
| | W31 | A | 52.0 | 18.5 | 13.8 | 0.7 | 1.3 | 0.8 | 0.3 | 0.20 | 0 | 4.4 | 3.9 | 0 | 4.1 |
| | W32 | A | 45.2 | 24.3 | 13.4 | 0.7 | 1.3 | 0.8 | 0.3 | 0.20 | 1.4 | 4.3 | 3.7 | 0 | 4.4 |
| | W33 | B | 45.0 | 24.1 | 13.5 | 0.7 | 1.3 | 0.8 | 0.3 | 0.20 | 2.9 | 3.7 | 3.3 | 0 | 4.2 |
| | W34 | A | 53.4 | 22.4 | 13.9 | 0.6 | 1.2 | 0.8 | 0.3 | 0.38 | 0 | 1.2 | 0.5 | 0 | 5.3 |
| | W35 | B | 55.1 | 19.9 | 13.5 | 0.7 | 1.3 | 0.9 | 0.3 | 0.20 | 0 | 3.1 | 0 | 0 | 5.0 |
| | W36 | A | 49.9 | 20.5 | 12.9 | 0.6 | 1.2 | 0.8 | 0.3 | 0.36 | 0 | 4.7 | 2.2 | 0 | 6.5 |
| | W37 | A | 47.4 | 24.6 | 13.3 | 0.7 | 1.2 | 0.8 | 0.3 | 0.40 | 2.9 | 0 | 1.1 | 0 | 7.3 |
| | W38 | A | 52.0 | 18.5 | 13.8 | 0.7 | 1.3 | 0.8 | 0.3 | 0.20 | 0 | 4.4 | 3.9 | 0 | 4.1 |
| | W39 | A | 52.0 | 18.5 | 13.8 | 0.7 | 1.3 | 0.8 | 0.3 | 0.20 | 0 | 4.4 | 3.9 | 0 | 4.1 |
| | W40 | A | 52.0 | 18.5 | 13.8 | 0.7 | 1.3 | 0.8 | 0.3 | 0.20 | 0 | 4.4 | 3.9 | 0 | 4.1 |
| | W41 | A | 52.0 | 18.5 | 13.8 | 0.7 | 1.3 | 0.8 | 0.3 | 0.20 | 0 | 4.4 | 3.9 | 0 | 4.1 |
| | W42 | A | 52.0 | 18.5 | 13.8 | 0.7 | 1.3 | 0.8 | 0.3 | 0.20 | 0 | 4.4 | 3.9 | 0 | 4.1 |
| | W43 | A | 52.0 | 18.5 | 13.8 | 0.7 | 1.3 | 0.8 | 0.3 | 0.20 | 0 | 4.4 | 3.9 | 0 | 4.1 |
| | W44 | A | 52.0 | 18.5 | 13.8 | 0.7 | 1.3 | 0.8 | 0.3 | 0.20 | 0 | 4.4 | 3.9 | 0 | 4.1 |
| | W45 | A | 52.0 | 18.5 | 13.8 | 0.7 | 1.3 | 0.8 | 0.3 | 0.20 | 0 | 4.4 | 3.9 | 0 | 4.1 |
| | W46 | A | 52.0 | 18.5 | 13.8 | 0.7 | 1.3 | 0.8 | 0.3 | 0.20 | 0 | 4.4 | 3.9 | 0 | 4.1 |
| | W47 | A | 52.0 | 18.5 | 13.8 | 0.7 | 1.3 | 0.8 | 0.3 | 0.20 | 0 | 4.4 | 3.9 | 0 | 4.1 |
| | W48 | A | 52.0 | 18.5 | 13.8 | 0.7 | 1.3 | 0.8 | 0.3 | 0.20 | 0 | 4.4 | 3.9 | 0 | 4.1 |
| | W49 | A | 52.0 | 18.5 | 13.8 | 0.7 | 1.3 | 0.8 | 0.3 | 0.20 | 0 | 4.4 | 3.9 | 0 | 4.1 |
| | W50 | A | 52.0 | 18.5 | 13.8 | 0.7 | 1.3 | 0.8 | 0.3 | 0.20 | 0 | 4.4 | 3.9 | 0 | 4.1 |
| | W51 | A | 52.0 | 18.5 | 13.8 | 0.7 | 1.3 | 0.8 | 0.3 | 0.20 | 0 | 4.4 | 3.9 | 0 | 4.1 |
| | W52 | A | 52.0 | 18.5 | 13.8 | 0.7 | 1.3 | 0.8 | 0.3 | 0.20 | 0 | 4.4 | 3.9 | 0 | 4.1 |
| | W53 | A | 52.0 | 18.5 | 13.8 | 0.7 | 1.3 | 0.8 | 0.3 | 0.20 | 0 | 4.4 | 3.9 | 0 | 4.1 |

Figure 12A:
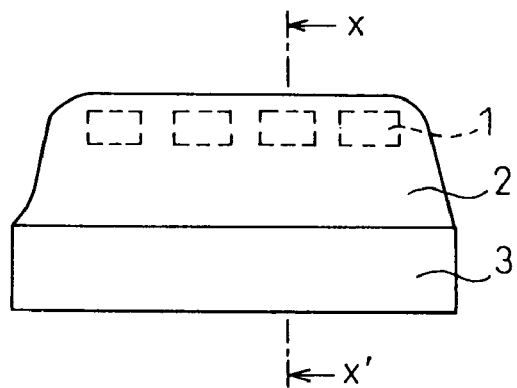
FIG. 12(a) is an illustration showing how to sample corrosion test pieces for evaluating the corrosion resistance of a weld metal.
Figure 12B:
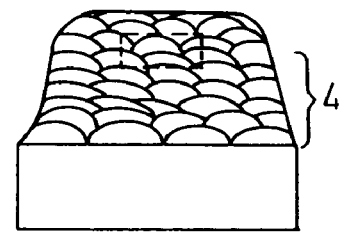
FIG. 12(b) is a cross-sectional illustration taken on line x-x' of FIG. 12(a) showing how to sample corrosion test pieces for evaluating the corrosion resistance of a weld metal.
Figure 13:
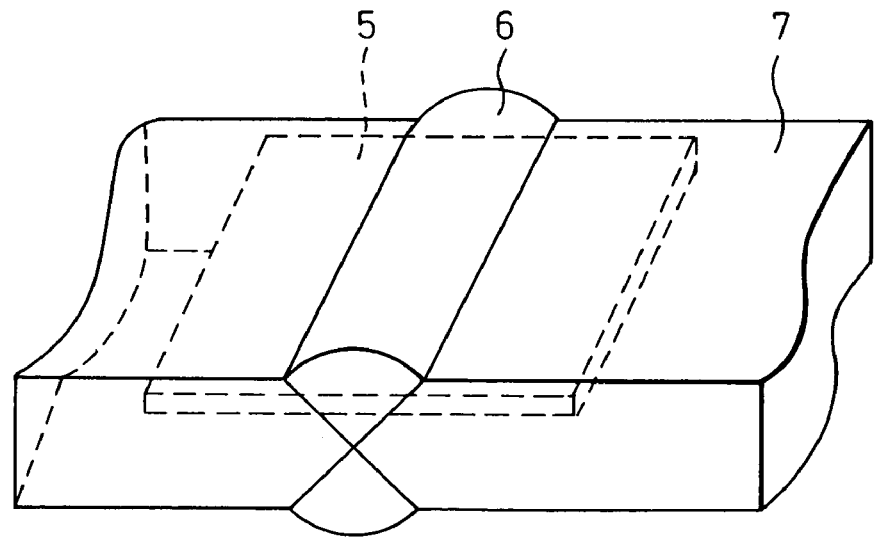
FIG. 13 is an illustration showing how to sample a corrosion test piece for evaluating the corrosion resistance of a weld joint.

*Others: SiO₂, Na₂O, K₂O, Al₂O₃, etc. in sticking agent
Underlined numeral: Outside the range specified in the present invention Tables 12, 13 (sequel 1 of Table 12), 14 (sequel 2 of Table 12) and 15 (sequel 3 of Table 12) show the chemical components, corrosion resistance, weld quality and weld operability of the weld metals formed by the coated arc welding rods shown in Tables 10 and 11. Further, FIGS. 12(*a*) and 12(*b*) explain how to sample corrosion test pieces for evaluating the corrosion resistance of a weld metal and FIG. 13 explains how to sample a corrosion test piece for evaluating the corrosion resistance of a weld joint. A test piece 1 for a corrosion resistance evaluation test was prepared on the basis of the method for preparing a corrosion test piece of a weld metal stipulated in JIS, as shown in FIGS. 12(*a*) and 12(*b*). Specifically, a underlayer 4 composed of six layers was formed on an ordinary steel base material 3 under an electric current of 170 A by using an alternating-current welder so that the underlayer might not be influenced by the base material composition and then a test piece 1 (4 mm×25 mm×25 mm) was sampled from a weld metal 2 by machining. As for corrosion tests, the dipping corrosion tests were carried out by immersing the test pieces in 10% hydrochloric acid for 24 hr. at 80° C. and 20% sulfuric acid for 24 hr. at 40° C., respectively, and then the corrosion losses of the test pieces were measured.

TABLE 12

Chemical components, corrosion resistance, weld operability and overall judgment of weld metal

| | | | | | | | | | | | (Mass %) |
|---|---|---|---|---|---|---|---|---|---|---|---|
| | C | Si | Mn | P | S | Cu | Ni | Sb | Mo | Cr | Al |
| Comparative specimen W1 | 0.070 | 0.56 | 1.23 | 0.021 | 0.006 | 0.02 | 0.02 | ≤0.002 | 0.004 | 0.02 | 0.010 |
| Comparative specimen W2 | 0.065 | 0.50 | 0.42 | 0.013 | 0.005 | 0.30 | 0.02 | ≤0.002 | 0.003 | 0.02 | 0.010 |
| Comparative specimen W3 | 0.080 | 0.55 | 0.45 | 0.010 | 0.009 | 0.39 | 0.02 | ≤0.002 | 0.003 | 0.64 | 0.015 |
| Comparative specimen W4 | 0.070 | 0.54 | 1.09 | 0.040 | 0.005 | 0.45 | 0.22 | 0.081 | 0.002 | 0.02 | 0.014 |
| Comparative specimen W5 | 0.050 | 0.55 | 0.98 | 0.012 | 0.035 | 0.51 | 0.27 | 0.081 | 0.002 | 0.02 | 0.015 |
| Comparative specimen W6 | 0.080 | 0.65 | 0.76 | 0.013 | 0.009 | 0.04 | 0.50 | 0.081 | 0.002 | 0.02 | 0.010 |
| Comparative specimen W7 | 0.090 | 0.45 | 0.95 | 0.010 | 0.005 | 0.31 | 0.05 | ≤0.002 | 0.002 | 0.02 | 0.010 |
| Comparative specimen W8 | 0.100 | 0.41 | 0.94 | 0.005 | 0.006 | 0.29 | 0.21 | 0.002 | 0.002 | 0.02 | 0.011 |
| Comparative specimen W9 | 0.070 | 0.74 | 0.97 | 0.009 | 0.007 | 0.31 | 0.15 | 0.310 | 0.002 | 0.02 | 0.010 |
| Comparative specimen W10 | 0.050 | 0.53 | 0.89 | 0.012 | 0.005 | 0.29 | 0.19 | 0.008 | 0.002 | 1.01 | 0.010 |
| Comparative specimen W11 | 0.090 | 0.51 | 0.91 | 0.015 | 0.010 | 0.49 | 0.24 | 0.240 | 0.002 | 1.02 | 0.010 |
| Comparative specimen W12 | 0.030 | 0.62 | 0.42 | 0.012 | 0.006 | 0.46 | 0.28 | 0.080 | 0.200 | <0.02 | 0.025 |
| Comparative specimen W13 | 0.100 | 0.62 | 0.42 | 0.012 | 0.006 | 0.46 | 0.28 | 0.080 | 0.050 | 0.49 | 0.025 |
| Comparative specimen W14 | 0.050 | 0.01 | 0.42 | 0.012 | 0.006 | 0.46 | 0.28 | 0.100 | 0.051 | <0.02 | 0.030 |
| Comparative specimen W15 | 0.050 | 0.01 | 0.42 | 0.012 | 0.006 | 0.46 | 0.28 | 0.100 | 0.051 | <0.02 | 0.030 |
| Comparative specimen W16 | 0.050 | 0.01 | 0.42 | 0.012 | 0.006 | 0.46 | 0.28 | 0.100 | 0.051 | <0.02 | 0.030 |
| Comparative specimen W17 | 0.050 | 0.01 | 0.42 | 0.012 | 0.006 | 0.46 | 0.28 | 0.100 | 0.051 | <0.02 | 0.030 |
| Comparative specimen W18 | 0.050 | 0.01 | 0.42 | 0.012 | 0.006 | 0.46 | 0.28 | 0.100 | 0.051 | <0.02 | 0.030 |

| | | | | | | | | (Mass %) |
|---|---|---|---|---|---|---|---|---|
| | N | Nb | V | Ti | Ta | W | Others | AI value | EI value |
| Comparative specimen W1 | 0.0095 | | | | | | | 2.2 | |
| Comparative specimen W2 | 0.0090 | | | | | | | 3.1 | |
| Comparative specimen W3 | 0.0090 | | | | | | | 2.6 | |
| Comparative specimen W4 | 0.0090 | | | | | | | 40.1 | |
| Comparative specimen W5 | 0.0090 | | | | | | | 40.5 | |
| Comparative specimen W6 | 0.0090 | | | | | | | 39.9 | |
| Comparative specimen W7 | 0.0090 | | | | | | | 3.2 | |
| Comparative specimen W8 | 0.0090 | | | | | | | 3.9 | |
| Comparative specimen W9 | 0.0090 | | | | | | | 143.1 | |
| Comparative specimen W10 | 0.0090 | | | | | | | 7.6 | |
| Comparative specimen W11 | 0.0090 | | | | | | | 111.2 | |
| Comparative specimen W12 | 0.0090 | | | | | | | −19.0 | |
| Comparative specimen W13 | 0.0090 | | | | | | | −9.0 | |

TABLE 12-continued

Chemical components, corrosion resistance, weld operability and overall judgment of weld metal

| | | | | | | | |
|---|---|---|---|---|---|---|---|
| Comparative specimen W14 | 0.0090 | 0.015 | | | | | −13.8 |
| Comparative specimen W15 | 0.0090 | | 0.050 | | | | −80.5 |
| Comparative specimen W16 | 0.0090 | | | 0.020 | | | −68.5 |
| Comparative specimen W17 | 0.0090 | | | | 0.020 | | −26.5 |
| Comparative specimen W18 | 0.0090 | | | | | 0.250 | −38.0 |

Sulfuric acid test: Dipping in 20% sulfuric acid for 24 hr. at 40° C.
Hydrochloric acid test: Dipping in 10% hydrochloric acid for 24 hr. at 80° C.
Underlined numeral: Outside the range specified in the present invention

TABLE 13

Chemical components, corrosion resistance, weld operability and overall judgment of weld metal (sequel 1 of Table 12)

| | Sulfuric acid test (mg/cm²/h) | Sulfuric acid resistance | Hydrochloric acid test (mg/cm²/h) | Hydrochloric acid resistance | Weld operability | Overall judgment |
|---|---|---|---|---|---|---|
| Comparative specimen W1 | 79.5 | X | 15.6 | X | ○ | ˣInsufficient corrosion resistance |
| Comparative specimen W2 | 39.3 | X | 11.7 | X | ○ | ˣInsufficient corrosion resistance |
| Comparative specimen W3 | 23.3 | X | 13.9 | X | ○ | ˣInsufficient corrosion resistance |
| Comparative specimen W4 | 33.7 | X | 17.1 | X | ○ | ˣInsufficient corrosion resistance |
| Comparative specimen W5 | 15.9 | X | 11.1 | X | ○ | ˣInsufficient corrosion resistance |
| Comparative specimen W6 | 24.3 | X | 13.3 | X | ○ | ˣInsufficient corrosion resistance |
| Comparative specimen W7 | 23.1 | X | 13.1 | X | ○ | ˣInsufficient corrosion resistance |
| Comparative specimen W8 | 19.7 | X | 12.5 | X | ○ | ˣInsufficient corrosion resistance |
| Comparative specimen W9 | 3.98 | ⊚ | 0.35 | ⊚ | X | ˣInsufficient operability |
| Comparative specimen W10 | 27.1 | X | 15.5 | X | ○ | ˣInsufficient corrosion resistance |
| Comparative specimen W11 | 9.7 | Δ | 5.17 | Δ | X | ˣInsufficient operability |
| Comparative specimen W12 | 15.3 | X | 0.85 | ⊚ | ○ | ˣInsufficient corrosion resistance |
| Comparative specimen W13 | 17.9 | X | 0.98 | ⊚ | ○ | ˣInsufficient corrosion resistance |
| Comparative specimen W14 | 19.3 | X | 0.77 | ⊚ | ○ | ˣInsufficient corrosion resistance |
| Comparative specimen W15 | 21.8 | X | 0.89 | ⊚ | ○ | ˣInsufficient corrosion resistance |
| Comparative specimen W16 | 26.7 | X | 0.57 | ⊚ | ○ | ˣInsufficient corrosion resistance |
| Comparative specimen W17 | 25.4 | X | 0.76 | ⊚ | ○ | ˣInsufficient corrosion resistance |
| Comparative specimen W18 | 18.9 | X | 0.88 | ⊚ | ○ | ˣInsufficient corrosion resistance |

Sulfuric acid test: Dipping in 20% sulfuric acid for 24 hr. at 40° C.
Hydrochloric acid test: Dipping in 10% hydrochloric acid for 24 hr. at 80° C.
Underlined numeral: Outside the range specified in the present invention

TABLE 14

Chemical components, corrosion resistance, weld operability and overall judgement (sequel 2 of Table 12)

| | C | Si | Mn | P | S | Cu | Ni | Sb | Mo | Cr |
|---|---|---|---|---|---|---|---|---|---|---|
| Inventive specimen W21 | 0.140 | 0.62 | 0.42 | 0.012 | 0.006 | 0.46 | 0.28 | 0.180 | 0.050 | <0.02 |
| Inventive specimen W22 | 0.050 | 0.01 | 0.42 | 0.012 | 0.006 | 0.46 | 0.28 | 0.100 | 0.051 | <0.02 |
| Inventive specimen W23 | 0.050 | 0.62 | 0.42 | 0.030 | .0006 | 0.46 | 0.28 | 0.100 | 0.051 | <0.02 |

TABLE 14-continued

Chemical components, corrosion resistance, weld operability and overall judgement (sequel 2 of Table 12)

| | | | | | | | | | | |
|---|---|---|---|---|---|---|---|---|---|---|
| Inventive specimen W24 | 0.050 | 0.62 | 0.42 | 0.009 | 0.030 | 0.35 | 0.35 | 0.080 | 0.060 | <0.02 |
| Inventive specimen W25 | 0.050 | 0.62 | 0.49 | 0.009 | 0.012 | 0.10 | 0.35 | 0.085 | 0.055 | <0.02 |
| Inventive specimen W26 | 0.050 | 0.62 | 0.49 | 0.009 | 0.012 | 0.39 | 0.02 | 0.085 | 0.035 | <0.02 |
| Inventive specimen W27 | 0.050 | 0.62 | 0.49 | 0.009 | 0.012 | 0.39 | 0.35 | 0.010 | 0.015 | <0.02 |
| Inventive specimen W28 | 0.050 | 0.62 | 0.49 | 0.009 | 0.012 | 0.39 | 0.35 | 0.200 | 0.150 | <0.02 |
| Inventive specimen W29 | 0.050 | 0.62 | 0.49 | 0.009 | 0.012 | 0.39 | 0.35 | 0.135 | 0.010 | <0.02 |
| Inventive specimen W30 | 0.030 | 0.62 | 0.49 | 0.009 | 0.012 | 0.39 | 0.35 | 0.195 | 0.300 | <0.02 |
| Inventive specimen W31 | 0.040 | 0.62 | 0.42 | 0.012 | 0.006 | 0.46 | 0.28 | 0.080 | 0.051 | 0.05 |
| Inventive specimen W32 | 0.030 | 0.62 | 0.42 | 0.012 | 0.006 | 0.46 | 0.28 | 0.080 | 0.051 | 0.10 |
| Inventive specimen W33 | 0.030 | 0.62 | 0.42 | 0.012 | 0.006 | 0.46 | 0.28 | 0.080 | 0.051 | 0.50 |
| Inventive specimen W34 | 0.040 | 0.62 | 0.42 | 0.012 | 0.006 | 0.46 | 0.28 | 0.080 | 0.095 | <0.02 |
| Inventive specimen W35 | 0.040 | 0.62 | 0.42 | 0.012 | 0.006 | 0.46 | 0.28 | 0.080 | 0.050 | <0.02 |
| Inventive specimen W36 | 0.040 | 0.62 | 0.42 | 0.012 | 0.006 | 0.46 | 0.28 | 0.080 | 0.090 | <0.02 |
| Inventive specimen W37 | 0.040 | 0.62 | 0.42 | 0.012 | 0.006 | 0.46 | 0.28 | 0.080 | 0.100 | 0.49 |
| Inventive specimen W38 | 0.040 | 0.62 | 0.42 | 0.012 | 0.006 | 0.46 | 0.28 | 0.100 | 0.051 | <0.02 |
| Inventive specimen W39 | 0.040 | 0.62 | 0.42 | 0.012 | 0.006 | 0.46 | 0.28 | 0.100 | 0.051 | <0.02 |
| Inventive specimen W40 | 0.040 | 0.62 | 0.42 | 0.012 | 0.006 | 0.46 | 0.28 | 0.100 | 0.030 | <0.02 |
| Inventive specimen W41 | 0.040 | 0.62 | 0.42 | 0.012 | 0.006 | 0.46 | 0.28 | 0.100 | 0.051 | <0.02 |
| Inventive specimen W42 | 0.040 | 0.62 | 0.42 | 0.012 | 0.006 | 0.46 | 0.28 | 0.120 | 0.020 | <0.02 |
| Inventive specimen W43 | 0.040 | 0.62 | 0.42 | 0.012 | 0.006 | 0.46 | 0.28 | 0.080 | 0.030 | <0.02 |
| Inventive specimen W44 | 0.030 | 0.62 | 0.42 | 0.012 | 0.006 | 0.46 | 0.28 | 0.150 | 0.040 | <0.02 |
| Inventive specimen W45 | 0.040 | 0.62 | 0.42 | 0.012 | 0.006 | 0.46 | 0.28 | 0.200 | 0.050 | <0.02 |
| Inventive specimen W46 | 0.040 | 0.62 | 0.42 | 0.012 | 0.006 | 0.46 | 0.28 | 0.150 | 0.051 | <0.02 |
| Inventive specimen W47 | 0.040 | 0.62 | 0.42 | 0.012 | 0.006 | 0.46 | 0.28 | 0.080 | 0.051 | <0.02 |
| Inventive specimen W48 | 0.040 | 0.62 | 0.42 | 0.012 | 0.006 | 0.46 | 0.28 | 0.080 | 0.051 | <0.02 |
| Inventive specimen W49 | 0.040 | 0.62 | 0.42 | 0.012 | 0.006 | 0.46 | 0.28 | 0.080 | 0.051 | <0.02 |
| Inventive specimen W50 | 0.040 | 0.62 | 0.42 | 0.012 | 0.006 | 0.46 | 0.28 | 0.080 | 0.051 | <0.02 |
| Inventive specimen W51 | 0.040 | 0.62 | 0.42 | 0.012 | 0.006 | 0.46 | 0.28 | 0.080 | 0.051 | <0.02 |
| Inventive specimen W52 | 0.040 | 0.62 | 0.42 | 0.012 | 0.006 | 0.46 | 0.28 | 0.080 | 0.051 | <0.02 |
| Inventive specimen W53 | 0.040 | 0.62 | 0.42 | 0.012 | 0.006 | 0.46 | 0.28 | 0.080 | 0.051 | <0.02 |

(Mass %)

| | Al | N | Nb | V | Ti | Ta | W | Others | AI value | EI value |
|---|---|---|---|---|---|---|---|---|---|---|
| Inventive specimen W21 | 0.010 | 0.0090 | | | | | | | 16.0 | |
| Inventive specimen W22 | 0.030 | 0.0090 | | | | | | | 24.5 | |
| Inventive specimen W23 | 0.010 | 0.0090 | | | | | | | 24.5 | |
| Inventive specimen W24 | 0.015 | 0.0090 | | | | | | | 11.0 | |
| Inventive specimen W25 | 0.015 | 0.0090 | | | | | | | 15.8 | |
| Inventive specimen W26 | 0.015 | 0.0090 | | | | | | | 25.8 | |
| Inventive specimen W27 | 0.015 | 0.0090 | | | | | | | 2.0 | |
| Inventive specimen W28 | 0.015 | 0.0090 | | | | | | | 20.0 | |
| Inventive specimen W29 | 0.015 | 0.0090 | | | | | | | 60.8 | |
| Inventive specimen W30 | 0.015 | 0.0090 | | | | | | | 2.8 | |
| Inventive specimen W31 | 0.025 | 0.0090 | | | | | | | 20.6 | |
| Inventive specimen W32 | 0.025 | 0.0090 | | | | | | | 25.7 | |
| Inventive specimen W33 | 0.025 | 0.0090 | | | | | | | 25.7 | |
| Inventive specimen W34 | 0.025 | 0.0150 | | | | | | | 3.0 | |
| Inventive specimen W35 | 0.025 | 0.0090 | | | | | | | 21.0 | |
| Inventive specimen W36 | 0.025 | 0.0090 | | | | | | | 5.0 | |
| Inventive specimen W37 | 0.025 | 0.0090 | | | | | | | 1.0 | |
| Inventive specimen W38 | 0.025 | 0.0090 | 0.01 | | | | | | | 9.2– |
| Inventive specimen W39 | 0.025 | 0.0090 | | 0.012 | | | | | | 9.4 |
| Inventive specimen W40 | 0.025 | 0.0090 | | | 0.010 | | | | | 0.8 |
| Inventive specimen W41 | 0.025 | 0.0090 | | | | 0.010 | | | | 9.2– |
| Inventive specimen W42 | 0.025 | 0.0090 | | | | | 0.120 | | | 27.0 |
| Inventive specimen W43 | 0.025 | 0.0090 | 0.009 | 0.005 | | | | Ca: 0.001 | | 2.2 |
| Inventive specimen W44 | 0.025 | 0.0090 | | 0.005 | 0.010 | | | REM: 0.001 | | 26.3 |
| Inventive specimen W45 | 0.025 | 0.0090 | | | 0.010 | 0.010 | | Sn: 0.04 | | 17.4 |
| Inventive specimen W46 | 0.025 | 0.0090 | | | 0.010 | 0.100 | | Pb: 0.1 | | 11.7 |
| Inventive specimen W47 | 0.025 | 0.0090 | | | | | | Se: 0.01 Te: 0.01 | 20.6 | |
| Inventive specimen W48 | 0.025 | 0.0090 | | | | | | Bi: 0.05 | 20.6 | |
| Inventive specimen W49 | 0.025 | 0.0090 | | | | | | Ag: 0.3 | 20.6 | |
| Inventive specimen W50 | 0.025 | 0.0090 | | | | | | Pd: 0.2 | 20.6 | |
| Inventive specimen W51 | 0.025 | 0.0090 | 0.009 | | | | | | | 2.2 |
| Inventive specimen W52 | 0.025 | 0.0090 | | | | | | | 20.6 | |
| Inventive specimen W53 | 0.025 | 0.0090 | | | | | | | 20.6 | |

Sulfuric acid test: Dipping in 20% sulfuric acid for 24 hr. at 40° C.
Hydrochloric acid test: Dipping in 10% hydrochloric acid for 24 hr. at 80° C.
Underlined numeral: Outside the range specified in the present invention

TABLE 15

Chemical components, corrosion resistance, weld operability and overall judgment (sequel 3 of Table 12)

|  | Sulfuric acid test (mg/cm$^2$/h) | Sulfuric acid resistance | Hydrochloric acid test (mg/cm$^2$/h) | Hydrochloric acid resistance | Weld operability | Overall judgment |
|---|---|---|---|---|---|---|
| Inventive specimen W21 | 5.85 | ◉ | 1.05 | ◉ | ○ | ◉ |
| Inventive specimen W22 | 4.97 | ◉ | 0.98 | ◉ | ○ | ◉ |
| Inventive specimen W23 | 5.90 | ◉ | 0.99 | ◉ | ○ | ◉ |
| Inventive specimen W24 | 5.97 | ◉ | 0.87 | ◉ | ○ | ◉ |
| Inventive specimen W25 | 7.04 | ◉ | 0.85 | ◉ | ○ | ◉ |
| Inventive specimen W26 | 6.92 | ◉ | 0.89 | ◉ | ○ | ◉ |
| Inventive specimen W27 | 5.50 | ◉ | 0.95 | ◉ | ○ | ◉ |
| Inventive specimen W28 | 4.75 | ◉ | 0.75 | ◉ | ○ | ◉ |
| Inventive specimen W29 | 6.46 | ◉ | 0.67 | ◉ | ○ | ◉ |
| Inventive specimen W30 | 7.43 | ◉ | 0.75 | ◉ | ○ | ◉ |
| Inventive specimen W31 | 5.52 | ◉ | 0.65 | ◉ | ○ | ◉ |
| Inventive specimen W32 | 4.54 | ◉ | 0.57 | ◉ | ○ | ◉ |
| Inventive specimen W33 | 7.07 | ◉ | 0.59 | ◉ | ○ | ◉ |
| Inventive specimen W34 | 6.24 | ◉ | 0.66 | ◉ | ○ | ◉ |
| Inventive specimen W35 | 6.55 | ◉ | 0.64 | ◉ | ○ | ◉ |
| Inventive specimen W36 | 4.64 | ◉ | 0.59 | ◉ | ○ | ◉ |
| Inventive specimen W37 | 6.85 | ◉ | 0.70 | ◉ | ○ | ◉ |
| Inventive specimen W38 | 4.66 | ◉ | 0.51 | ◉ | ○ | ◉ |
| Inventive specimen W39 | 6.77 | ◉ | 0.49 | ◉ | ○ | ◉ |
| Inventive specimen W40 | 6.24 | ◉ | 0.58 | ◉ | ○ | ◉ |
| Inventive specimen W41 | 7.17 | ◉ | 0.54 | ◉ | ○ | ◉ |
| Inventive specimen W42 | 5.98 | ◉ | 0.55 | ◉ | ○ | ◉ |
| Inventive specimen W43 | 4.96 | ◉ | 0.54 | ◉ | ○ | ◉ |
| Inventive specimen W44 | 6.56 | ◉ | 0.55 | ◉ | ○ | ◉ |
| Inventive specimen W45 | 7.29 | ◉ | 0.61 | ◉ | ○ | ◉ |
| Inventive specimen W46 | 6.01 | ◉ | 0.64 | ◉ | ○ | ◉ |
| Inventive specimen W47 | 5.19 | ◉ | 0.52 | ◉ | ○ | ◉ |
| Inventive specimen W48 | 4.70 | ◉ | 0.62 | ◉ | ○ | ◉ |
| Inventive specimen W49 | 6.21 | ◉ | 0.55 | ◉ | ○ | ◉ |
| Inventive specimen W50 | 5.15 | ◉ | 0.54 | ◉ | ○ | ◉ |

Sulfuric acid test: Dipping in 20% sulfuric acid for 24 hr. at 40° C.
Hydrochloric acid test: Dipping in 10% hydrochloric acid for 24 hr. at 80° C.
Underlined numeral: Outside the range specified in the present invention Firstly, explained are the hydrochloric acid resistance and sulfuric acid resistance of the weld metals for comparison (hereunder referred to as "comparative weld metals") W1 to W18 and the weld metals according to the present invention (hereunder referred to as "invention weld metals") W21 to W53 shown in Tables 12, 13 (sequel 1 of Table 12), 14 (sequel 2 of Table 12) and 15 (sequel 3 of Table 12).

The comparative weld metal W1 is a weld metal formed with a weld material for a soft steel and the amounts of Cu, Ni and Sb thereof are outside the ranges specified in the present invention, and therefore the sulfuric acid resistance and hydrochloric acid resistance thereof are inferior to those of the invention weld metals W21 to w53.

The comparative weld metal W2 is a weld metal formed with a weld material for a conventional sulfuric acid resistant steel and the amounts of Sb and Ni thereof are outside the ranges specified in the present invention, and therefore the sulfuric acid resistance and hydrochloric acid resistance thereof are inferior to those of the invention weld metals W21 to W53.

The comparative weld metal W3 is a weld metal formed with a weld material for a Cu—Cr sulfuric acid dew-point corrosion resistant steel and the amounts of Sb, Ni and Cr thereof are outside the ranges specified in the present invention, and therefore the sulfuric acid resistance and hydrochloric acid resistance thereof are inferior to those of the invention weld metals W21 to W53.

The comparative weld metal W4 contains P in excess of an amount in the range specified in the present invention, and therefore the sulfuric acid resistance and hydrochloric acid resistance thereof are inferior to those of the invention weld metals W21 to W53.

The comparative weld metal W5 contains S in excess of an amount in the range specified in the present invention. Therefore, cracks are generated in the weld metal and the weld operability and weld quality of the weld metal are far inferior to those of the invention weld metals W21 to W53, though the sulfuric acid resistance and hydrochloric acid resistance thereof are excellent.

In the comparative weld metal W6, the Cu amount thereof is less than the lower limit specified in the present invention, and therefore the sulfuric acid resistance and hydrochloric acid resistance thereof are inferior to those of the invention weld metals W21 to W53.

In the comparative weld metal W7, the amounts of Ni and Sb thereof are less than the lower limits specified in the present invention and, therefore, the sulfuric acid resistance and hydrochloric acid resistance thereof are inferior to those of the invention weld metals W21 to W53.

In the comparative weld metals W8 and W10, the Sb amounts thereof are less than the lower limit specified in the present invention and, therefore, the sulfuric acid resistance and hydrochloric acid resistance thereof are inferior to those of the invention weld metals W21 to W53.

In the comparative weld metals W9 and W11, the Sb amounts thereof exceed the upper limit specified in the present invention and, therefore, the weld operability thereof is far inferior to that of the invention weld metals W21 to W53.

In the comparative weld metal W12, the acid resistance index AI is −19.0 and deviates from the range specified in the present invention (AI≧0) and, therefore, the hydrochloric acid resistance thereof is far inferior to that of the invention weld metals W21 to W53.

In the comparative weld metal W13, the acid resistance index AI is −9.0 and deviates from the range specified in the present invention (AI≧0) and, therefore, the hydrochloric acid resistance thereof is far inferior to that of the invention weld metals W21 to W53.

In the comparative weld metals W14 to W18, the acid resistance indexes EI deviate from the range specified in the present invention (EI≧0) and, therefore, the hydrochloric acid resistance thereof is far inferior to that of the invention weld metals W21 to W53.

As explained above, it can be understood that the invention weld metals W21 to W53 are excellent in sulfuric acid resistance, hydrochloric acid resistance and weld operability.

Next, butt weld joints of downward postures were formed under an electric current of 170 A and a weld heat input of 17 to 19 kj/cm by using the welding materials according to the present invention as shown in Tables 10 and 11 and the base materials 7 (16 mm in sheet thickness) as shown in Tables 16 and 17. Thereafter, the test pieces (4 mm×25 mm×60 mm) for the corrosion tests of the weld joints were sampled from the portions shown in FIG. 13 so that the area ratio of a weld metal 6 and a base material 7 might be 1:2, the dipping corrosion tests were carried under the same conditions as aforementioned conditions, and then the corrosion resistance of the weld joints was investigated. The results are shown in Tables 16 and 17.

TABLE 16

Chemical components and corrosion resistance of butt weld joint weld metal (part 1)

| Weld joint code | Base material code | Weld material code | Chemical components of weld metal (mass %) | | | | | | | | |
|---|---|---|---|---|---|---|---|---|---|---|---|
| | | | C | Si | Mn | P | S | Cu | Ni | Sb | Mo |
| Comparative specimen J1 | Comparative steel A1 | Comparative specimen W1 | 0.070 | 0.56 | 1.23 | 0.021 | 0.006 | 0.02 | 0.02 | 0.002 | 0.004 |
| Comparative specimen J2 | Comparative steel A2 | Comparative specimen W2 | 0.065 | 0.50 | 0.42 | 0.013 | 0.005 | 0.30 | 0.02 | 0.002 | 0.003 |
| Comparative specimen J3 | Comparative steel A2 | Inventive specimen W31 | 0.040 | 0.62 | 0.42 | 0.012 | 0.006 | 0.46 | 0.28 | 0.080 | 0.051 |
| Comparative specimen J4 | Inventive steel C36 | Comparative specimen W2 | 0.065 | 0.50 | 0.42 | 0.013 | 0.005 | 0.30 | 0.06 | 0.002 | 0.009 |
| Inventive specimen J11 | Inventive steel C35 | Inventive specimen W32 | 0.030 | 0.62 | 0.42 | 0.012 | 0.006 | 0.46 | 0.28 | 0.080 | 0.051 |
| Inventive specimen J12 | Inventive steel C36 | Inventive specimen W40 | 0.040 | 0.62 | 0.42 | 0.012 | 0.006 | 0.46 | 0.28 | 0.100 | 0.030 |
| Inventive specimen J13 | Inventive steel C36 | Inventive specimen W41 | 0.040 | 0.62 | 0.42 | 0.012 | 0.006 | 0.46 | 0.28 | 0.100 | 0.051 |
| Inventive specimen J14 | Inventive steel C36 | Inventive specimen W35 | 0.040 | 0.62 | 0.42 | 0.012 | 0.006 | 0.46 | 0.28 | 0.080 | 0.050 |
| Inventive specimen J15 | Inventive steel C36 | Inventive specimen W44 | 0.030 | 0.62 | 0.42 | 0.012 | 0.006 | 0.46 | 0.28 | 0.150 | 0.040 |
| Inventive specimen J16 | Inventive steel C17 | Inventive specimen W38 | 0.040 | 0.62 | 0.42 | 0.012 | 0.006 | 0.46 | 0.28 | 0.100 | 0.051 |
| Inventive specimen J17 | Inventive steel C46 | Inventive specimen W31 | 0.040 | 0.62 | 0.42 | 0.012 | 0.006 | 0.46 | 0.28 | 0.080 | 0.049 |
| Inventive specimen J18 | Inventive specimen C47 | Inventive specimen W32 | 0.030 | 0.62 | 0.42 | 0.012 | 0.006 | 0.46 | 0.28 | 0.080 | 0.049 |
| Inventive specimen J19 | Inventive specimen C48 | Inventive specimen W33 | 0.030 | 0.62 | 0.42 | 0.012 | 0.006 | 0.46 | 0.28 | 0.080 | 0.054 |

| Weld joint code | Base material code | Weld material code | Chemical components of weld metal (mass %) | | | | | | | |
|---|---|---|---|---|---|---|---|---|---|---|
| | | | Cr | Al | N | Nb | V | Ti | Ta | W |
| Comparative specimen J1 | Comparative steel A1 | Comparative specimen W1 | 0.03 | <0.002 | 0.010 | | | | | |
| Comparative specimen J2 | Comparative steel A2 | Comparative specimen W2 | 0.02 | 0.010 | 0.0090 | | | | | |
| Comparative specimen J3 | Comparative steel A2 | Inventive specimen W31 | 0.05 | 0.025 | 0.0090 | | | | | |
| Comparative specimen J4 | Inventive steel C36 | Comparative specimen W2 | 0.02 | 0.010 | 0.0090 | | | | | |
| Inventive specimen J11 | Inventive steel C35 | Inventive specimen W32 | 0.08 | 0.025 | 0.0090 | | | | | |
| Inventive specimen J12 | Inventive steel C36 | Inventive specimen W40 | <0.02 | 0.025 | 0.0090 | | | 0.010 | | |
| Inventive specimen J13 | Inventive steel C36 | Inventive specimen W41 | <0.02 | 0.025 | 0.0090 | | | | 0.010 | |
| Inventive specimen J14 | Inventive steel C36 | Inventive specimen W35 | <0.02 | 0.025 | 0.0090 | | | | | |
| Inventive specimen J15 | Inventive steel C36 | Inventive specimen W44 | <0.02 | 0.025 | 0.0090 | 0.005 | 0.010 | | | |

TABLE 16-continued

Chemical components and corrosion resistance of butt weld joint weld metal (part 1)

| | | | | | | |
|---|---|---|---|---|---|---|
| Inventive specimen J16 | Inventive steel C17 | Inventive specimen W38 | <0.02 | 0.025 | 0.0090 | 0.01 |
| Inventive specimen J17 | Inventive steel C46 | Inventive specimen W31 | 0.05 | 0.025 | 0.0090 | |
| Inventive specimen J18 | Inventive specimen C47 | Inventive specimen W32 | 0.10 | 0.025 | 0.0090 | |
| Inventive specimen J19 | Inventive specimen C48 | Inventive specimen W33 | 0.50 | 0.025 | 0.0090 | |

Underlined numeral: Outside the range specified in the present invention

TABLE 17

Chemical components and corrosion resistance of butt weld joint weld metal (part 2)

| | | | AI value or EI value | | | Corrosion resistance | | | | | |
|---|---|---|---|---|---|---|---|---|---|---|---|
| | | | | | | 40° C., 20% sulfuric acid, 24 hr. | | | 80° C., 10% hydrochloric acid, 24 hr. | | |
| Weld joint code | Base material code | Weld material code | Weld metal | Base material | Difference absolute value \|Δ\| | Corrosion rate (mg/cm²/h) | Existence of selective corrosion | Sulfuric acid resistance of joint | Corrosion rate (mg/cm²/h) | Existence of selective corrosion | Hydrochloric acid resistance of joint | Overall judgement |
| Comparative specimen J1 | Comparative steel A1 | Comparative specimen W1 | 2.2 | 5.0 | 2.8 | 83.20 | Weld | X | 75.90 | Weld | X | X |
| Comparative specimen J2 | Comparative steel A2 | Comparative specimen W2 | 3.1 | 5.0 | 2.0 | 37.40 | Weld | X | 26.80 | Weld | X | X |
| Comparative specimen J3 | Comparative steel A2 | Inventive specimen W31 | 20.6 | 5.0 | 15.6 | 6.90 | Nil | ⊚ | 17.30 | Base material | X | X |
| Comparative specimen J4 | Inventive steel C36 | Comparative specimen W2 | 0.1 | 35.0 | 35.0 | 18.90 | Weld | X | 17.10 | Weld | X | X |
| Inventive specimen J11 | Inventive steel C35 | Inventive specimen W32 | 25.7 | 0.8 | 24.9 | 8.90 | Base material | θ | 5.40 | Base material | θ | θ |
| Inventive specimen J12 | Inventive steel C36 | Inventive specimen W40 | 0.8 | 35.0 | 34.2 | 8.70 | Weld | θ | 2.90 | Weld | θ | θ |
| Inventive specimen J13 | Inventive steel C36 | Inventive specimen W41 | 9.2 | 35.0 | 25.8 | 8.70 | Weld | θ | 2.80 | Weld | θ | θ |
| Inventive specimen J14 | Inventive steel C36 | Inventive specimen W35 | 21.0 | 35.0 | 14.0 | 5.10 | Nil | ⊚ | 0.67 | Nil | ⊚ | ⊚ |
| Inventive specimen J15 | Inventive steel C36 | Inventive specimen W44 | 26.3 | 35.0 | 8.7 | 4.90 | Nil | ⊚ | 0.75 | Nil | ⊚ | ⊚ |
| Inventive specimen J16 | Inventive steel C17 | Inventive specimen W38 | 9.2 | 18.1 | 8.9 | 5.50 | Nil | ⊚ | 0.88 | Nil | ⊚ | ⊚ |
| Inventive specimen J17 | Inventive steel C46 | Inventive specimen W31 | 21.4 | 35.3 | 13.9 | 5.60 | Nil | ⊚ | 0.76 | Nil | ⊚ | ⊚ |
| Inventive specimen J18 | Inventive specimen C47 | Inventive specimen W32 | 25.7 | 35.3 | 9.6 | 6.90 | Nil | ⊚ | 0.74 | Nil | ⊚ | ⊚ |
| Inventive specimen J19 | Inventive specimen C48 | Inventive specimen W33 | 25.7 | 35.3 | 9.6 | 9.10 | Nil | ⊚ | 7.12 | Nil | ⊚ | ⊚ |

The sulfuric acid resistance and hydrochloric acid resistance of the comparative weld joints J1 to J4 and the invention weld joints J11 to J19 shown in Tables 16 and 17 are explained hereunder.

The comparative weld joint J1 is a weld joint formed with a soft steel and a welding material for a soft steel and the amounts of Cu, Ni and Sb in both the base material and the weld metal are outside the ranges specified in the present invention and, therefore, the sulfuric acid resistance and hydrochloric acid resistance thereof are inferior to those of the invention weld joints J11 to J19 and selective corrosion at the weld is observed under any of the conditions.

The comparative weld joint J2 is a weld joint composed of a Cu—Cr sulfuric acid resistant steel and a Cu containing weld metal and the amounts of Ni and Sb in both the base material and the weld metal are outside the ranges specified in the present invention and, therefore, the weld joint is inferior to the invention weld joints J11 to J19.

The comparative weld joint J3 is a weld joint composed of the comparative steel A2 and the weld metal W31 satisfying the scope of the present invention and the Mo amount in the base material is outside the range specified in the present invention and, therefore, the hydrochloric acid resistance of the base material is inferior and thus selective corrosion is observed. Therefore, the comparative weld joint J3 is inferior to the invention weld joints J11 to J19.

The comparative weld joint J4 is a weld joint composed of the invention steel C36 and the comparative weld metal W2 and the amounts of Ni and Sb in the weld metal are outside the ranges specified in the present invention and, therefore, the sulfuric acid resistance and hydrochloric acid resistance thereof are inferior to those of the invention weld joints J11 to J19 and selective corrosion at the weld is observed in any of the sulfuric acid and the hydrochloric acid.

In the invention weld joints J11 to J19, the chemical components of the base materials and the weld metals are in the ranges specified in the present invention and the AI values or the EI values of the base materials and the weld metals are also in the ranges specified in the present invention. Therefore, it can be understood that the invention weld joints J11 to J19 are excellent in sulfuric acid resistance and hydrochloric acid resistance.

In the invention weld joints J11 to J13, the values of |ΔAI| or |ΔEI| exceed 20, and therefore selective corrosion is observed, though the corrosion rates thereof are lower than those of the comparative weld joints J1 to J4. On the other hand, in the invention weld joints J14 to J19, the values of |ΔAI| or |ΔEI| are 20 or less, and therefore selective corrosion is not observed and the invention weld joints J14 to J19 are for superior to the invention weld joints J11 to J13.

The invention weld joints J17 to J19 show the influence of the Cr amounts on the weld joints. Similarly to the case of a steel, by limiting a Cr amount to 0.1% or less, most excellent hydrochloric acid resistance and sulfuric acid resistance are obtained. When Cr is added up to an amount close to the upper limit specified in the present invention (0.5%), though Cr deteriorates corrosion resistance to some extent, the invention weld joints show corrosion resistance superior to that of the comparative weld joints J1 to J4.

As is obvious from the above examples, it is understood that, by making a weld metal contain specific Cu, Ni and Sb and restricting P and S that are impurity elements, the improved hydrochloric acid resistance of a weld metal and a weld joint not less than ten times that of a soft steel welding material and not less than three times that of a welding material for a conventional sulfuric acid resistant steel is obtained and, moreover, the excellent sulfuric acid resistance not less than eight times that of a soft steel welding material and equal to or better than that of a welding material for a conventional sulfuric acid resistant steel is obtained, without the deterioration of the weld operability.

That is, it is obvious that a weld joint according to the present invention has an excellent corrosion resistance in a low temperature corrosive environment wherein sulfuric acid dew-point corrosion and/or hydrochloric acid dew-point corrosion are caused.

INDUSTRIAL APPLICABILITY

The present invention makes it possible to obtain a steel having extremely excellent resistance to hydrochloric acid dew-point corrosion and an acid-containing chloride and excellent sulfuric acid dew-point corrosion resistance. Therefore, the present invention makes it possible to economically provide a steel excellent in durability and capable of prolonging equipment service life, and reducing maintenance, as a material for a stack, a flue, a heat exchanger, a casing or an expansion joint, that is exposed to a combustion exhaust gas and causes harsh hydrochloric acid and/or sulfuric acid dew-point corrosion in a thermoelectric power station, a non-utility electric power generator, or a non-industrial or industrial waste treatment plant.

Further, the present invention makes it possible to economically provide a steel for a welded structure that shows excellent corrosion resistance in the application of the steel to a steel tank of a pickling apparatus containing hydrochloric acid or sulfuric acid.

Furthermore, the present invention makes it possible to provide a weld joint, having extremely excellent hydrochloric acid resistance and sulfuric acid resistance, easily and at a low cost.

The invention claimed is:

1. A low alloy steel excellent in hydrochloric acid corrosion resistance and sulfuric acid corrosion resistance, characterized in that said steel contains
C: 0.001 to 0.2%,
Si: 0.01 to 2.5%,
Mn: 0.1 to 2%,
Cu: 0.1 to 1%,
Mo: 0.001 to 0.12%,
Sb: 0.01 to 0.2%,
Ni: 0.1 to 1%,
P: 0.05% or less,
S: more than 0.005% to less than 0.012%,
N: 0.001 to 0.007%, and
Cr: 0.1% or less,
with the balance being Fe and unavoidable impurities; and the acid corrosion resistance index AI, which is calculated from the following expression <1>, of said steel is zero to 75, $$AI/10,000 = 0.0005 + 0.045 \times Sb\% - C\% \times Mo\% \qquad <1>,$$

where % means mass %.

2. A low alloy steel excellent in hydrochloric acid corrosion resistance and sulfuric acid corrosion resistance according to claim 1, characterized in that said steel contains no Cr.

3. A low alloy steel excellent in hydrochloric acid corrosion resistance and sulfuric acid corrosion resistance, characterized in that: said steel contains, in mass,
C: 0.001 to 0.2%,
Si: 0.01 to 2.5%,
Mn: 0.1 to 2%,
Cu: 0.1 to 1%,
Mo: 0.001 to 0.12%,
Sb: 0.01 to 0.2%,
Ni: 0.1 to 1%,
P: 0.05% or less,
S: more than 0.005% to less than 0.012%,
N: 0.001 to 0.007%, and
Cr: 0.1% or less,
and further one or more of
Nb: 0.005 to 0.1%,
Ta: 0.005 to 0.1%,
V: 0.005 to 0.1%,
Ti: 0.005 to 0.1%, and
W: 0.05 to 1%,
with the balance being Fe and unavoidable impurities; and the acid corrosion resistance index EI, which is calculated from the following expression <2>, of said steel is zero to 75, $$EI/10,000 = 0.0005 + 0.045 \times Sb\% - C\% \times Mo_{eq} \qquad <2>,$$

where % means mass % and $Mo_{eq}$ (mass %) is defined by the following expression, $$Mo_{eq} = Mo\% + 5.1 \times (Nb\% + Ta\%) + 4.2 \times V\% + 9.3 \times Ti\% + 0.5 \times W\%.$$

4. A low alloy steel excellent in hydrochloric acid corrosion resistance and sulfuric acid corrosion resistance according to claim 3, characterized in that said steel contains no Cr.

5. A low alloy steel excellent in hydrochloric acid corrosion resistance and sulfuric acid corrosion resistance according to any of claims 1 to 4, characterized in that said steel further contains, in mass, one or more of
Al: 0.005 to 0.1%,
Ca: 0.0002 to 0.01%, Mg: 0.0002 to 0.01%,
REM: 0.0002 to 0.01%,
B: 0.0002 to 0.005%,
Sn: 0.01 to 0.3%,
Pb: 0.01 to 0.3%,
Se: 0.001 to 0.1%,
Te: 0.001 to 0.1%,
Bi: 0.001 to 0.1%,
Ag: 0.001 to 0.5%, and
Pd: 0.001 to 0.1%.

* * * * *